(12) United States Patent
Gass et al.

(10) Patent No.: US 9,908,189 B2
(45) Date of Patent: Mar. 6, 2018

(54) BLADE ELEVATION MECHANISMS AND ANTI-BACKDRIVE MECHANISMS FOR TABLE SAWS

(71) Applicant: SD3, LLC, Tualatin, OR (US)

(72) Inventors: Stephen F. Gass, West Linn, OR (US); James F. W. Wright, Sherwood, OR (US); J. David Fulmer, West Linn, OR (US); Jeffrey D. Weston, Sherwood, OR (US); Steven D. McDaniel, Burton, OH (US); D. Tate Fanning, Cedar Hills, UT (US); Paul H. Stasiewicz, Oregon City, OR (US)

(73) Assignee: SawStop Holding LLC, Tualatin, OR (US)

( * ) Notice: Subject to any disclaimer, the term of this patent is extended or adjusted under 35 U.S.C. 154(b) by 0 days.

(21) Appl. No.: 15/419,307

(22) Filed: Jan. 30, 2017

(65) Prior Publication Data

US 2017/0136561 A1    May 18, 2017

Related U.S. Application Data

(62) Division of application No. 13/946,315, filed on Jul. 19, 2013, now Pat. No. 9,555,491.

(Continued)

(51) Int. Cl.
*B23D 45/06* (2006.01)
(52) U.S. Cl.
CPC .................. *B23D 45/068* (2013.01)
(58) Field of Classification Search
CPC .. B23D 45/068; B23D 59/002; B23D 45/063; B23D 47/00; B23D 45/06; B23D 47/12; Y10T 83/7726; Y10T 83/869; Y10T 83/7705; Y10T 83/773; Y10T 83/96; Y10T 83/872; Y10T 83/7734; Y10T 83/9372; B27G 19/02
USPC ...... 83/477.1, 473, 477.2, 478, 663, 522.17, 83/62.1, 58, 471.3, 490, 589, 581, 397, 83/397.1, DIG. 1

See application file for complete search history.

(56) References Cited

U.S. PATENT DOCUMENTS 2,265,407 A    12/1941 Tautz
2,974,693 A *  3/1961 Goldschmidt .......... B27B 5/243
                                                      83/426

(Continued)

FOREIGN PATENT DOCUMENTS

EP           1110650 A1     6/2001
WO       WO 01/26064 A2    4/2001

OTHER PUBLICATIONS

SawStop Model PCS175 10" Professional Cabinet Saw Owner's Manual, SawStop, LLC, Mar. 2010.

(Continued)

*Primary Examiner* — Ghassem Alie

(57) ABSTRACT

Elevation mechanisms for table saws and anti-backdrive mechanisms for use in elevation mechanisms for table saws are disclosed. The anti-backdrive mechanisms typically include three sub-assemblies: an input assembly, an output assembly, and a fixed assembly. The anti-backdrive mechanisms prevent a torque related to the output assembly from changing the blade elevation. For example, the weight of the blade and the structure supporting the blade is prevented from backdriving the elevation mechanism and allowing the blade to drop.

9 Claims, 73 Drawing Sheets

Related U.S. Application Data

(60) Provisional application No. 61/741,461, filed on Jul. 20, 2012.

(56) References Cited

U.S. PATENT DOCUMENTS

| | | | |
|---|---|---|---|
| 4,249,442 | A | 2/1981 | Fittery |
| 5,230,269 | A | 7/1993 | Shiotani et al. |
| 6,530,303 | B1 | 3/2003 | Parks et al. |
| 6,722,242 | B2 | 4/2004 | Chuang |
| 6,986,370 | B1 | 1/2006 | Schoene et al. |
| 6,994,004 | B2 * | 2/2006 | Gass .......... B27B 5/38 83/477.1 |
| 7,350,444 | B2 | 4/2008 | Gass et al. |
| 7,707,920 | B2 | 5/2010 | Gass et al. |
| 7,827,893 | B2 | 11/2010 | Gass et al. |
| 2004/0226800 | A1 * | 11/2004 | Pierga .......... B23D 45/067 192/129 R |
| 2010/0005939 | A1 | 1/2010 | Burke et al. |
| 2010/0050843 | A1 | 3/2010 | Gass et al. |
| 2011/0041667 | A1 * | 2/2011 | Chiang .......... B23D 45/062 83/477.1 |
| 2011/0146470 | A1 * | 6/2011 | Lin .......... B23D 45/068 83/477.1 |
| 2012/0006171 | A1 * | 1/2012 | Liu .......... B23D 45/063 83/477.1 |
| 2014/0260869 | A1 * | 9/2014 | Frolov .......... B23D 45/068 83/477.1 |

OTHER PUBLICATIONS

SawStop 10" Industrial Cabinet Saw Owner's Manual, SawStop, LLC, Oct. 2008.
SawStop 10" Contractor Saw Owner's Manual, SawStop, LLC, Apr. 2012.
BOSCH Model 4000 Table Saw Operating/Safety Instructions, S-B Power Tool Company, Jul. 2000.
BOSCH Models 4100, 4100DG Table Saw Operating/Safety Instructions, S-B Power Tool Company, May 2008.
BOSCH Model 4100 Table Saw Parts List, S-B Power Tool Company, Feb. 2008.
BOSCH Model 4000 Table Saw Parts List, S-B Power Tool Company, Apr. 2001.
DELTA 10" Left Tilting Unisaw Instruction Manual, DELTA Machinery, Jan. 2010.
DeWALT Model DW746 Instruction Manual, DeWALT Industrial Tool Co., 2000.
DeWALT Models DWE7490, DWE7491 Instruction Manual, DeWALT Industrial Tool Co., 2013.
DeWALT Model DW745 Heavy-Duty 10" (254 mm) Job Site Table Saw Instruction Manual, DeWALT Industrial Tool Co., 2006, 2007.
DeWALT Parts List for DW745 Type 1, DeWALT Industrial Tool Co., 2005.
General Model #50-270 10" Tilting Arbor Saw—Left Tilt Setup & Operation Manual, General International, Mar. 2010.
General Models #50-300/305 MI, #50-300CE/305CE 10" Tilting Arbor Saw—Left Tilt Setup & Operation Manual, General International, Jul. 2009.
General Model #50-200R 10" Left Tilt 2 HP Table Saw Setup & Operation Manual, General International, Sep. 2010.
Grizzly Model G0605X/G0606X Extreme Series 12" Table Saw Owner's Manual, Grizzly Industrial, Inc., Oct. 2006.
Grizzly Model G0651/G0652 10" Extreme Series Table Saws Owner's Manual, Grizzly Industrial, Inc., Mar. 2008.
Grizzly Model G5959 and G9957 Heavy-Duty 12" Table Saw Parts List, Grizzly Industrial, Inc., 1998.
Hitachi Model C10RB Jobsite Table Saw Instruction Manual and Safety Instructions, Hitachi Koki Co., Ltd.
INCA Model 2100SE Professional Tablesaw Owners Manual, Injecta Machinery, Garrett Wade Co., 1992.
JET XACTA Saw Deluxe Operating Instructions and Parts Manual, Walter Meier (Manufacturing) Inc., 2009.
Laguna TOOL3 Signature Series by Knapp Saw Assembly Instructions, Laguna Tools, Inc., Oct. 2002.
Laguna Tools Model TS-TSS Manual, Laguna Tools, Inc., date unknown.
Makita Model 2704 Exploded View and Parts List, Makita Corporation of America, Nov. 2005.
Makita Model 2704 Table Saw Instruction Manual, Makita Corporation of America, date unknown.
Metabo Model TS 250 Instruction Manual, Metabowerke GmbH, Jun. 2007.
Metabo Model TS 250 Circular Saw Parts List, Metabowerke GmbH, date unknown.
DeWALT Model 3812 Type 1 Parts List with Exploded View, DeWALT Industrial Tool Co., 2005.
Porter-Cable Model 3812 Type 1 10" Portable Table Saw Parts List, DeWALT Industrial Tool Co., 2005.
Porter-Cable Model 3812 Double Insulated 10" Bench Top Table Saw Instruction Manual, Porter-Cable Corporation, Sep. 2003.
Powermatic Model 2000 Operating Instructions and Parts Manual, WMH Tool Group, Nov. 2005.
Powermatic Model 66 10" Tilting Arbor Saw Instruction Manual & Parts List, JET Equipment & Tools, Jun. 2001.
Ridgid Model TS3650 10" Cast Iron Table Saw Operators Manual, Ridgid, Inc., Jun. 2003.
Rojek Model KPF 300A-xxxx-RN-1P3 Table Saw/Shaper Combination Machine Price List, Tech Mark, Inc., Sep. 2002.
Rojek Modek PK300 Circular Saw Spare Part Catalogue, Rojek Woodworking Machinery, Apr. 2003.
Ryobi Model BT3000 10" Table Saw Operator's Manual, Ryobi Technologies Inc., Mar. 2001.
Ryobi Model BT3100 10" Table Saw Operator's Manual, Ryobi Technologies Inc., Aug. 2002.
SCM Model SC 3W Circular Saw Operation and Maintenance, SCM Group S.p.A., Feb. 2001.
SCM Model SI16WA-WF Circular Saw With Tilting Blade Spare Parts Catalogue, SCMI Corporation, 1986.
SCM Model SI300N Circular with Tilting Blade Spare Parts Catalogue, SCM Group, Jun. 2000.
SCM Model SI300S-SI300S4 Circular with Tilting Blade Spare Parts Catalogue, SCM Group, Oct. 2003.
SCM Model SI320 Circular with Tilting Blade Spare Parts Catalogue, SCM Group, Dec. 1998.
SCM Model SI400N Circular with Tilting Blade Spare Parts Catalogue, SCM Group, Sep. 2000.
SCM Model SI450 Circular Saw with Tilting Blade Brochure, SCM Group, date unknown.
SCM Model SI450E Circular Saw with Tilting Blade Spare Parts Catalogue, SCM Group, Apr. 2001.
SCM Model SI3200/3800 Circular with Tilting Blade Spare Parts Catalogue, SCM Group, Dec. 1998.
ShopSmith Mark V photo, ShopSmith, Jan. 2004.
SKIL Model 3400 Operating/Safety Instructions, S-B Power Tool Company, Sep. 2001.
SKIL Model 3400 Type 1 10" Table Saw Parts List and Technical Bulletin, S-B Power Tool Company, Jun. 1993.
Whirlwind Model 212 Cut-Off Saw Owner's Manual, Whirlwind, Inc., Apr. 1991.
Whirlwind Model 212 Semi-Automatic Cut-Off Saw Brochure, Whirlwind, Inc., Jan. 1993.
Speed Reducer Self-Locking and Back-Driving, SE Encore, date unknown.
Engineering Considerations and Terminology, American Linear Manufacturers, date unknown.
Worm Gears, Martin, date unknown.

* cited by examiner

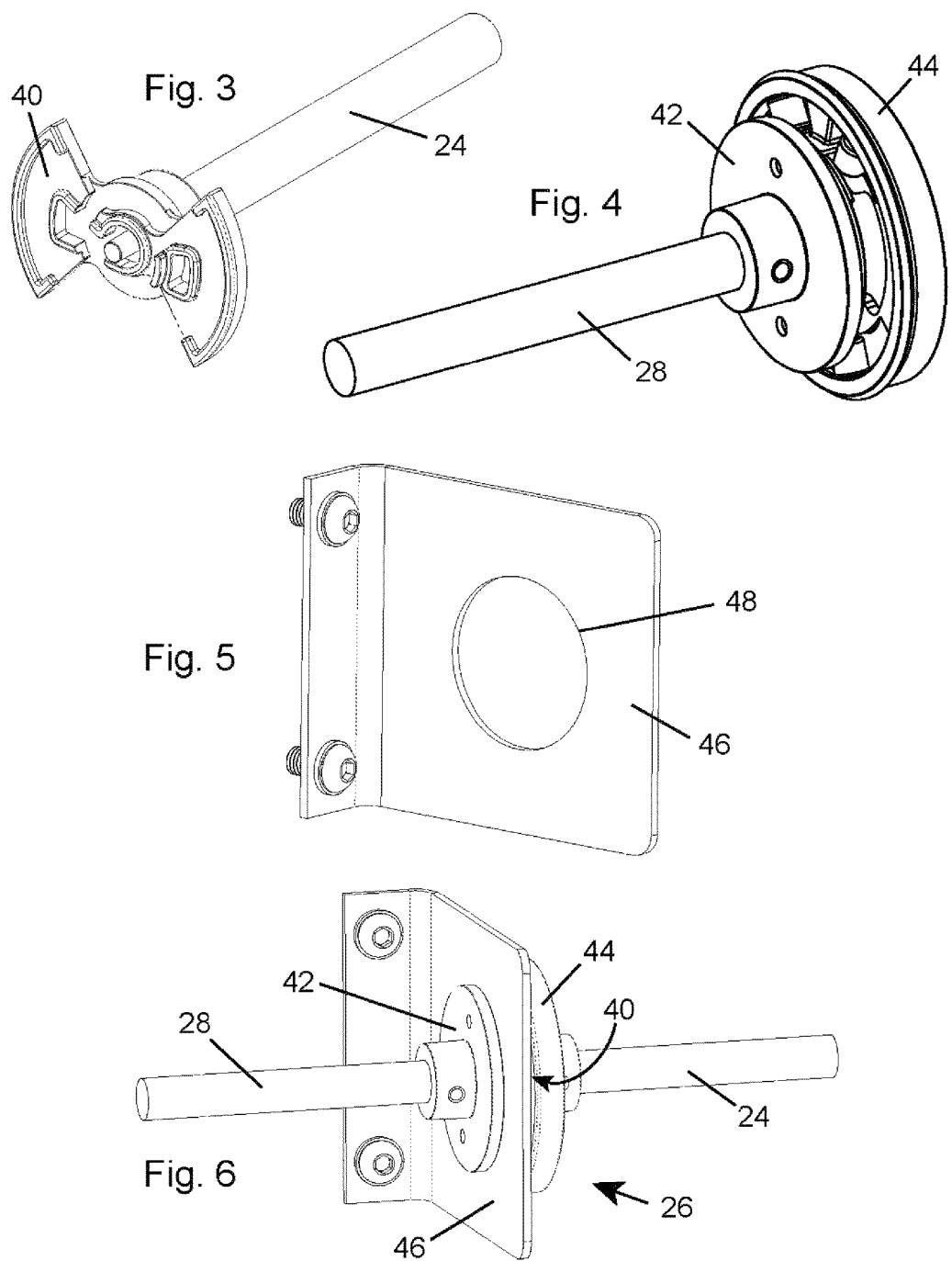

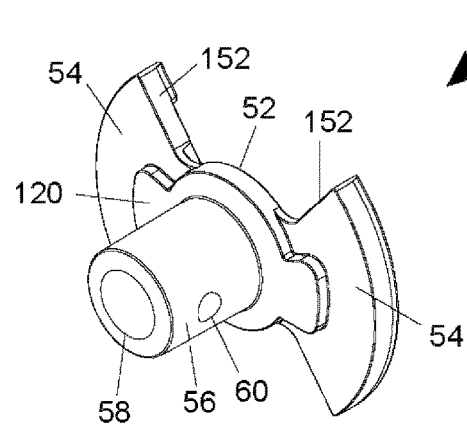
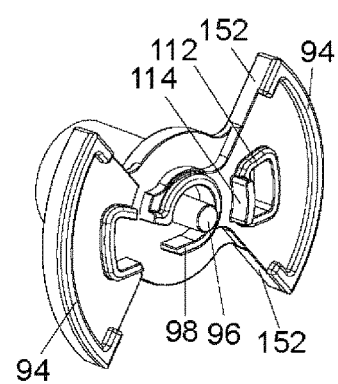
Fig. 7     Fig. 8
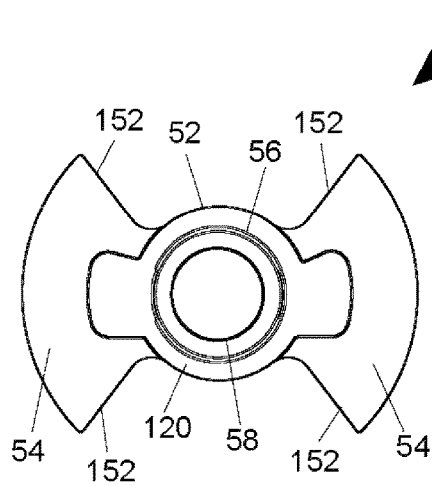
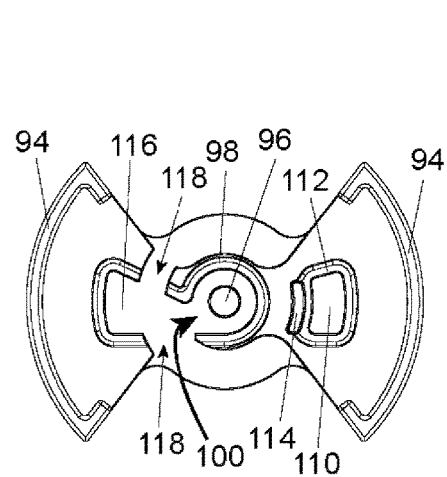
Fig. 9     Fig. 10
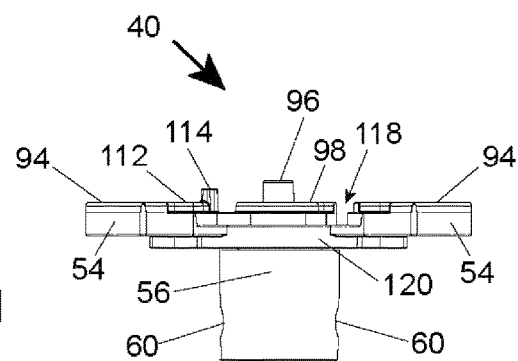
Fig. 11

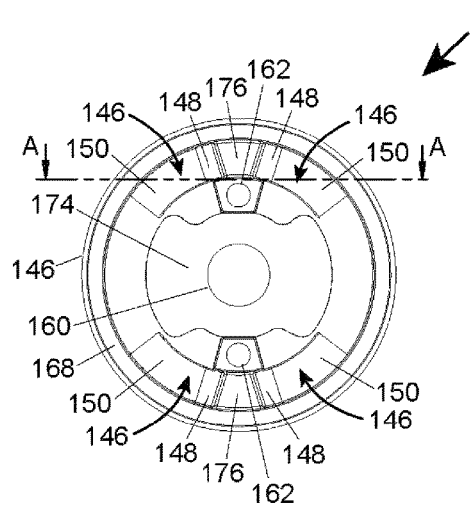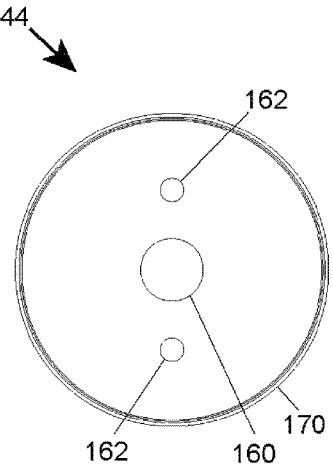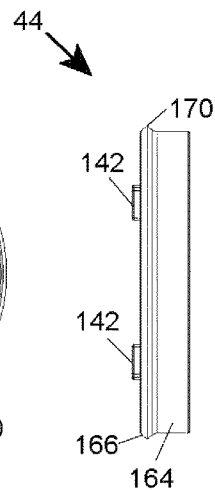
Fig. 34　　　　Fig. 35　　　　Fig. 36
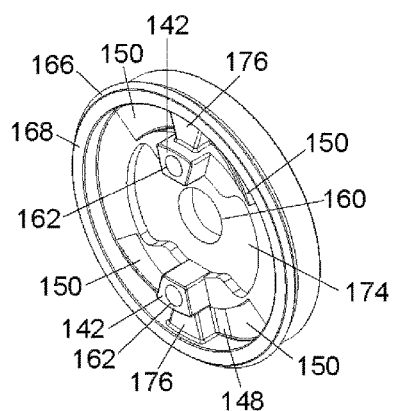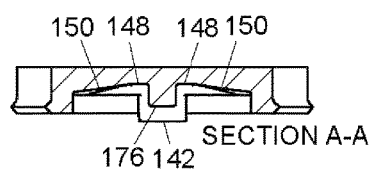
Fig. 37　　　　Fig. 38

SECTION A-A

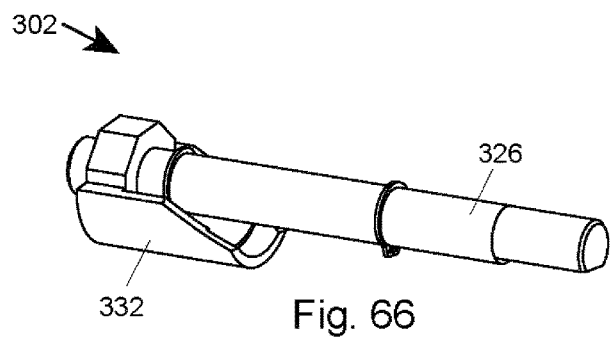
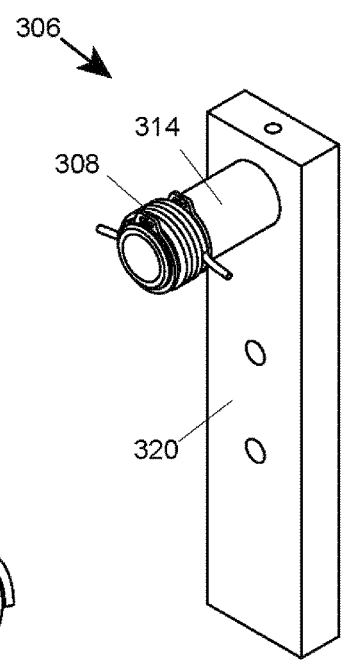
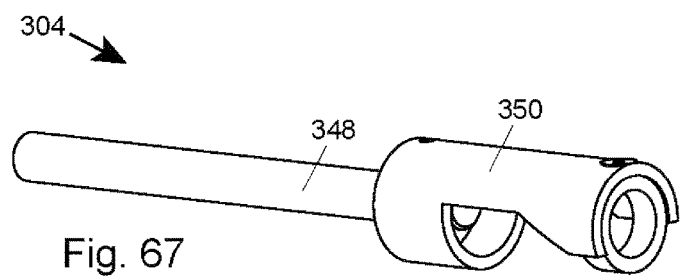
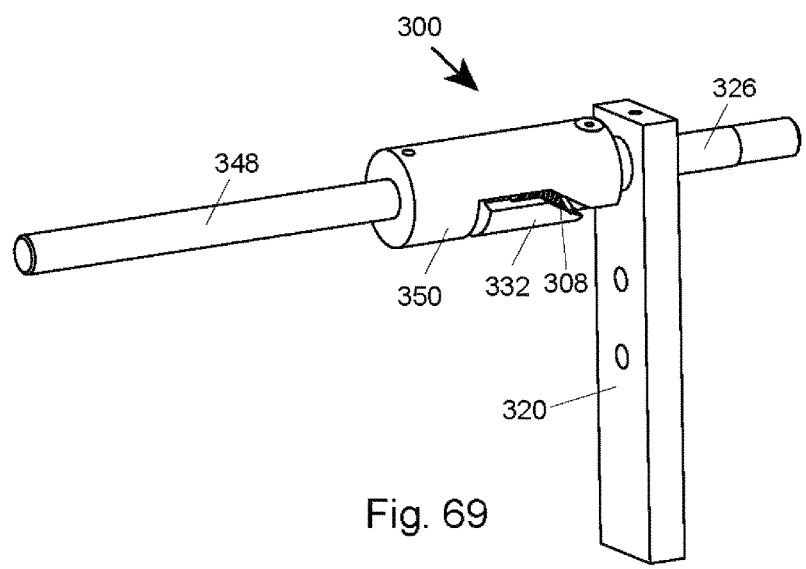

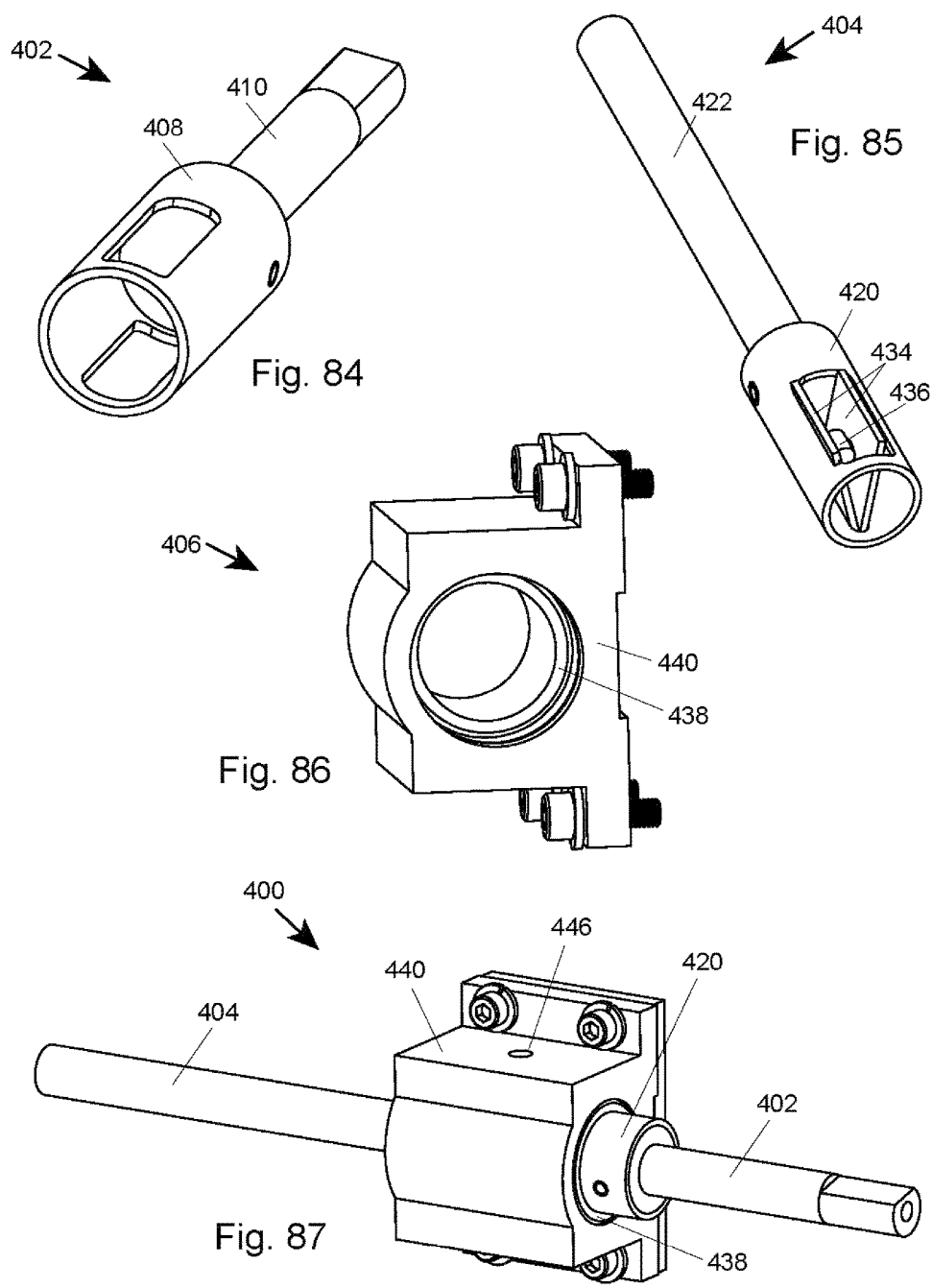

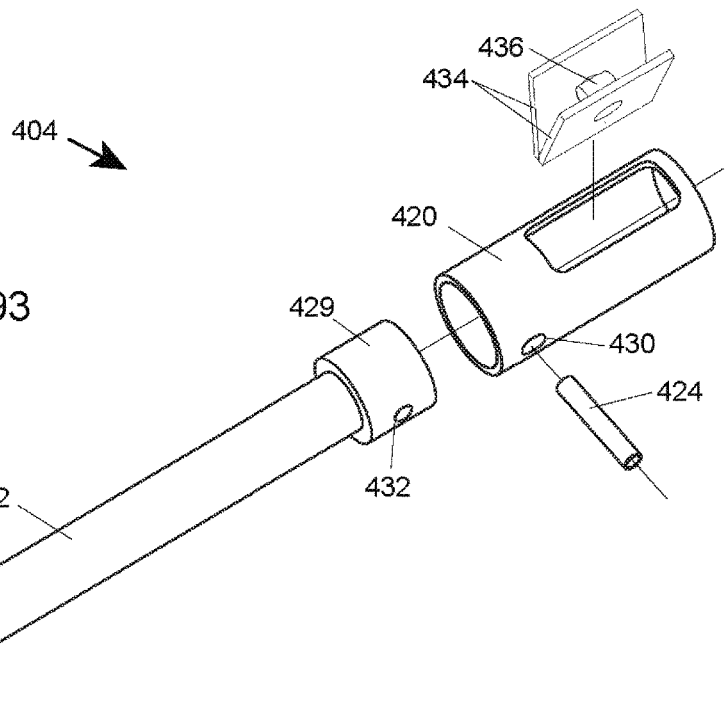
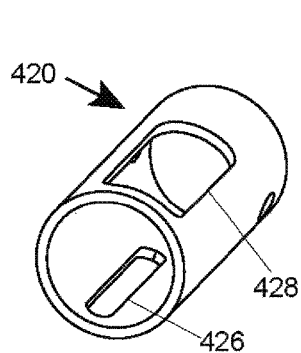
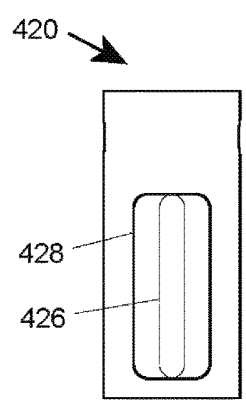
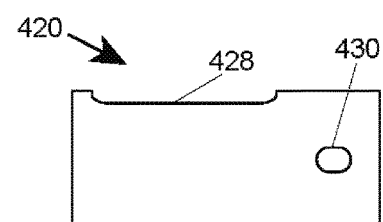
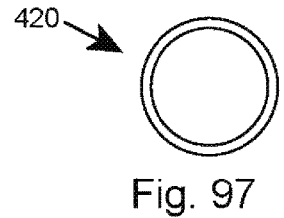
Fig. 93
Fig. 94
Fig. 95
Fig. 96
Fig. 97

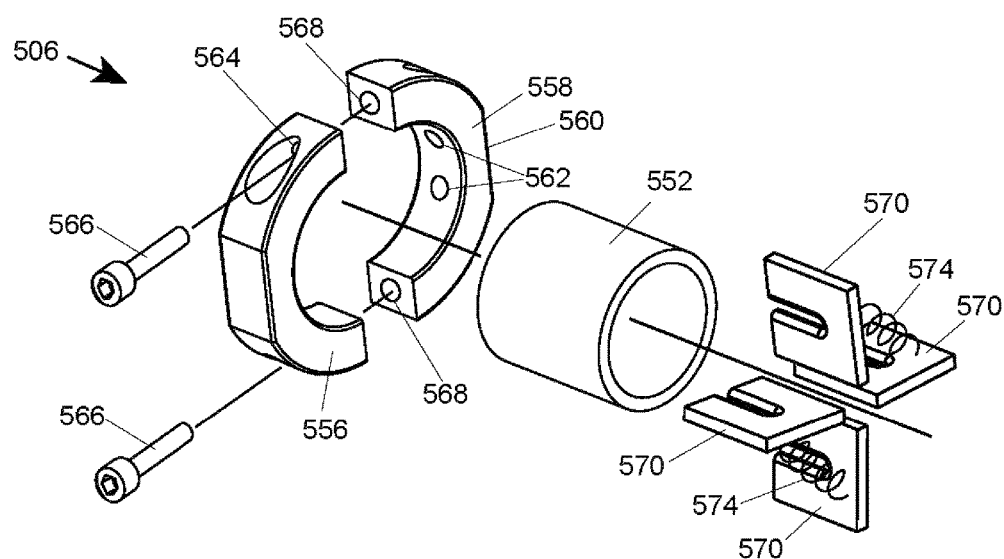
Fig. 120
Fig. 121
Fig. 122
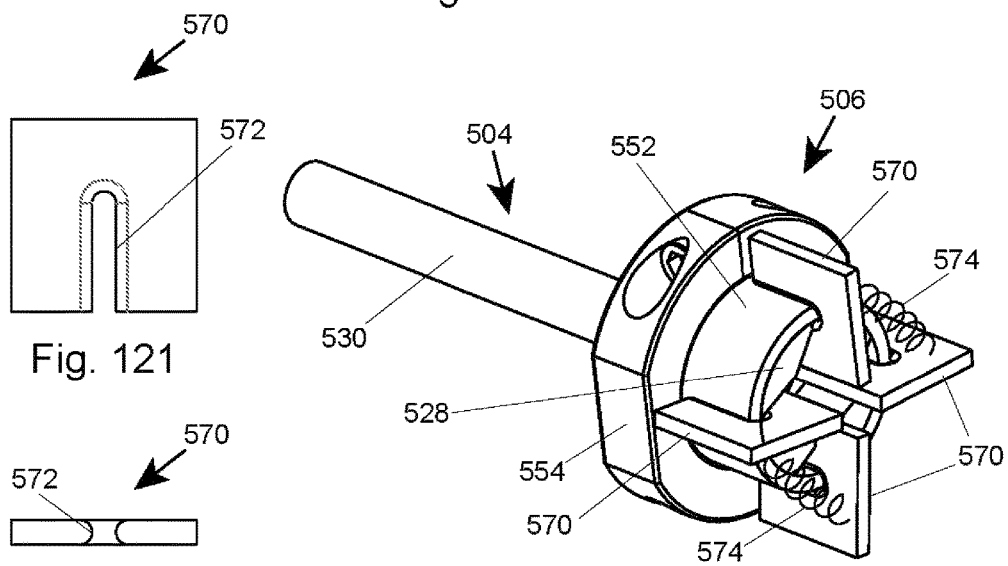
Fig. 123

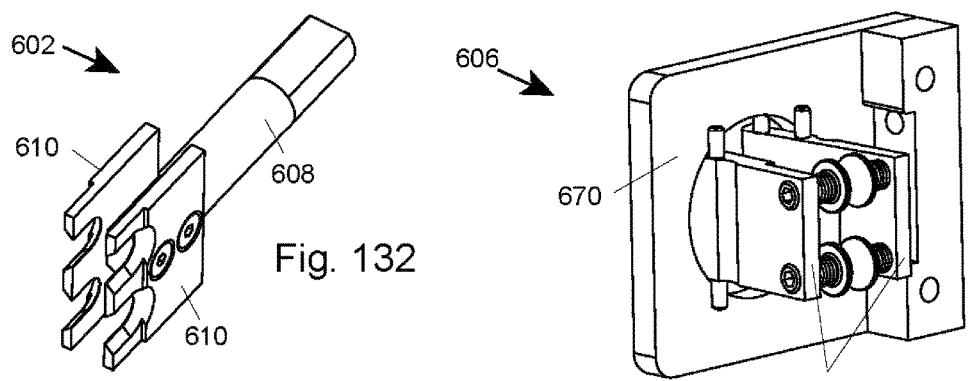
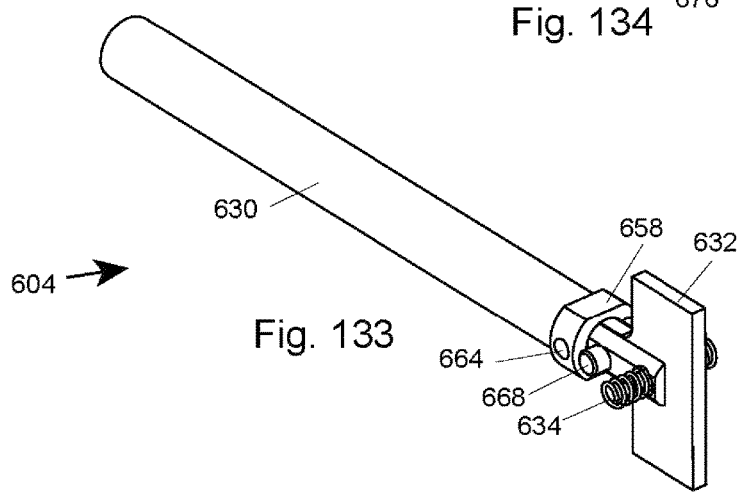
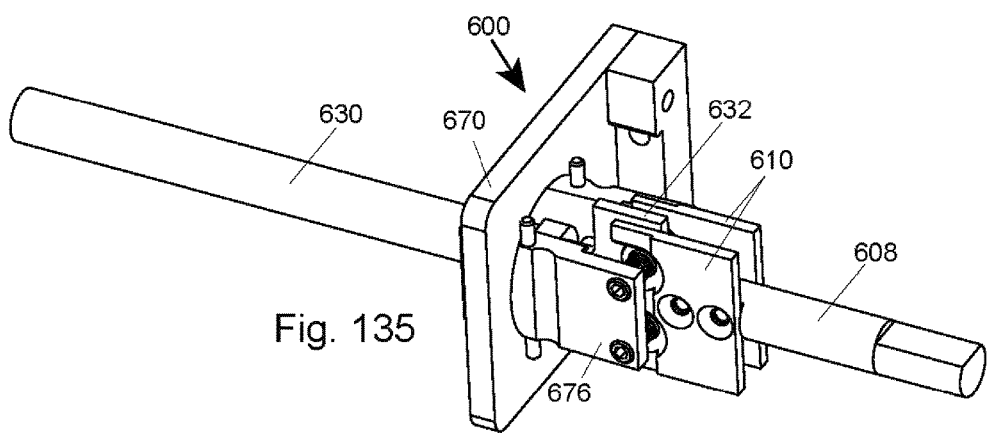

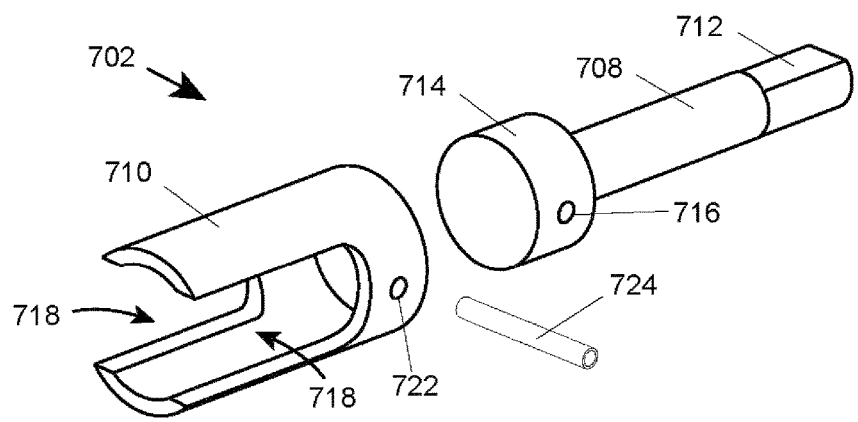
Fig. 159
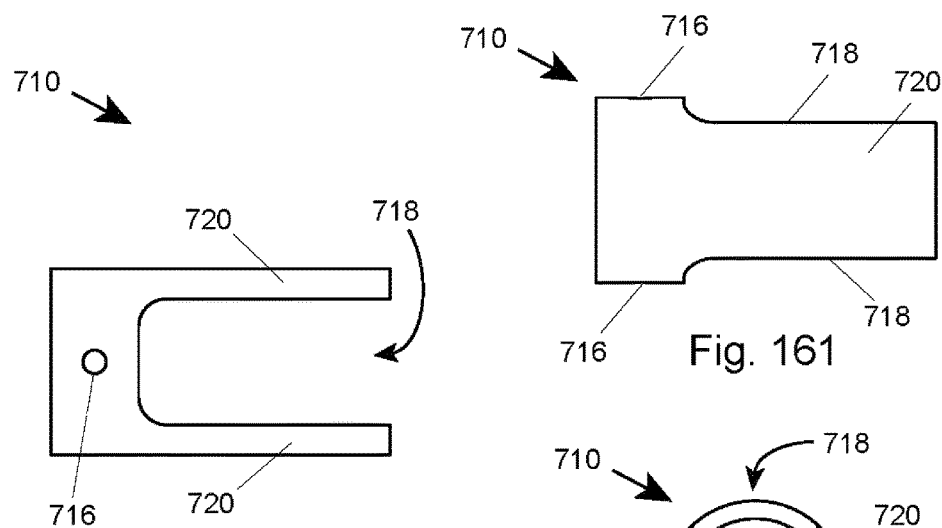
Fig. 160
Fig. 161
Fig. 162

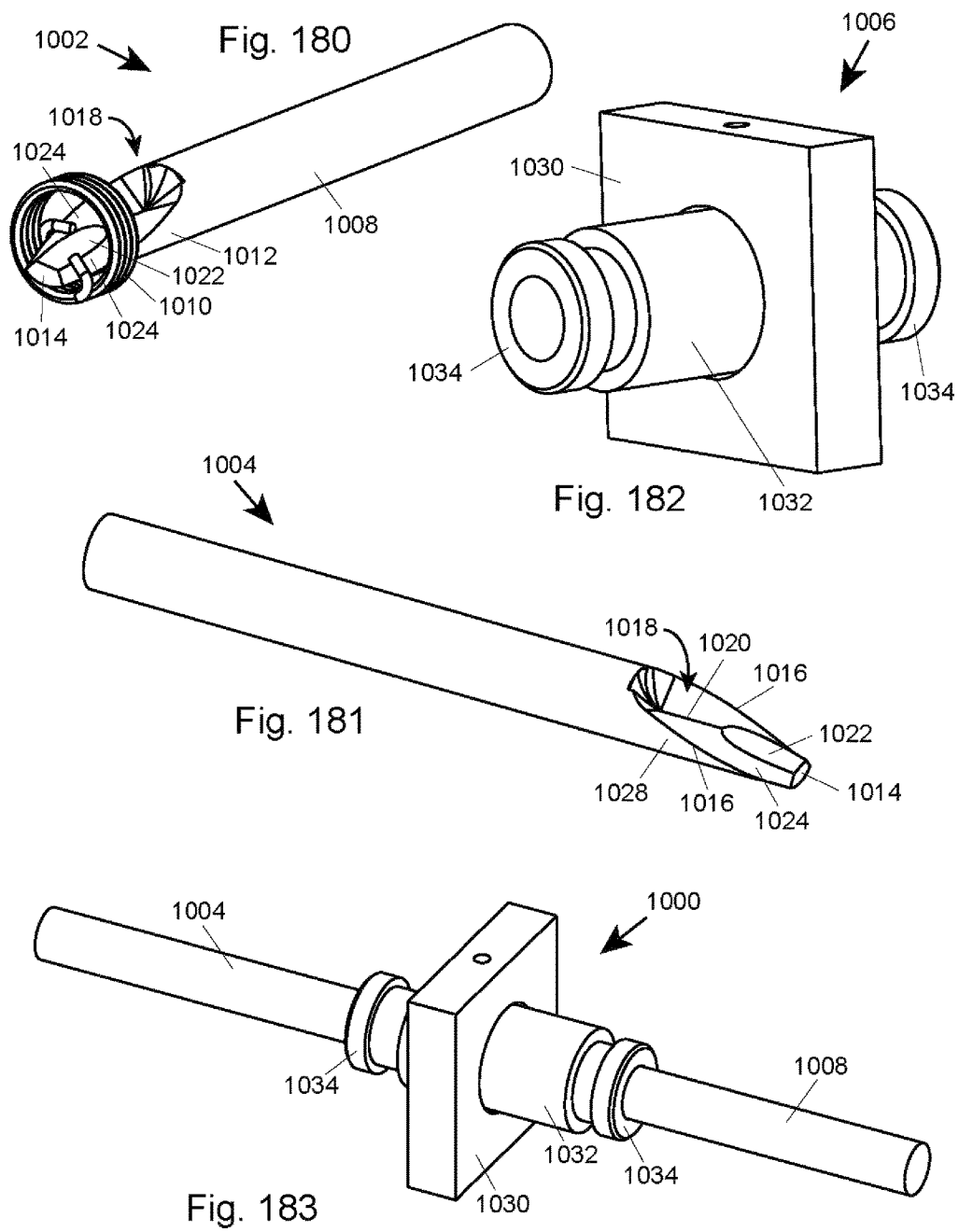

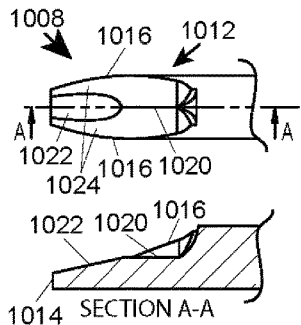
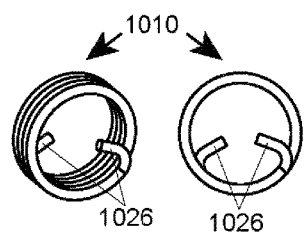
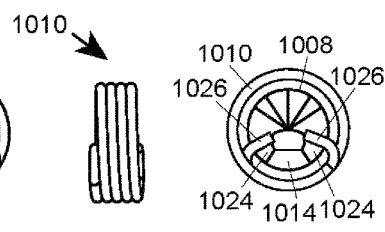
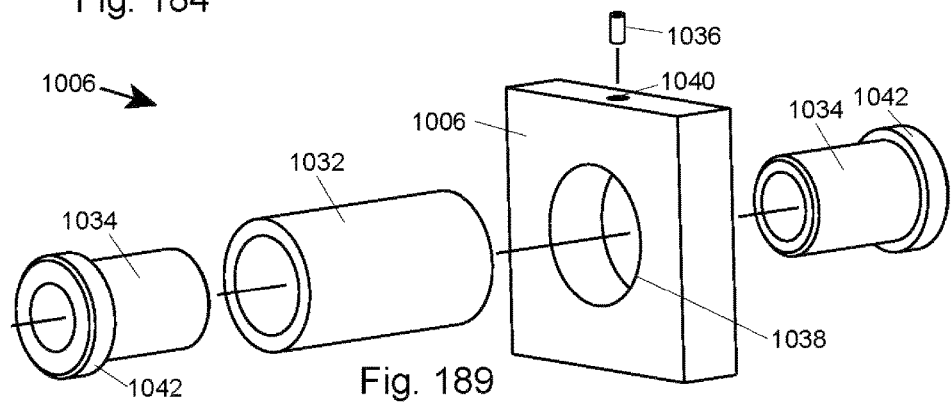
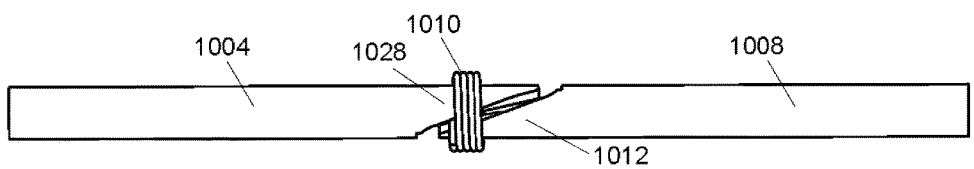
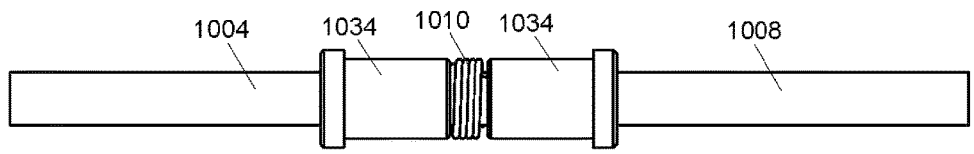

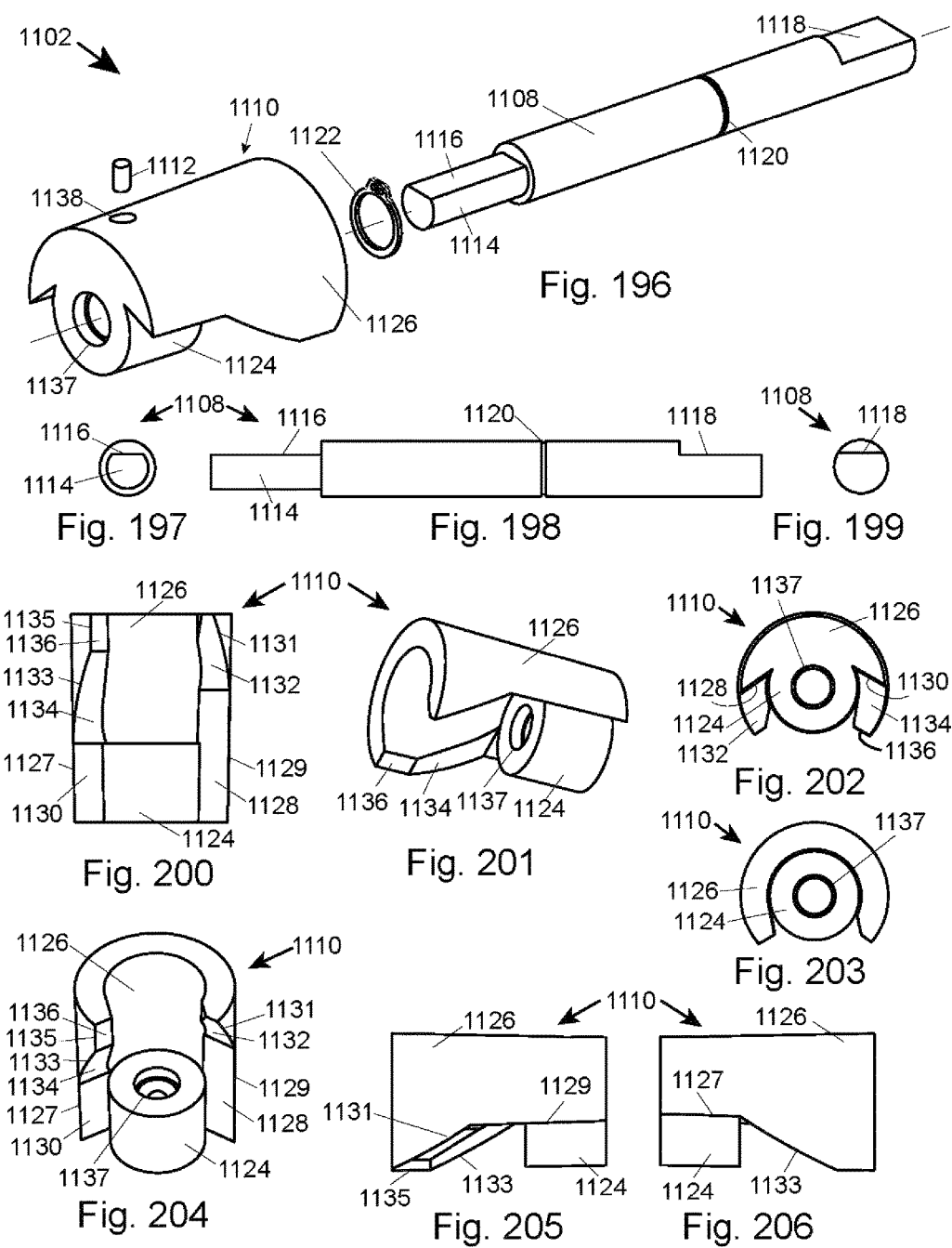

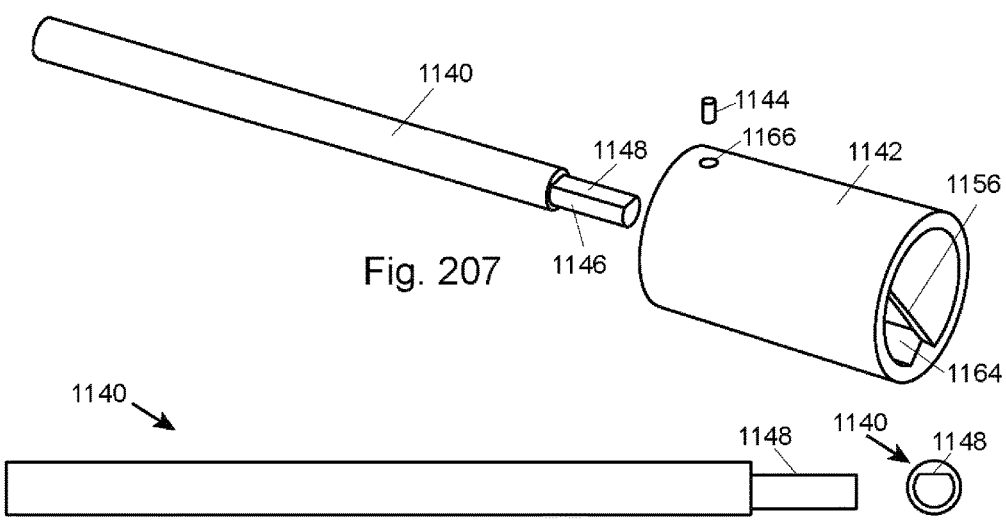
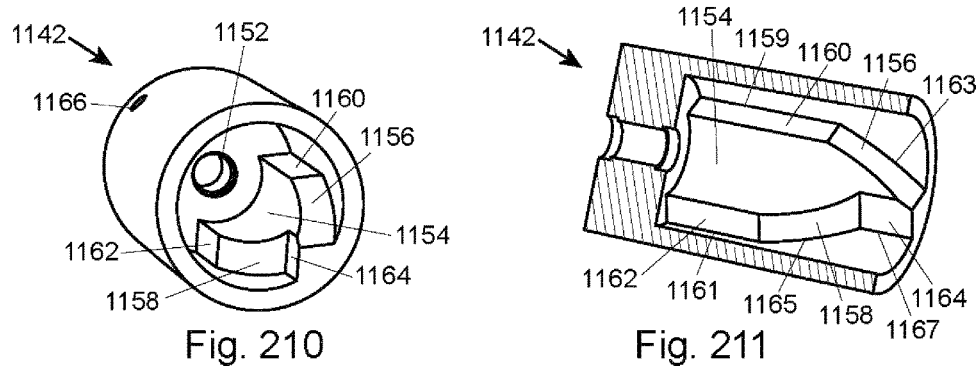
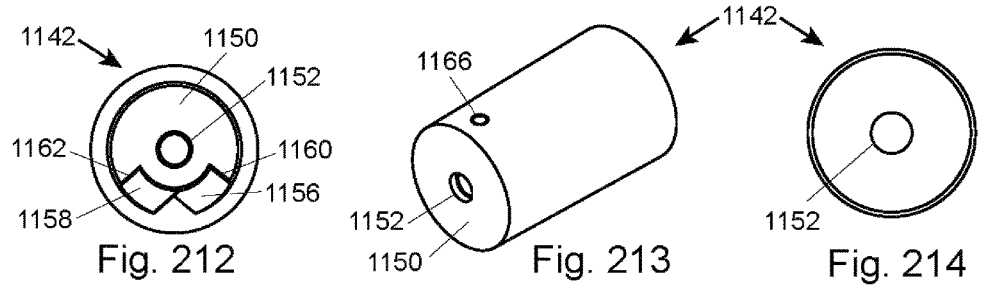

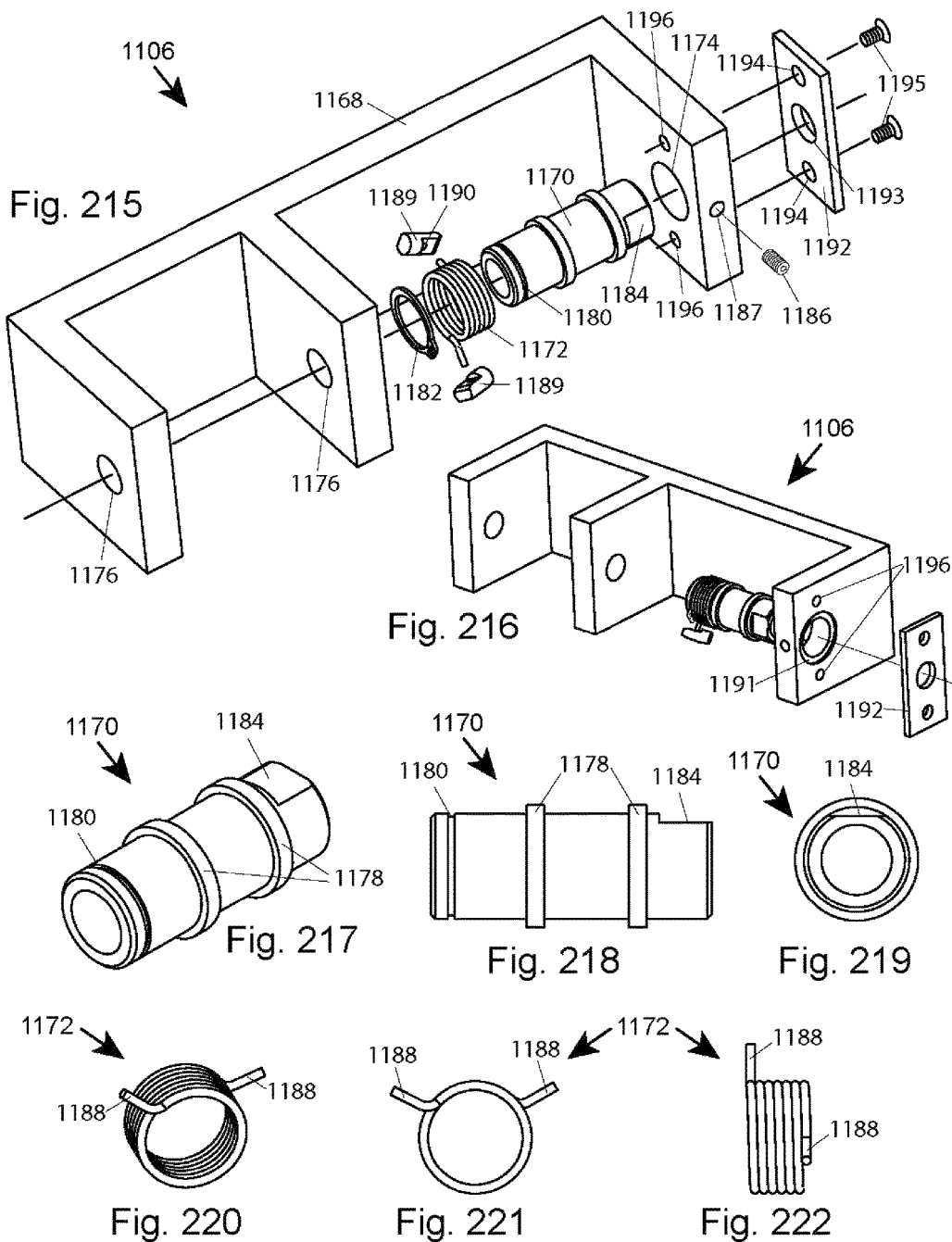

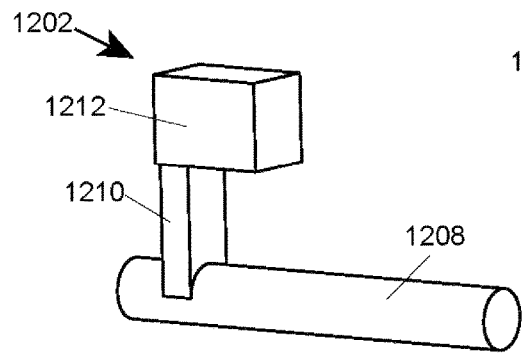
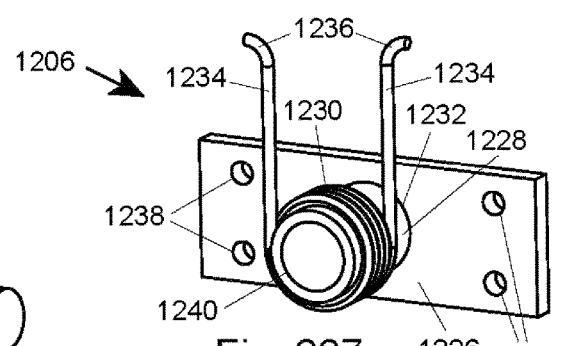
Fig. 225
Fig. 227
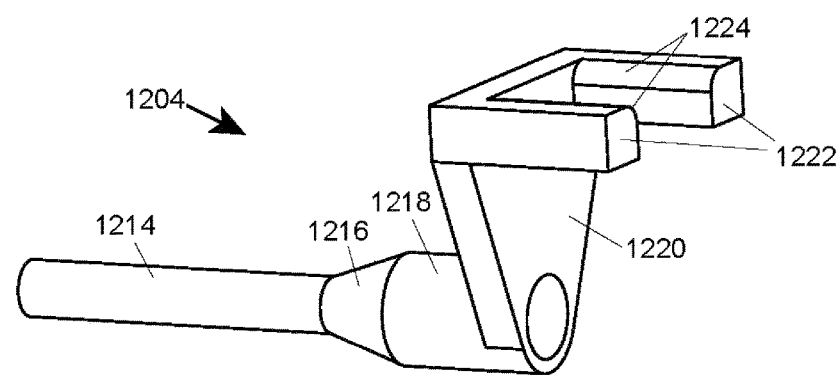
Fig. 226
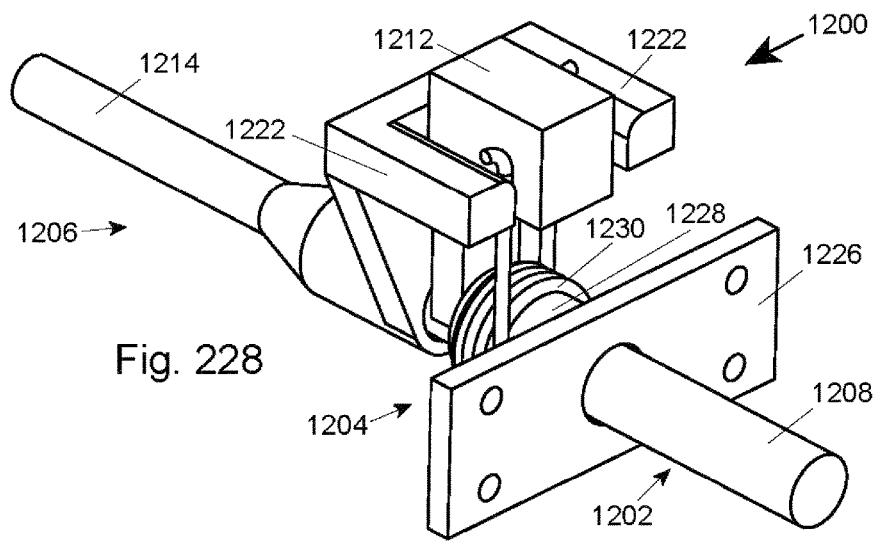
Fig. 228

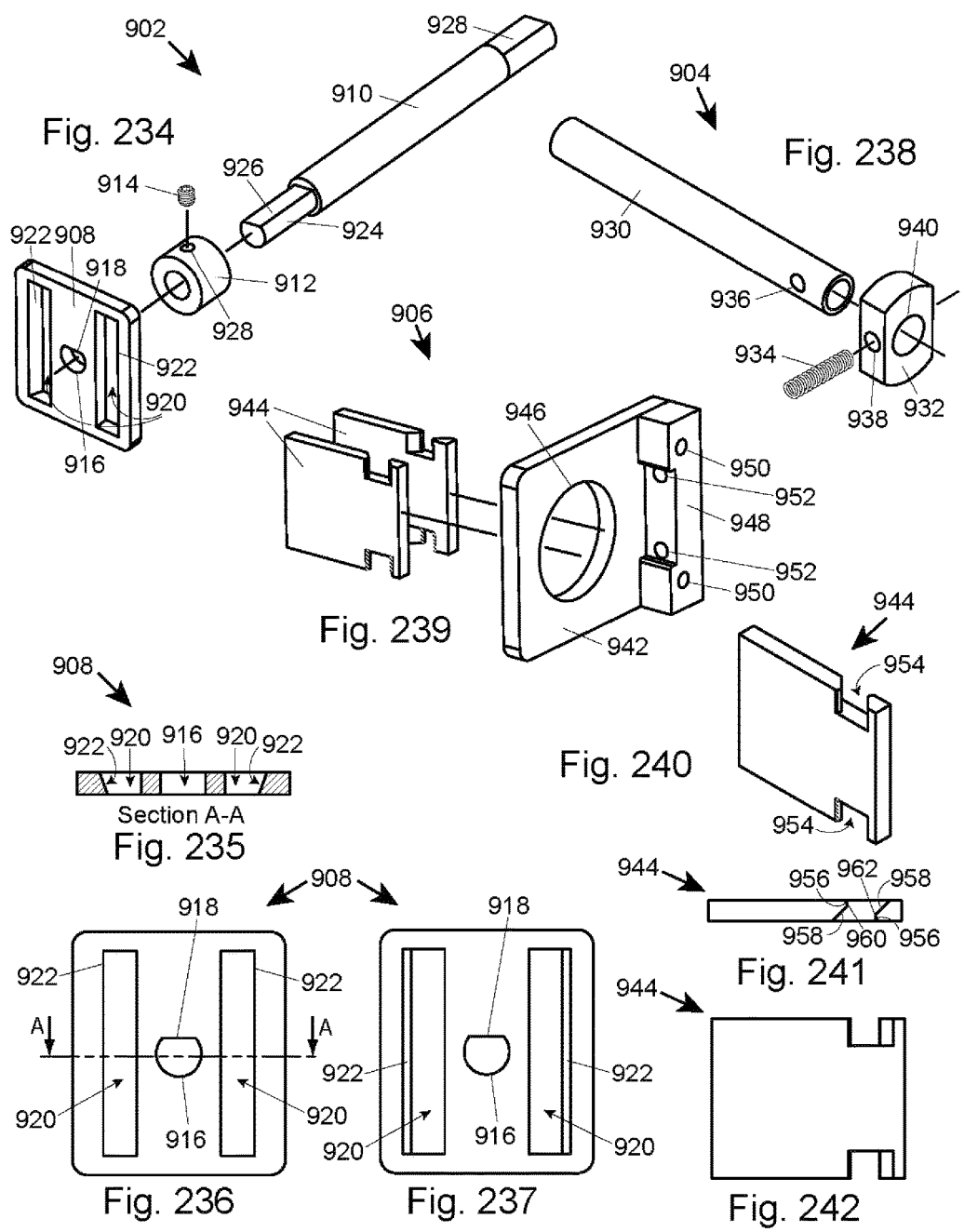

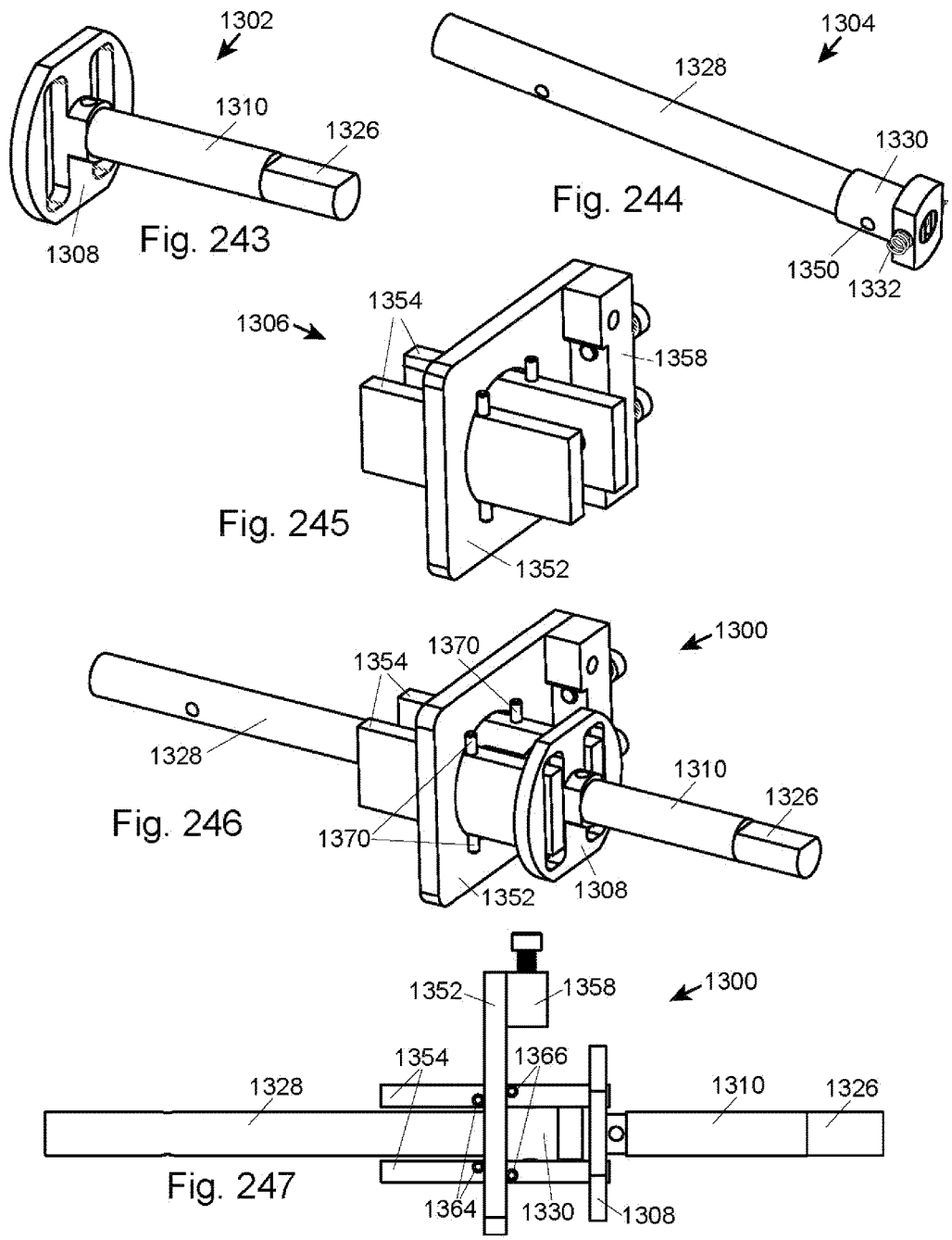

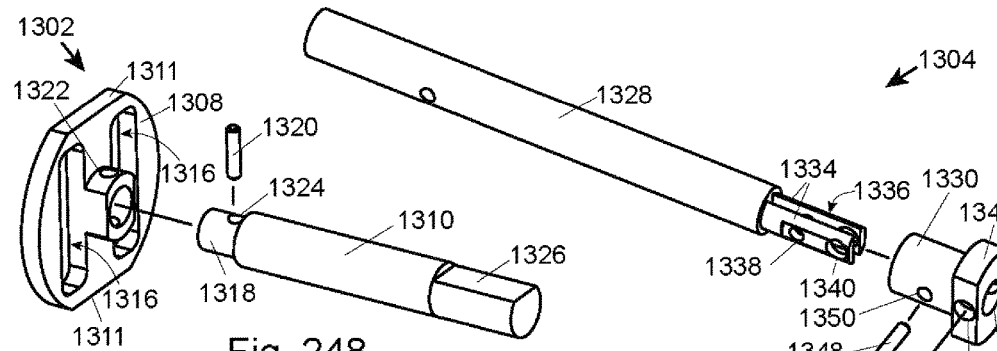
Fig. 248
Fig. 249
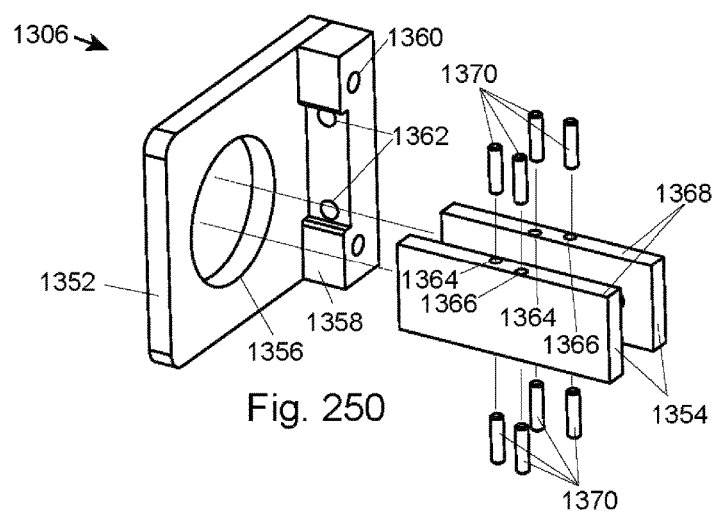
Fig. 250
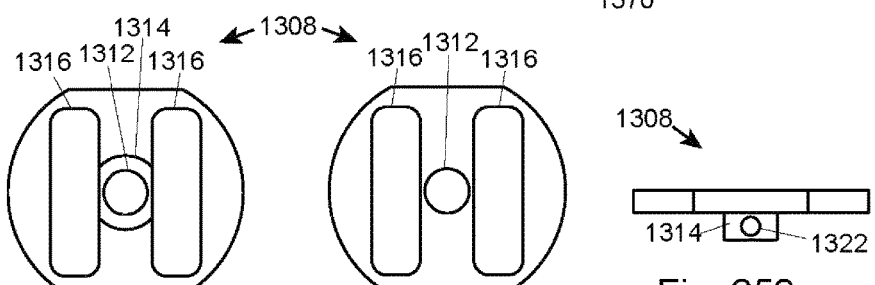
Fig. 251
Fig. 252
Fig. 253

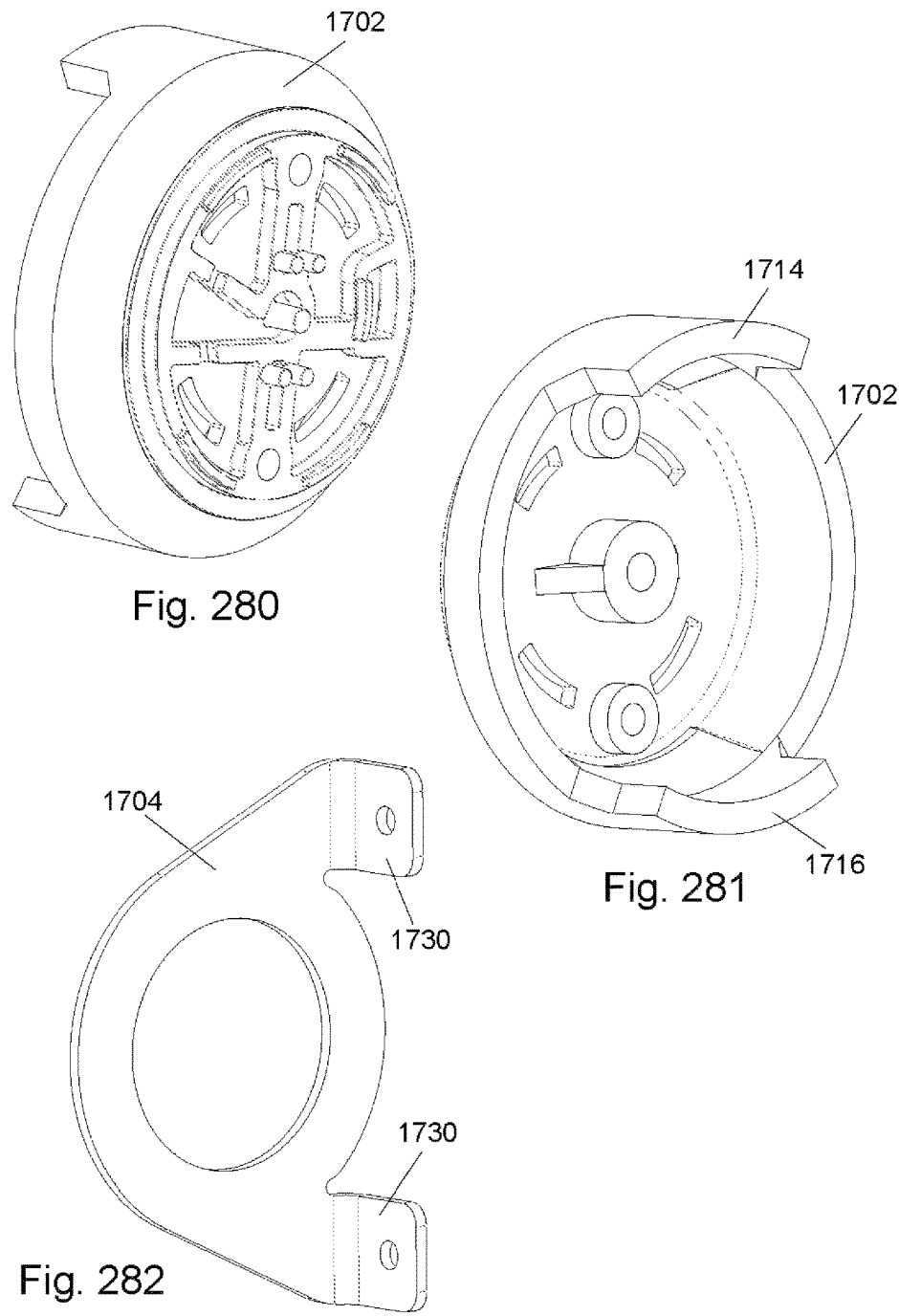

BLADE ELEVATION MECHANISMS AND ANTI-BACKDRIVE MECHANISMS FOR TABLE SAWS

CROSS-REFERENCE TO RELATED APPLICATION

This application is a divisional continuation of U.S. patent application Ser. No. 13/946,315, filed Jul. 19, 2013, which claims the benefit of and priority from U.S. Provisional Patent Application Ser. No. 61/741,461, filed Jul. 20, 2012, both of which are incorporated herein by reference.

TECHNICAL FIELD

The present disclosure relates to table saw mechanisms designed to improve convenience and performance. More specifically, this specification relates to elevation mechanisms used to raise and lower blades on table saws.

BACKGROUND

A table saw is a power tool used to cut a workpiece to a desired size or shape. A table saw includes a work surface or table and a circular blade extending up through the table. A person uses a table saw by placing a piece of wood or other workpiece on the table and feeding it past the spinning blade to make a cut.

Table saws are typically constructed so that a user can adjust the elevation of the blade above the table in order to cut workpieces of varying thicknesses. When making a cut the blade is often raised just high enough to cut through the workpiece so the blade is exposed as little as possible in case of an accident. Often table saws include a handwheel that turns gears to raise and lower the blade. A user simply turns the handwheel clockwise, for example, to raise the blade, and counterclockwise to lower the blade. However, in small table saws such as jobsite and benchtop saws, handwheels typically must be turned many times to move the blade from a fully retracted position to a fully elevated position. For example, a handwheel might have to be turned approximately twenty, thirty or even forty revolutions to move the blade through its full range of elevation. This is a time consuming and inconvenient process.

This disclosure describes several elevation mechanisms, many of which enable a user to raise or lower the blade by turning the handle only one revolution or only a relatively small number of revolutions.

BRIEF DESCRIPTION OF THE DRAWINGS

FIG. 3 shows an input assembly incorporating the release plate of the anti-backdrive mechanism of FIG. 2 attached to an input shaft.

FIG. 4 shows an output assembly incorporating the flange and ramp plates of the anti-backdrive mechanism of FIG. 2 attached to an output shaft.

FIG. 5 shows a fixed assembly incorporating the vertical plate of the anti-backdrive mechanism of FIG. 2.

FIG. 6 shows the input assembly of FIG. 3, the output assembly of FIG. 4 and the fixed assembly of FIG. 5 assembled together.

FIG. 7 shows a perspective view of the release plate in the anti-backdrive mechanism of FIG. 6.

FIG. 8 shows another perspective view of the release plate of FIG. 7.

FIG. 9 shows a front view of the release plate of FIG. 7.

FIG. 10 shows a rear view of the release plate of FIG. 7.

FIG. 11 shows a side view of the release plate of FIG. 7.

FIG. 34 shows a rear view of the ramp plate of the anti-backdrive mechanism of FIG. 6.

FIG. 35 shows a front view of the ramp plate of FIG. 34.

FIG. 36 shows a side view of the ramp plate of FIG. 34.

FIG. 37 shows a perspective view of the ramp plate of FIG. 34.

FIG. 38 shows a cross-sectional view of the ramp plate of FIG. 34, taken along line A-A in FIG. 34, showing ramped surfaces that the locking cylinders shown in FIG. 29 contact.

FIG. 66 shows an input assembly of an anti-backdrive mechanism shown in FIG. 69.

FIG. 67 shows an output assembly of an anti-backdrive mechanism shown in FIG. 69.

FIG. 68 shows a fixed assembly of an anti-backdrive mechanism shown in FIG. 69.

FIG. 69 shows a spring lock anti-backdrive mechanism assembly incorporating the input assembly of FIG. 66, the output assembly of FIG. 67 and the fixed assembly of FIG. 68.

FIG. 84 shows an input assembly of an anti-backdrive mechanism shown in FIG. 87.

FIG. 85 shows an output assembly of an anti-backdrive mechanism shown in FIG. 87.

FIG. 86 shows a fixed assembly of an anti-backdrive mechanism shown in FIG. 87.

FIG. 87 shows an anti-backdrive mechanism assembly incorporating the input assembly of FIG. 84, the output assembly of FIG. 85 and the fixed assembly of FIG. 86.

FIG. 93 shows an exploded view of the output assembly of FIG. 85.

FIG. 94 shows a perspective view of the output hinge of the anti-backdrive mechanism of FIG. 87.

FIG. 95 shows a top view of the output hinge of the anti-backdrive mechanism of FIG. 87.

FIG. 96 shows a side view of the output hinge of the anti-backdrive mechanism of FIG. 87.

FIG. 97 shows a front view of the output hinge of the anti-backdrive mechanism of FIG. 87.

FIG. 120 shows an exploded view of the fixed assembly of FIG. 108.

FIG. 121 shows a side view of a plate of the fixed assembly of FIG. 108 isolated.

FIG. 122 shows an edge view of a plate of the fixed assembly of FIG. 108 isolated.

FIG. 123 shows the input assembly of FIG. 106 installed in the fixed assembly 108.

FIG. 124 shows a rear view of the fixed assembly of FIG. 108 installed on the output assembly of FIG. 107.

FIG. 125 shows a rear view of the input hinge, output hinge, plates and springs of the anti-backdrive mechanism of FIG. 109.

FIG. 126 shows a rear view of the input hinge, output hinge, fixed cylinder, plates and springs of the anti-backdrive mechanism of FIG. 109 in the default configuration with the output hinge transparent.

FIG. 127 shows the view of FIG. 126 with markings that show the direction that two plates would tend to rotate when the output hinge starts to rotate.

FIG. 128 shows the view of FIG. 126 with markings that show the direction that two plates would tend to rotate when the input hinge starts to rotate.

FIG. 129 shows a rear view of the input hinge, output hinge, fixed cylinder, plates and springs of the anti-backdrive mechanism of FIG. 109 with two of the plates rotated to a new position by the input hinge.

FIG. 130 shows the view of FIG. 129 with markings that show the direction that two plates would tend to rotate as the input hinge is further rotated.

FIG. 131 shows a rear view of the input hinge, output hinge, plates and springs of the anti-backdrive mechanism of FIG. 109 in a released or unlocked state with all four plates rotated and with markings that show the rotation of the input hinge, output hinge and plates.

FIG. 132 shows an input assembly of an anti-backdrive mechanism shown in FIG. 135.

FIG. 133 shows an output assembly of an anti-backdrive mechanism shown in FIG. 135.

FIG. 134 shows a fixed assembly of an anti-backdrive mechanism shown in FIG. 135.

FIG. 135 shows an anti-backdrive mechanism assembly incorporating the input assembly of FIG. 132, the output assembly of FIG. 133 and the fixed assembly of FIG. 134.

Figure 136:
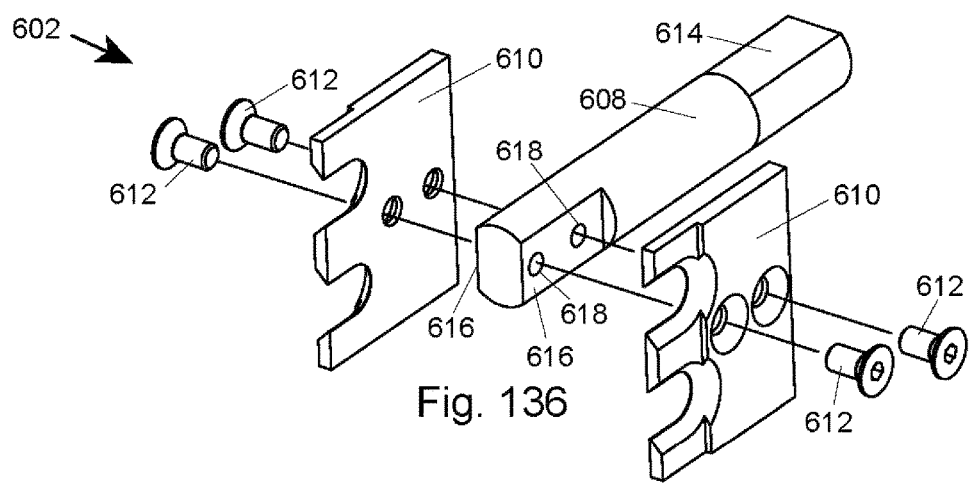

FIG. 136 shows an exploded view of the input assembly of FIG. 132.

Figure 137:
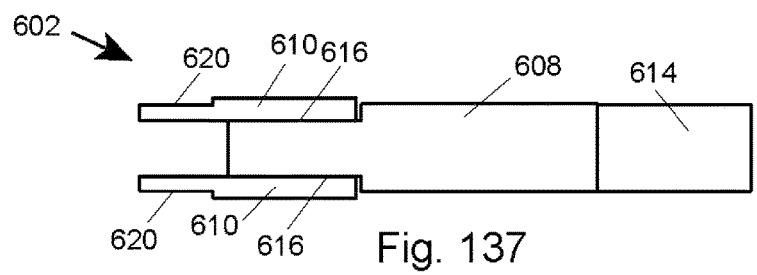

FIG. 137 shows a top view of the input assembly of FIG. 132.

Figures 138, 139, 140:
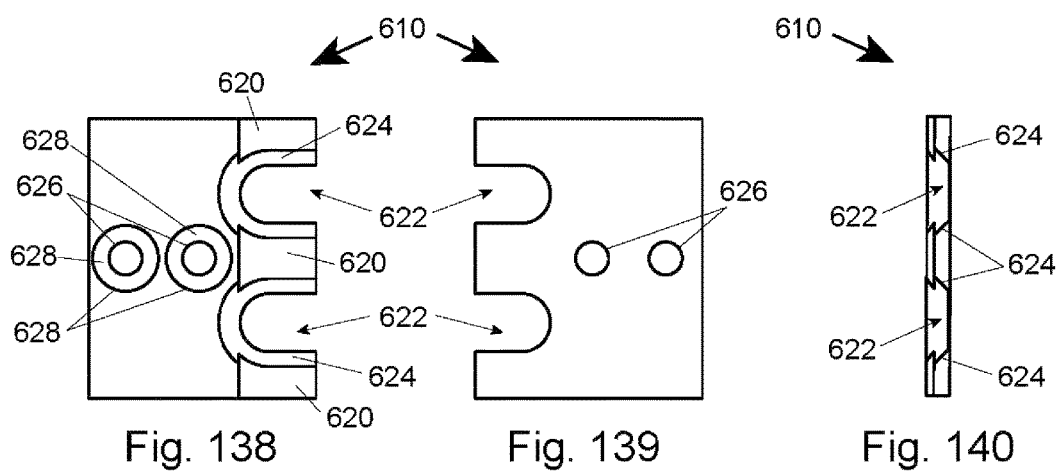

FIG. 138 shows a side view of the right input shaft plate of the input assembly of FIG. 132.

FIG. 139 shows another side view of the input shaft plate of FIG. 138.

FIG. 140 shows a front view of the input shaft plate of FIG. 138.

Figure 141:
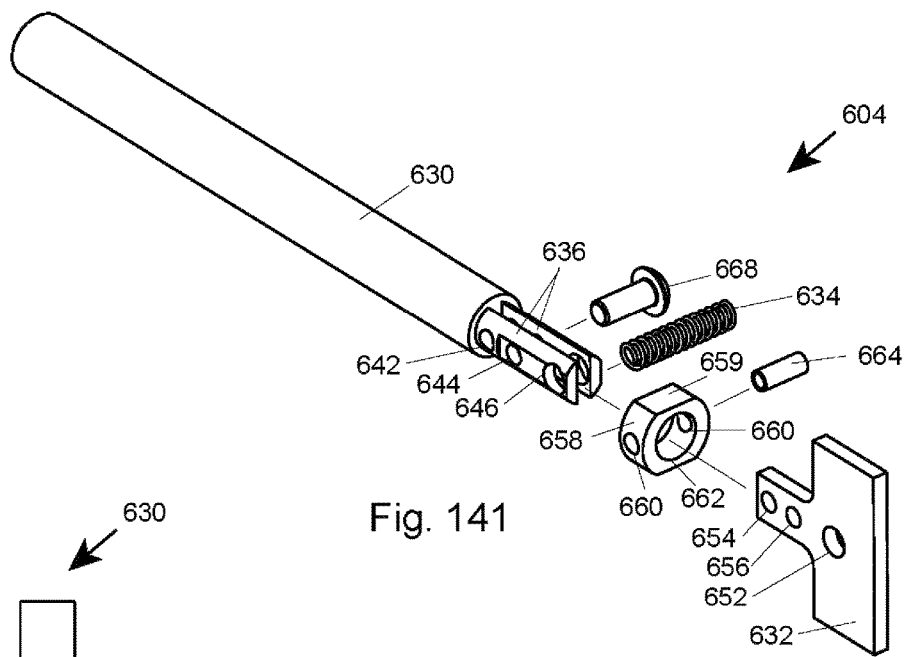

FIG. 141 shows an exploded view of the output assembly of FIG. 133.

Figures 142, 145, 146:
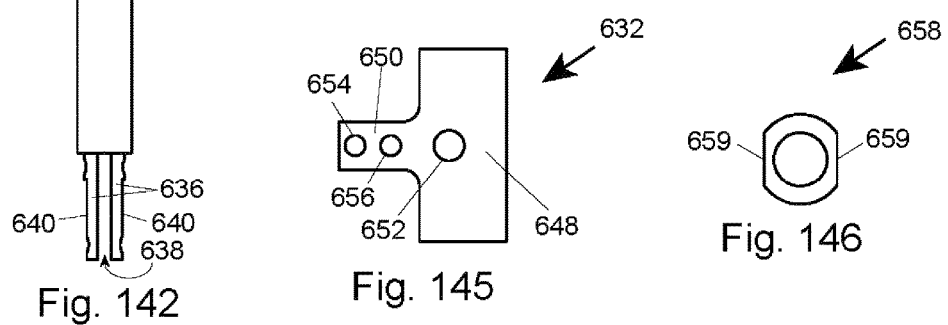

FIG. 142 shows an top view of the output shaft in the output assembly of FIG. 133.

Figures 143, 144:
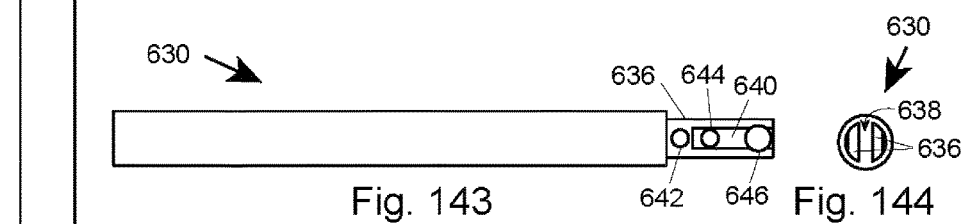

FIG. 143 shows a side view of the output shaft in the output assembly of FIG. 133.

FIG. 144 shows a front view of the output shaft in the output assembly of FIG. 133.

FIG. 145 shows a side view of the output shaft plate in the output assembly of FIG. 133.

FIG. 146 shows a front view of the collar in the output assembly of FIG. 133.

Figure 147:
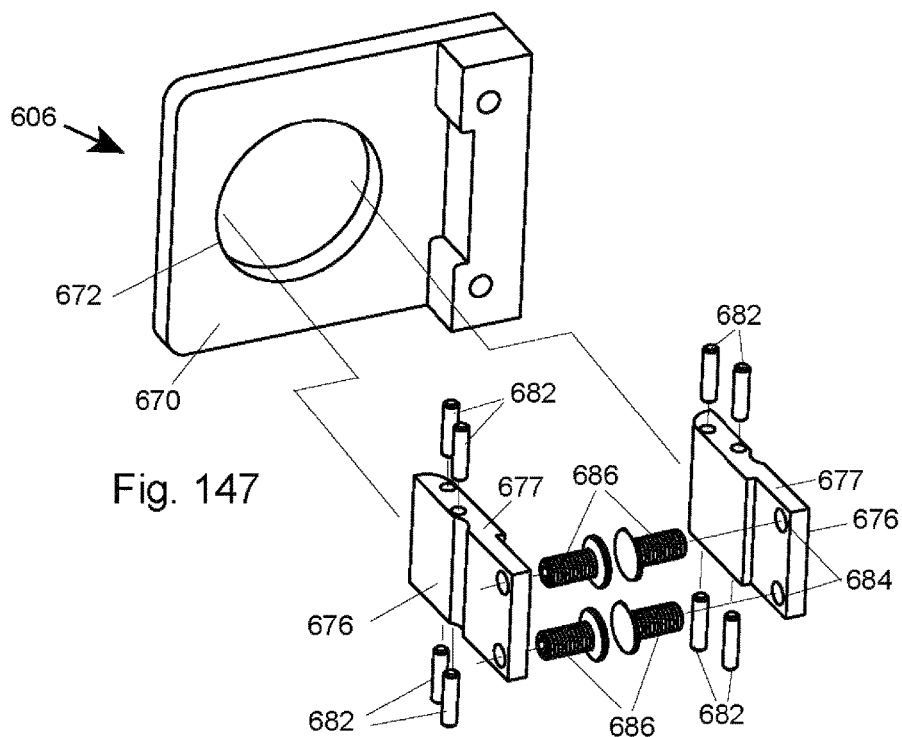

FIG. 147 shows an exploded view of the fixed assembly of FIG. 134.

Figure 148:
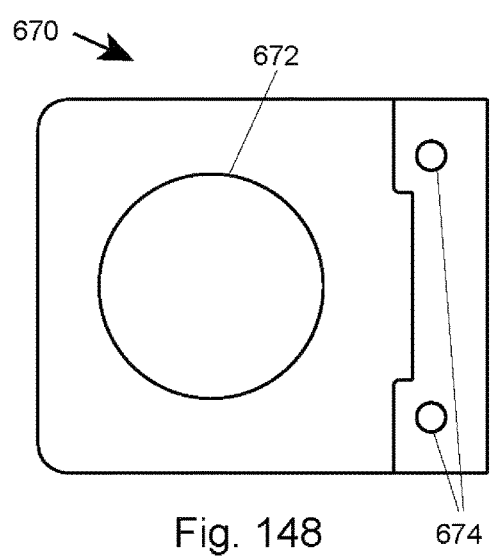

FIG. 148 shows a front view of the brake plate in the fixed assembly of FIG. 134.

Figure 149:
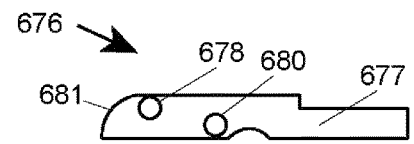

FIG. 149 shows a top view of a rotating plate in the fixed assembly of FIG. 134.

Figure 150:
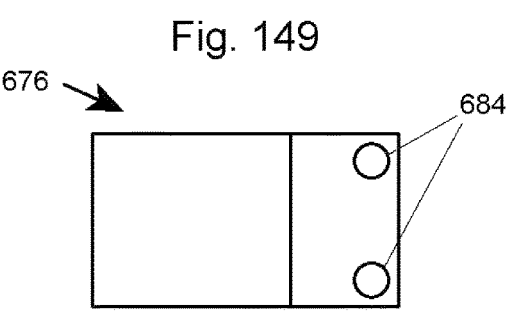

FIG. 150 shows a side view of a rotating plate in the fixed assembly of FIG. 134.

Figure 151:
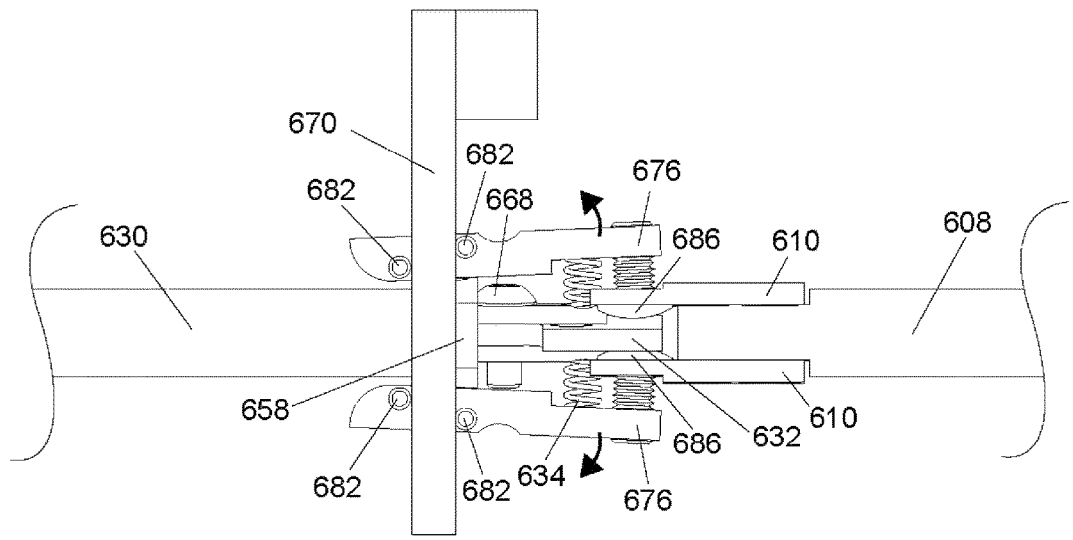

FIG. 151 shows a top view of the anti-backdrive mechanism of FIG. 135 in a locked configuration with the output shaft slightly rotated and the rotating plates spread apart.

Figure 152:
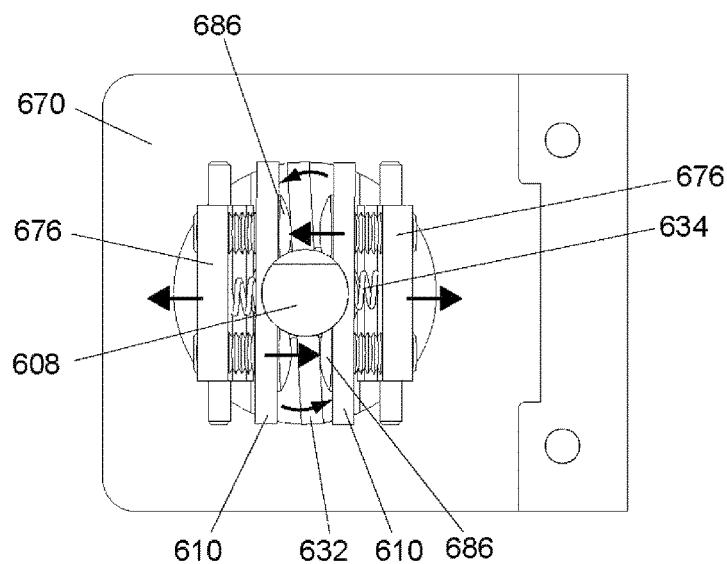

FIG. 152 shows a front view of the anti-backdrive mechanism in the locked configuration shown in FIG. 151.

Figure 153:
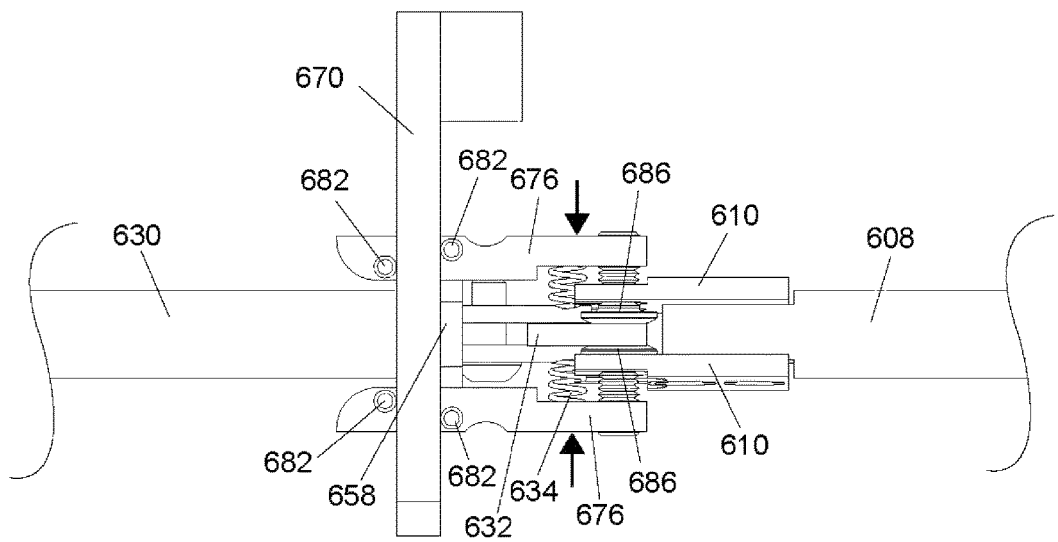

FIG. 153 shows a top view of the anti-backdrive mechanism of FIG. 135 in an unlocked, or released, configuration with the input shaft slightly rotated and the rotating plates perpendicular to the brake plate.

Figure 154:
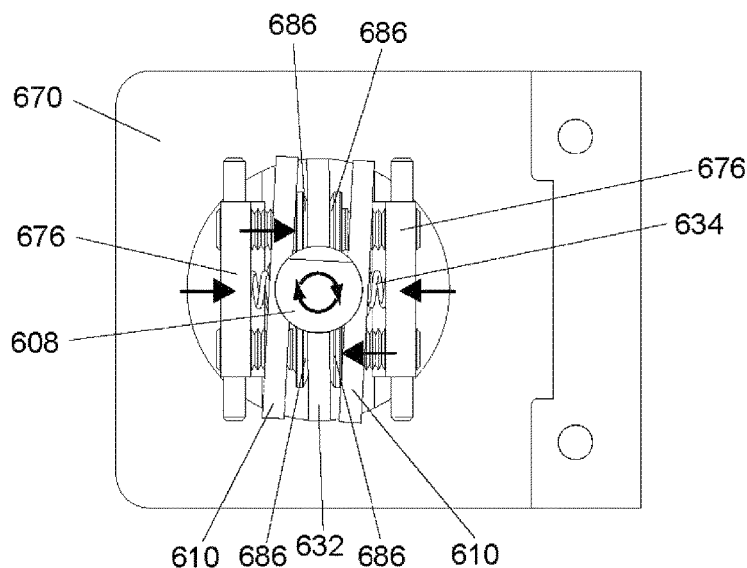

FIG. 154 shows a front view of the anti-backdrive mechanism in the unlocked configuration shown in FIG. 153.

Figure 155:
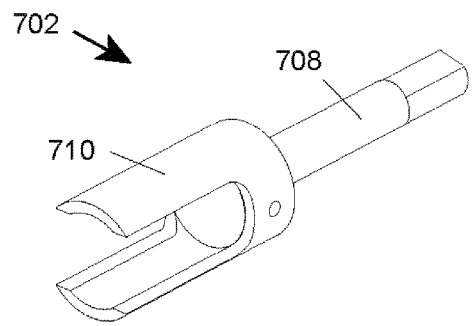
Figure 158:
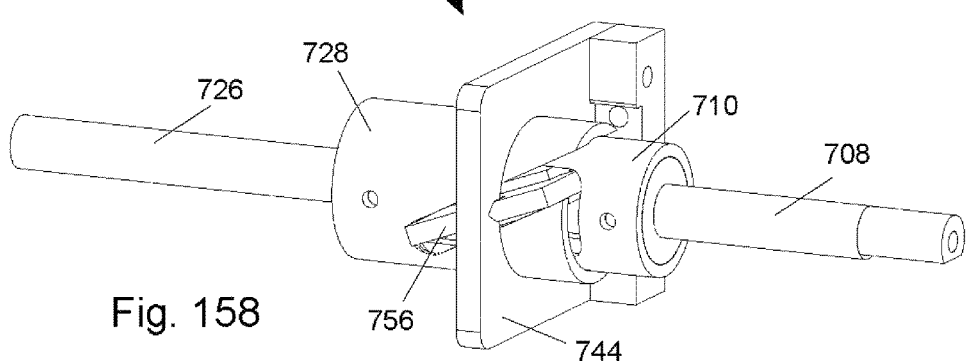

FIG. 155 shows an input assembly of an anti-backdrive mechanism shown in FIG. 158.

Figure 156:
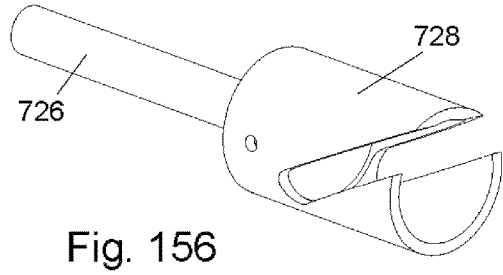

FIG. 156 shows an output assembly of an anti-backdrive mechanism shown in FIG. 158.

Figure 157:
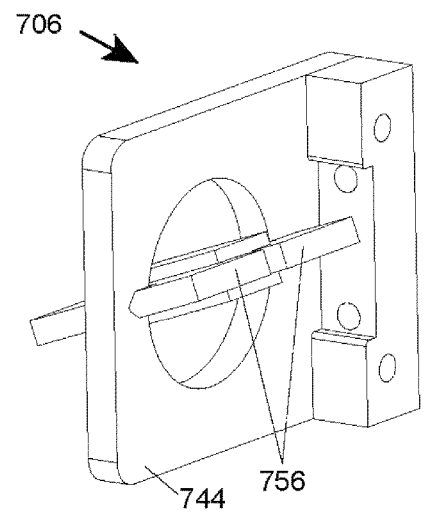

FIG. 157 shows a fixed assembly of an anti-backdrive mechanism shown in FIG. 158.

FIG. 158 shows an anti-backdrive mechanism assembly incorporating the input assembly of FIG. 155, the output assembly of FIG. 156 and the fixed assembly of FIG. 157.

FIG. 159 shows an exploded view of the input assembly of FIG. 155.

FIG. 160 shows a side view of the input cylinder of the input assembly shown in FIG. 155.

FIG. 161 shows a top view of the input cylinder of the input assembly shown in FIG. 155.

FIG. 162 shows a font view of the input cylinder of the input assembly shown in FIG. 155.

Figure 163:
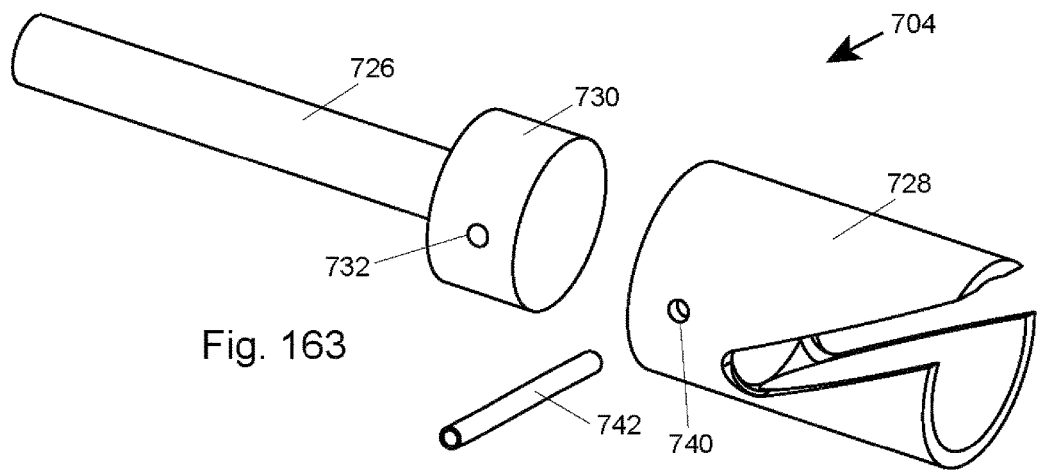

FIG. 163 shows an exploded view of the output assembly of FIG. 156.

Figures 164, 166:
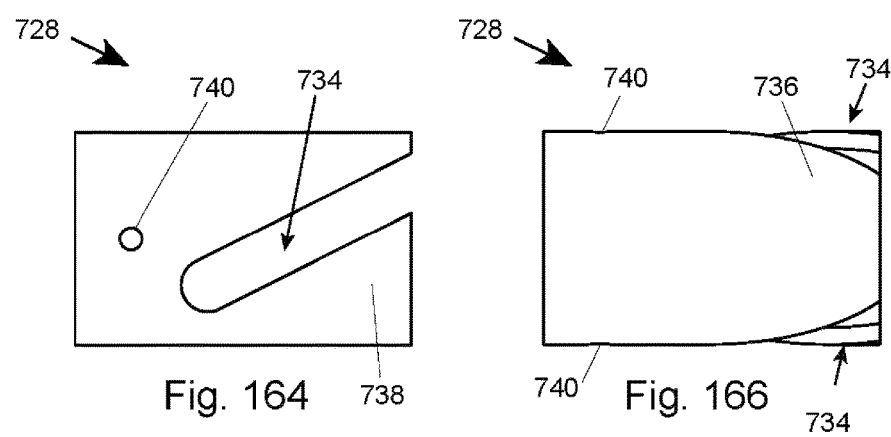

FIG. 164 shows a side view of the output cylinder of the input assembly shown in FIG. 156.

Figures 165, 167:
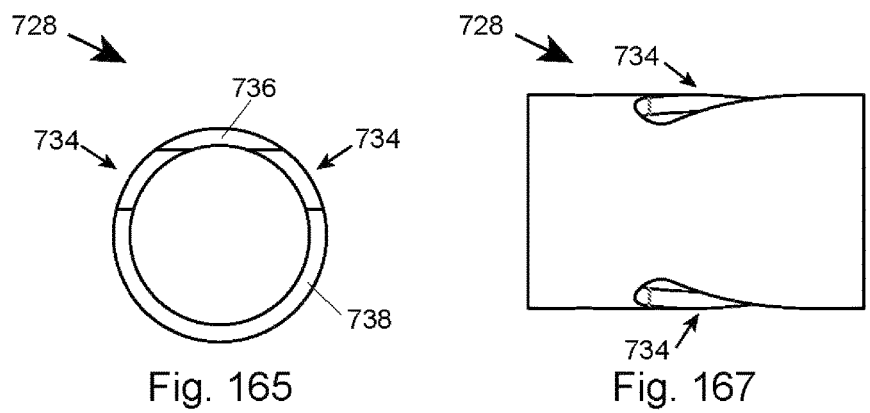

FIG. 165 shows a font view of the output cylinder of the input assembly shown in FIG. 156.

FIG. 166 shows a top view of the output cylinder of the input assembly shown in FIG. 156.

FIG. 167 shows a bottom view of the output cylinder of the input assembly shown in FIG. 156.

Figure 168:
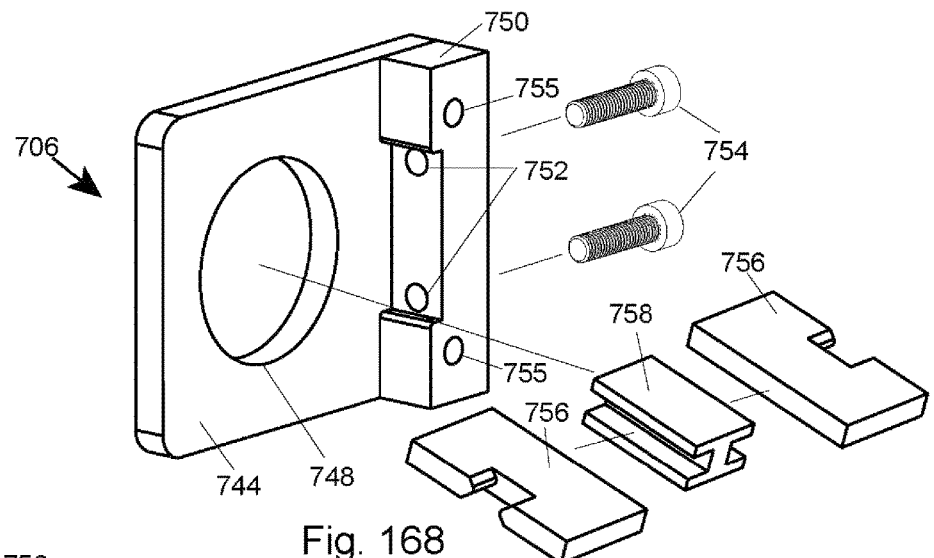

FIG. 168 shows an exploded view of the fixed assembly of FIG. 157.

Figure 169:
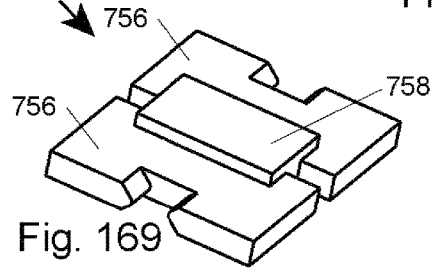

FIG. 169 shows a perspective view of the movable plate assembly of the fixed assembly of FIG. 157.

Figure 170:
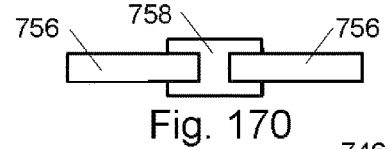

FIG. 170 shows a side view of the movable plate assembly of FIG. 169.

Figure 171:
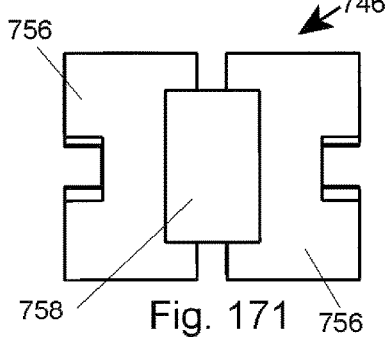

FIG. 171 shows a top view of the movable plate assembly of FIG. 169.

Figure 172:
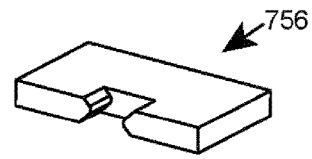

FIG. 172 shows a perspective view of one of the rectangular slab of the movable plate assembly of FIG. 169.

Figure 173:
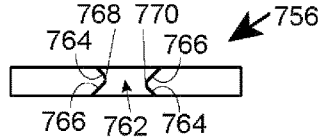

FIG. 173 shows a side view of the rectangular slab of FIG. 172.

Figure 174:
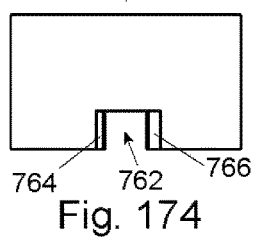

FIG. 174 shows a top view of the rectangular slab of FIG. 172.

Figure 175:
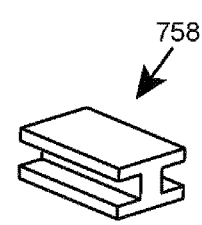

FIG. 175 shows a perspective view of the H block of the movable plate assembly of FIG. 169.

Figure 176:
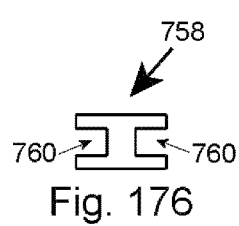

FIG. 176 shows a side view of the H block of FIG. 175.

Figure 177:
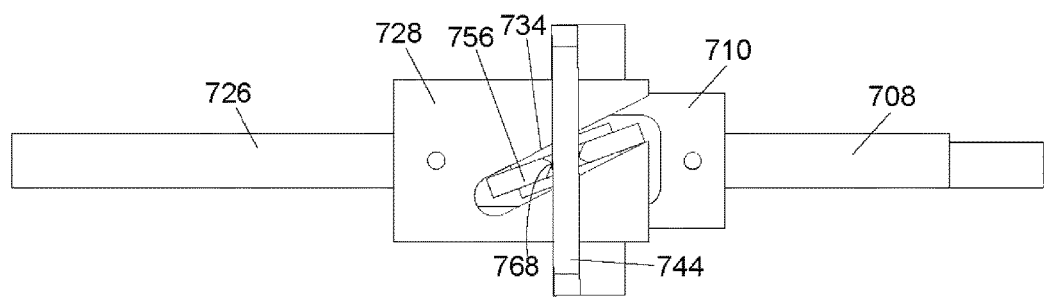

FIG. 177 shows a side view of the anti-backdrive mechanism assembly of FIG. 158.

Figure 178:
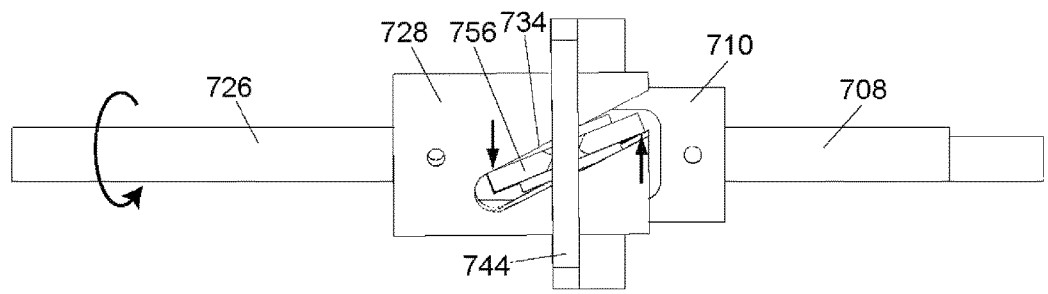

FIG. 178 shows a side view of the anti-backdrive mechanism assembly of FIG. 158 with the output shaft slightly rotated.

Figure 179:
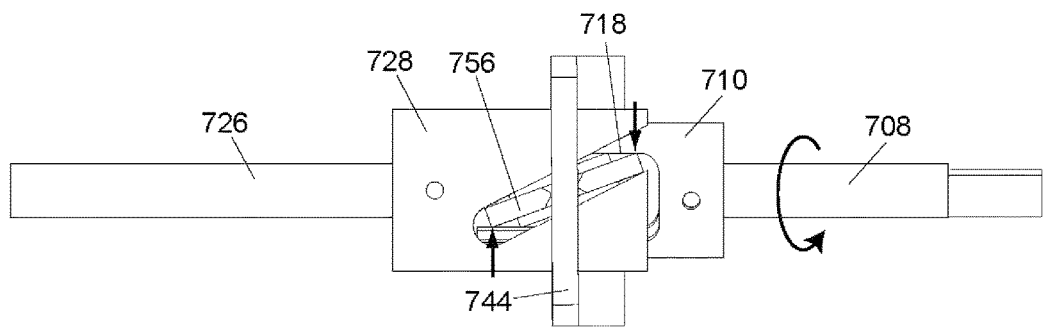

FIG. 179 shows a side view of the anti-backdrive mechanism assembly of FIG. 158 with the input shaft slightly rotated.

FIG. 180 shows the input assembly of an anti-backdrive mechanism shown in FIG. 183.

FIG. 181 shows the output assembly of an anti-backdrive mechanism shown in FIG. 183.

FIG. 182 shows the fixed assembly of an anti-backdrive mechanism shown in FIG. 183.

FIG. 183 shows an anti-backdrive mechanism assembly incorporating the input assembly of FIG. 180, the output assembly of FIG. 181 and the fixed assembly of FIG. 182.

FIG. 184 shows a cross-sectional view of one end of the input shaft in the input assembly of FIG. 180.

FIG. 185 shows a perspective view of the spring in the input assembly of FIG. 180.

FIG. 186 shows a front view of the spring in the input assembly of FIG. 180.

FIG. 187 shows a side view of the spring in the input assembly of FIG. 180.

FIG. 188 shows a rear view of the input assembly of FIG. 180 where the spring can be seen wrapped around the end of the input shaft.

FIG. 189 shows an exploded view of the fixed assembly of FIG. 182.

FIG. 190 shows a side view of the input assembly of FIG. 180 along with the output shaft of the output assembly of FIG. 181.

FIG. 191 shows a side view of the input assembly of FIG. 180 along with the output shaft of the output assembly of FIG. 181 and the fixed assembly of FIG. 182.

Figure 192:
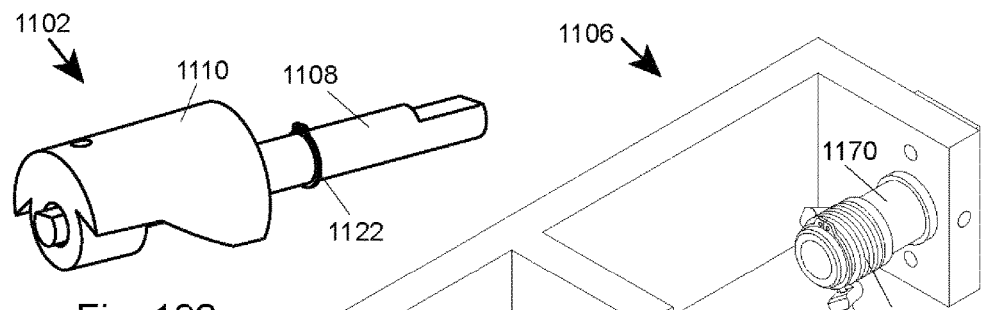

FIG. 192 shows the input assembly of an anti-backdrive mechanism shown in FIG. 183.

Figure 193:
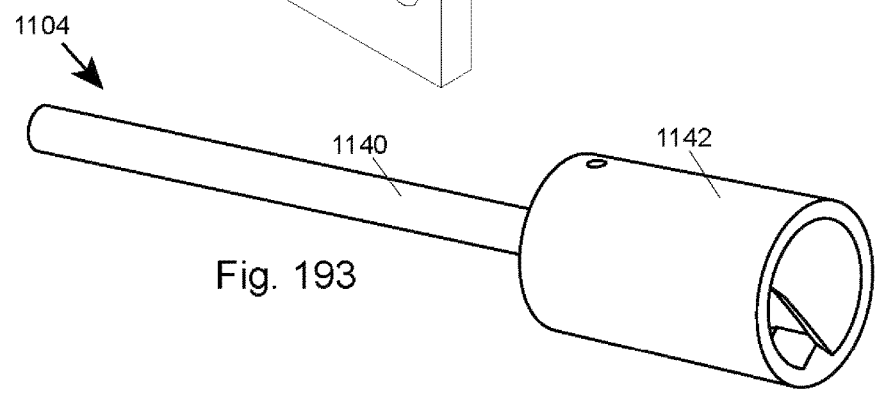

FIG. 193 shows the output assembly of an anti-backdrive mechanism shown in FIG. 183.

Figure 194:
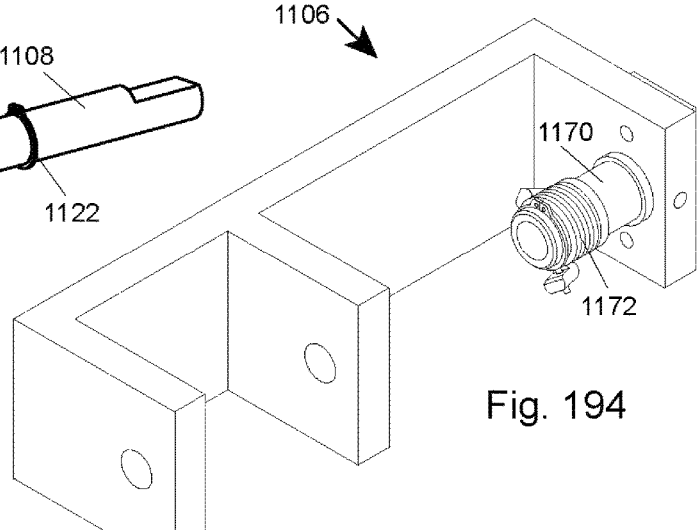

FIG. 194 shows the fixed assembly of an anti-backdrive mechanism shown in FIG. 183.

Figure 195:
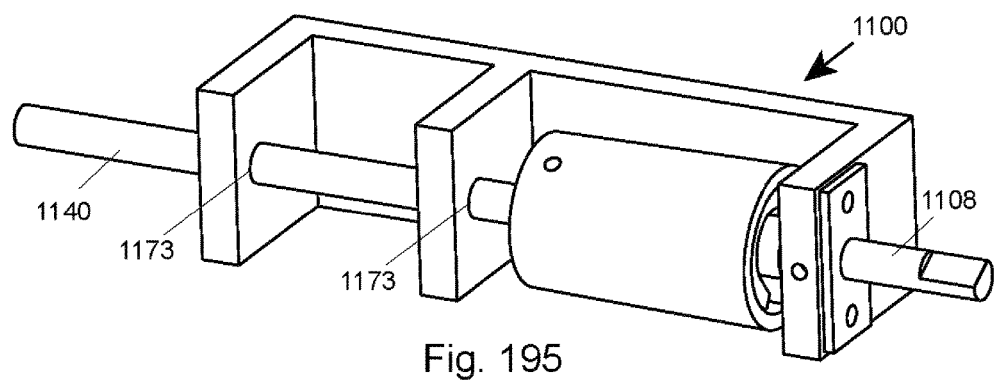

FIG. 195 shows an anti-backdrive mechanism assembly incorporating the input assembly of FIG. 192, the output assembly of FIG. 193 and the fixed assembly of FIG. 194.

FIG. 196 shows an exploded view of the input assembly of FIG. 192.

FIG. 197 shows a rear view of the input shaft of the input assembly of FIG. 192.

FIG. 198 shows a side view of the input shaft of the input assembly of FIG. 192.

FIG. 199 shows a front view of the input shaft of the input assembly of FIG. 192.

FIG. 200 shows a view of the open side of the output engager of the input assembly of FIG. 192.

FIG. 201 shows a perspective view of the input engager of the input assembly of FIG. 192.

FIG. 202 shows a rear view of the input engager of the input assembly of FIG. 192.

FIG. 203 shows a front view of the input engager of the input assembly of FIG. 192.

FIG. 204 shows another perspective view of the input engager of the input assembly of FIG. 192.

FIG. 205 shows a side view of the input engager of the input assembly of FIG. 192.

FIG. 206 shows another side view of the output engager of the input assembly of FIG. 192.

FIG. 207 shows an exploded view of the output assembly of FIG. 193.

FIG. 208 shows a side view of the output shaft of the output assembly of FIG. 193.

FIG. 209 shows a front view of the output shaft of the output assembly of FIG. 193.

FIG. 210 shows a perspective view of the output engager of the output assembly of FIG. 193.

FIG. 211 shows a cross-sectional view of the output engager of the output assembly of FIG. 193.

FIG. 212 shows front view of the output engager of the output assembly of FIG. 193.

FIG. 213 shows another perspective view of the output engager of the output assembly of FIG. 193.

FIG. 214 shows a rear view of the output engager of the output assembly of FIG. 193.

FIG. 215 shows an exploded view of the fixed assembly of FIG. 194.

FIG. 216 shows an exploded view of the fixed assembly of FIG. 194 from another perspective.

FIG. 217 shows a perspective view of the fixed cylinder of the fixed assembly of FIG. 194.

FIG. 218 shows a side view of the fixed cylinder of the fixed assembly of FIG. 194.

FIG. 219 shows a front view of the fixed cylinder of the fixed assembly of FIG. 194.

FIG. 220 shows a perspective view of a spring used in the anti-backdrive mechanism of FIG. 195.

FIG. 221 shows a front view of the spring of FIG. 220.

FIG. 222 shows a side view of the spring of FIG. 220.

Figure 223:
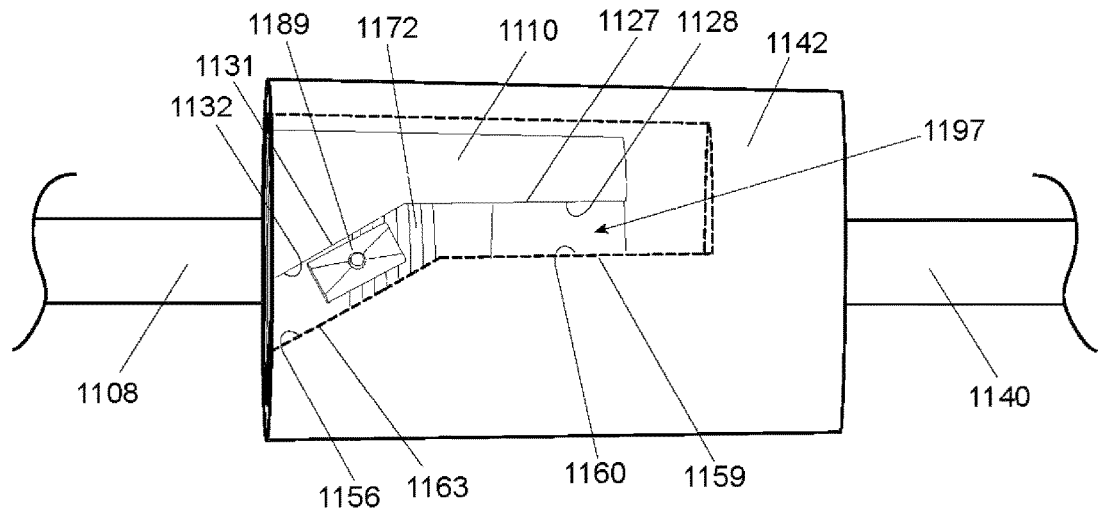

FIG. 223 shows a side of the nested input and output engagers with the output engager transparent so that the contours in the interior of the output engager can be seen along with the input engager and the spring of FIG. 220.

Figure 224:
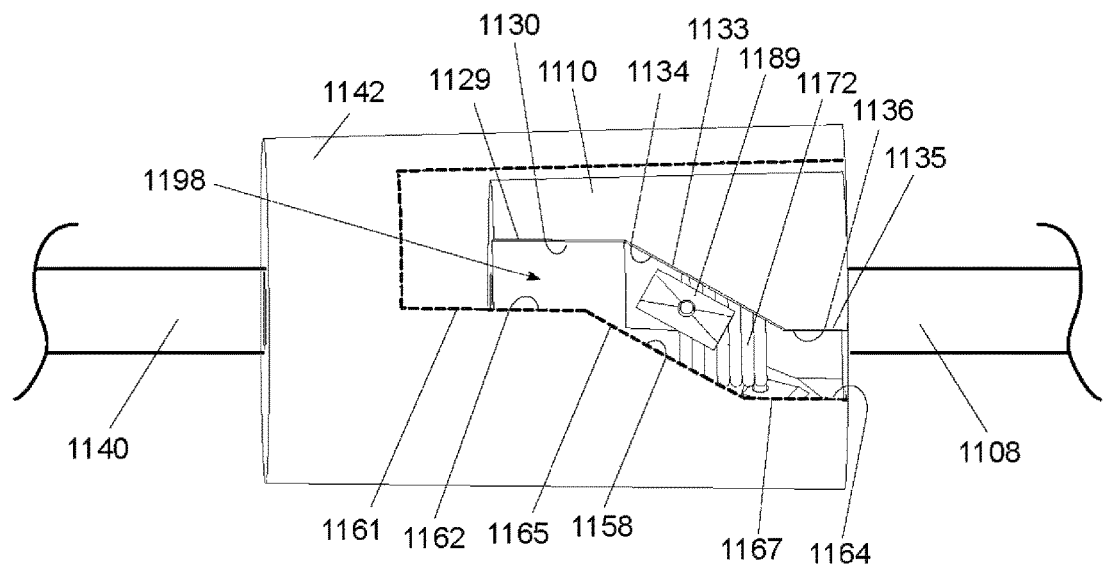

FIG. 224 shows another side of the nested input and output engagers with the output engager transparent so that the contours in the interior of the output engager can be seen along with the input engager and the spring of FIG. 220.

FIG. 225 shows the input assembly of an anti-backdrive mechanism shown in FIG. 228.

FIG. 226 shows the output assembly of an anti-backdrive mechanism shown in FIG. 228.

FIG. 227 shows the fixed assembly of an anti-backdrive mechanism shown in FIG. 228.

FIG. 228 shows an anti-backdrive mechanism assembly incorporating the input assembly of FIG. 225, the output assembly of FIG. 226 and the fixed assembly of FIG. 227.

Figures 229, 230, 231:
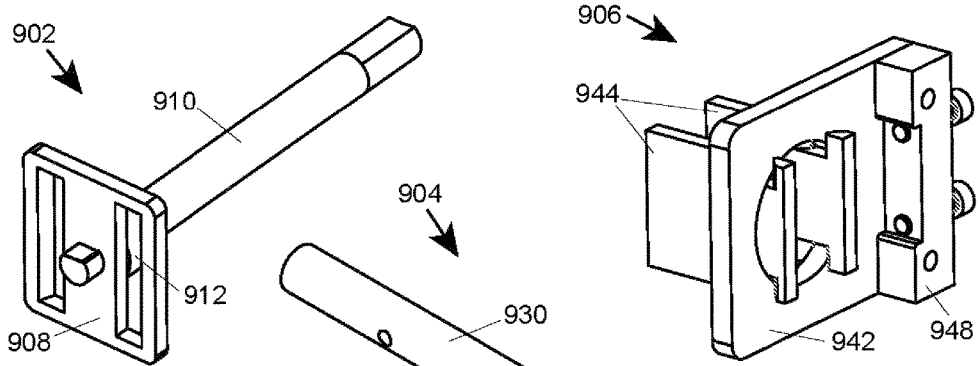
Figure 232:
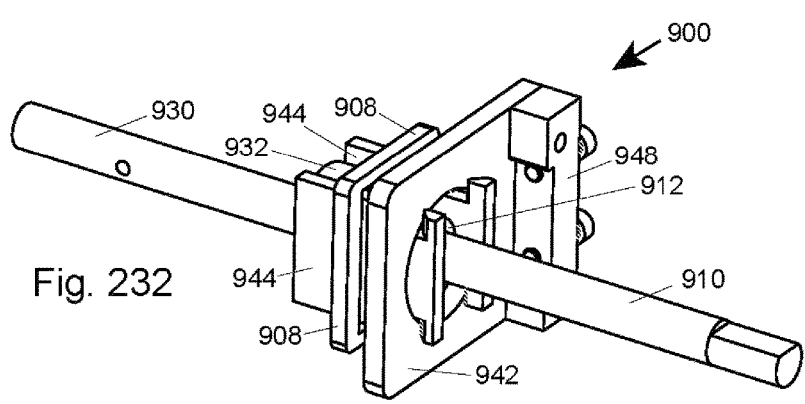

FIG. 229 shows the input assembly of an anti-backdrive mechanism shown in FIG. 232.

FIG. 230 shows the output assembly of an anti-backdrive mechanism shown in FIG. 232.

FIG. 231 shows the fixed assembly of an anti-backdrive mechanism shown in FIG. 232.

FIG. 232 shows an anti-backdrive mechanism assembly incorporating the input assembly of FIG. 229, the output assembly of FIG. 230 and the fixed assembly of FIG. 231.

Figure 233:
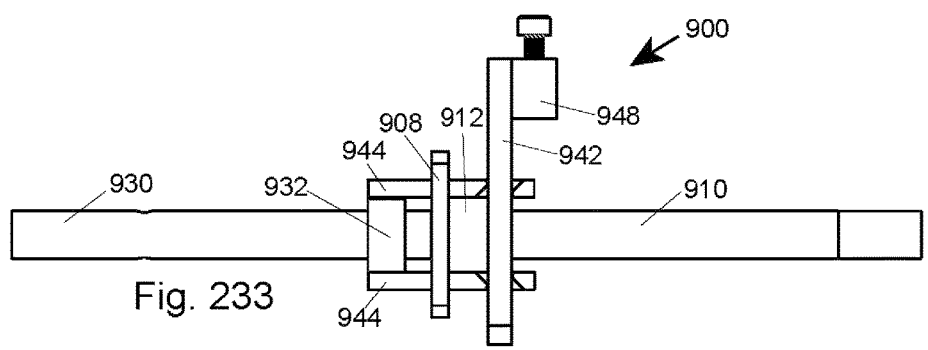

FIG. 233 shows a top view of the anti-backdrive mechanism assembly of FIG. 232.

FIG. 234 shows an exploded view of the input assembly of FIG. 229.

FIG. 235 shows a cross-sectional view of the slotted plate of the input assembly of FIG. 236.

FIG. 236 shows a front view of the slotted plate of the input assembly of FIG. 229.

FIG. 237 shows a rear view of the slotted plate of the input assembly of FIG. 229.

FIG. 238 shows an exploded view of the output assembly of FIG. 230.

FIG. 239 shows an exploded view of the fixed assembly of FIG. 231.

FIG. 240 shows a perspective view of a rotating plate of the fixed assembly of FIG. 231.

FIG. 241 shows a top view of a rotating plate of the fixed assembly of FIG. 231.

FIG. 242 shows a side view of a rotating plate of the fixed assembly of FIG. 231.

FIG. 243 shows the input assembly of an anti-backdrive mechanism shown in FIG. 246.

FIG. 244 shows the output assembly of an anti-backdrive mechanism shown in FIG. 246.

FIG. 245 shows the fixed assembly of an anti-backdrive mechanism shown in FIG. 246.

FIG. 246 shows an anti-backdrive mechanism assembly incorporating the input assembly of FIG. 243, the output assembly of FIG. 244 and the fixed assembly of FIG. 245.

FIG. 247 shows a top view of the anti-backdrive mechanism assembly of FIG. 246.

FIG. 248 shows an exploded view of the input assembly of FIG. 243.

FIG. 249 shows an exploded view of the output assembly of FIG. 244.

FIG. 250 shows an exploded view of the fixed assembly of FIG. 245 FIG. 251 shows a front view of the slotted plate of the input assembly of FIG. 243.

FIG. 252 shows a rear view of the slotted plate of the input assembly of FIG. 243.

FIG. 253 shows a top view of the slotted plate of the input assembly of FIG. 243.

Figure 254:
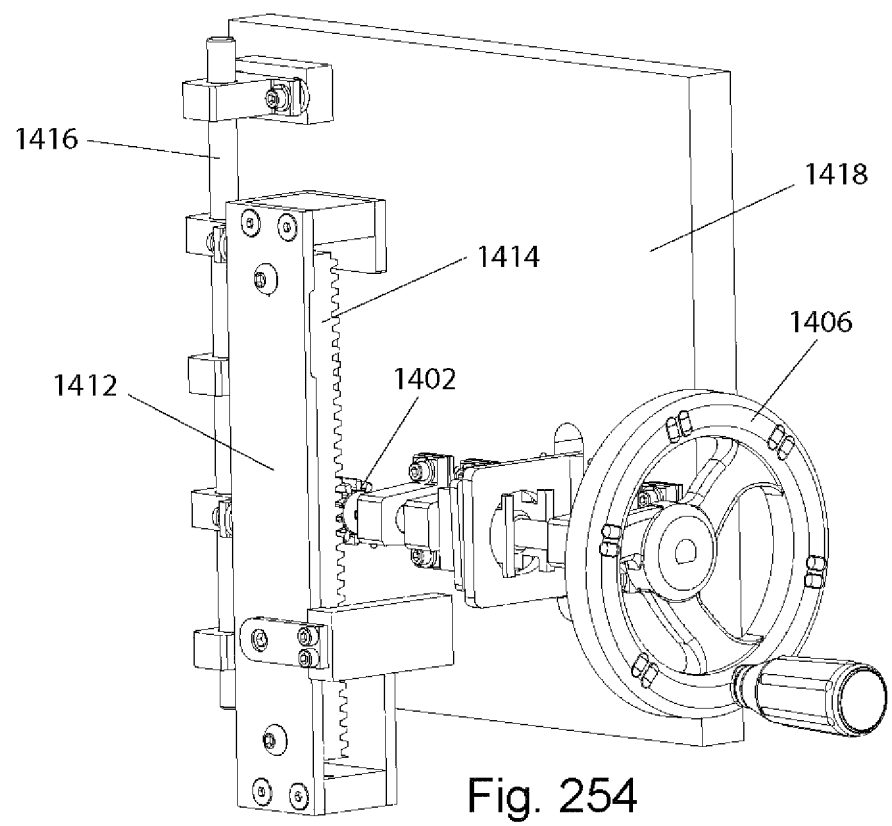

FIG. 254 shows a rack and pinion elevation mechanism mounted to an internal saw structure.

Figure 255:
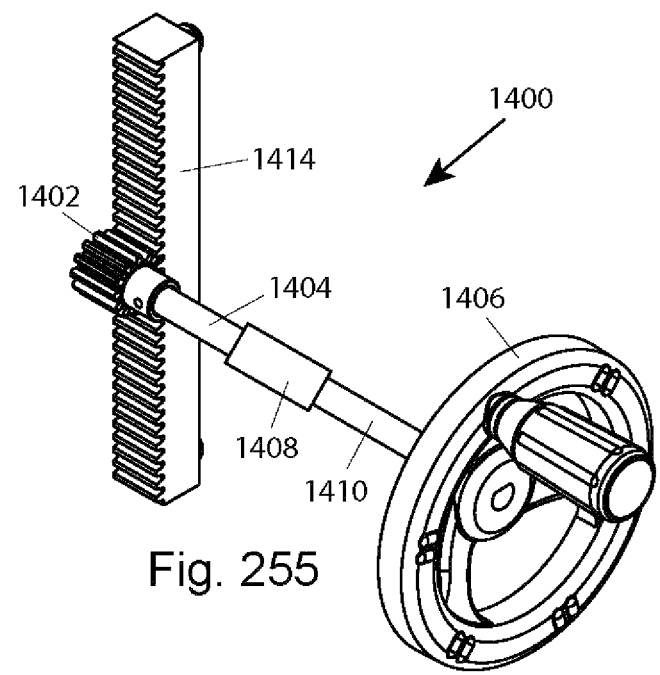

FIG. 255 shows the rack and pinion elevation mechanism of FIG. 254 isolated.

Figure 256:
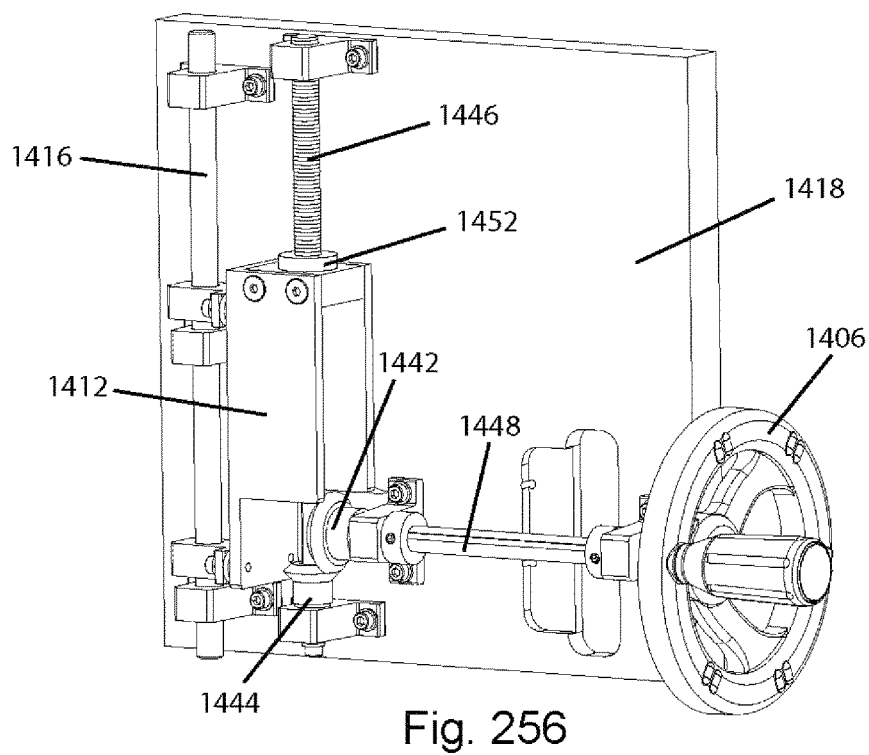

FIG. 256 shows a threaded rod and miter gear elevation mechanism mounted to an internal saw structure.

Figure 257:
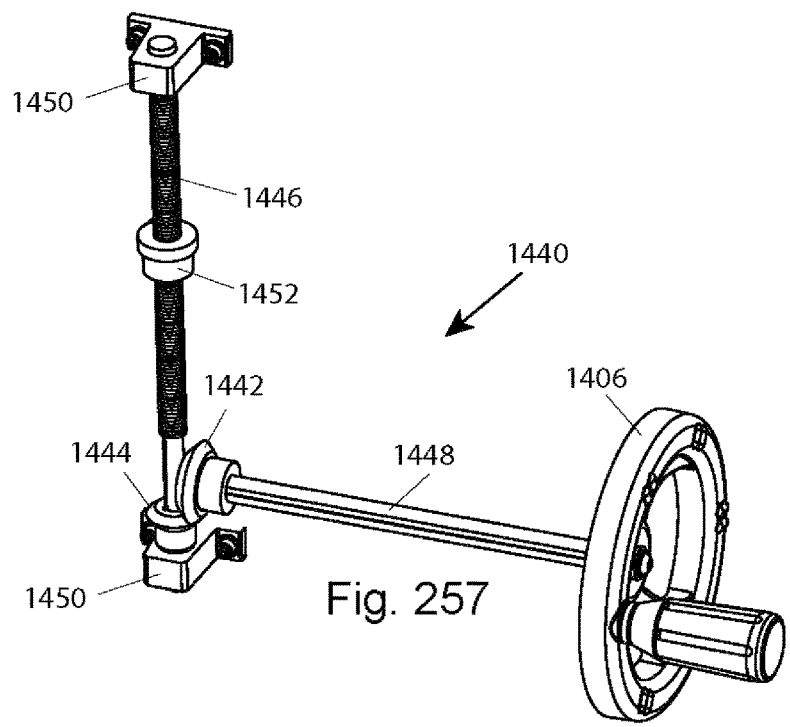

FIG. 257 shows the threaded rod and miter gear elevation mechanism of FIG. 256 isolated.

Figure 258:
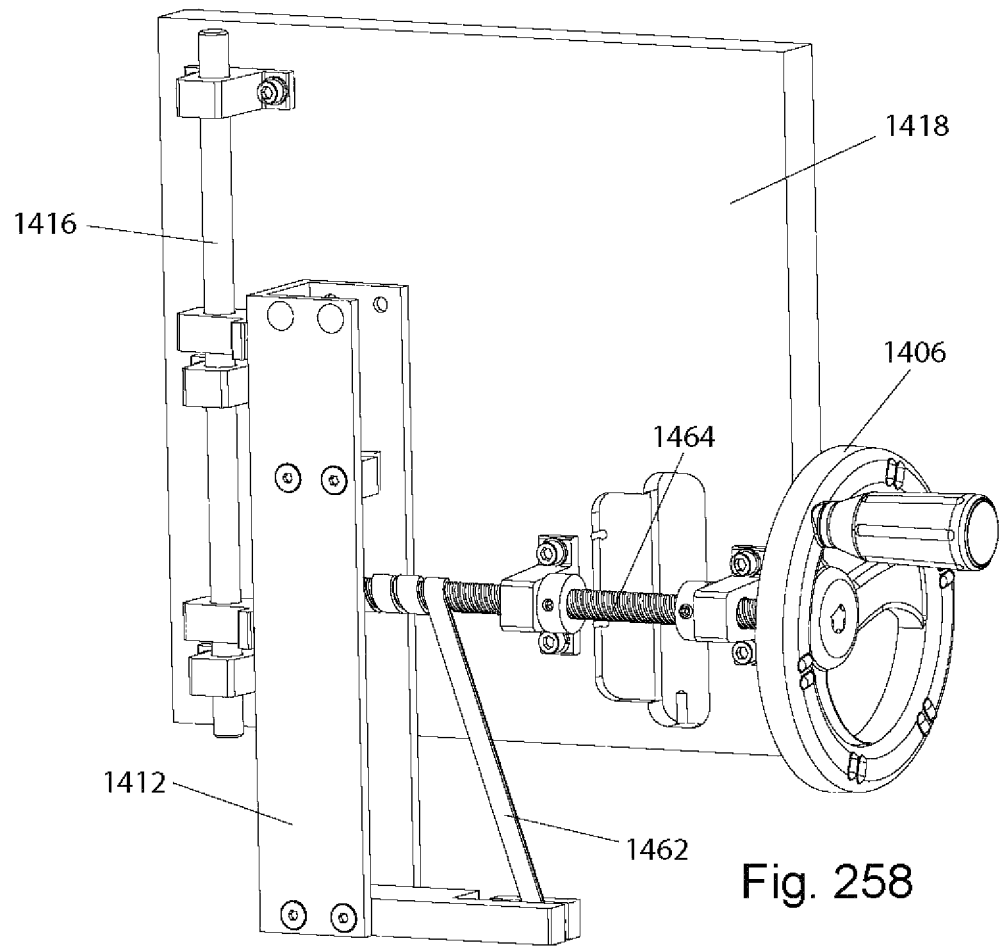

FIG. 258 shows a belt operated elevation mechanism mounted to an internal saw structure.

Figure 259:
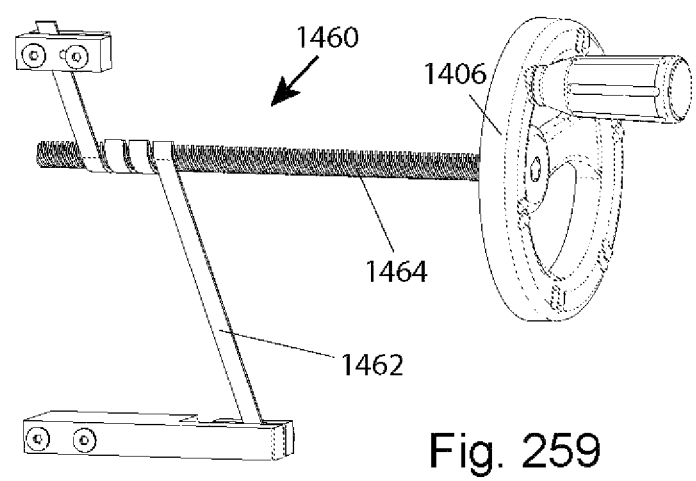

FIG. 259 shows the belt operated elevation mechanism of FIG. 258 isolated.

Figure 260:
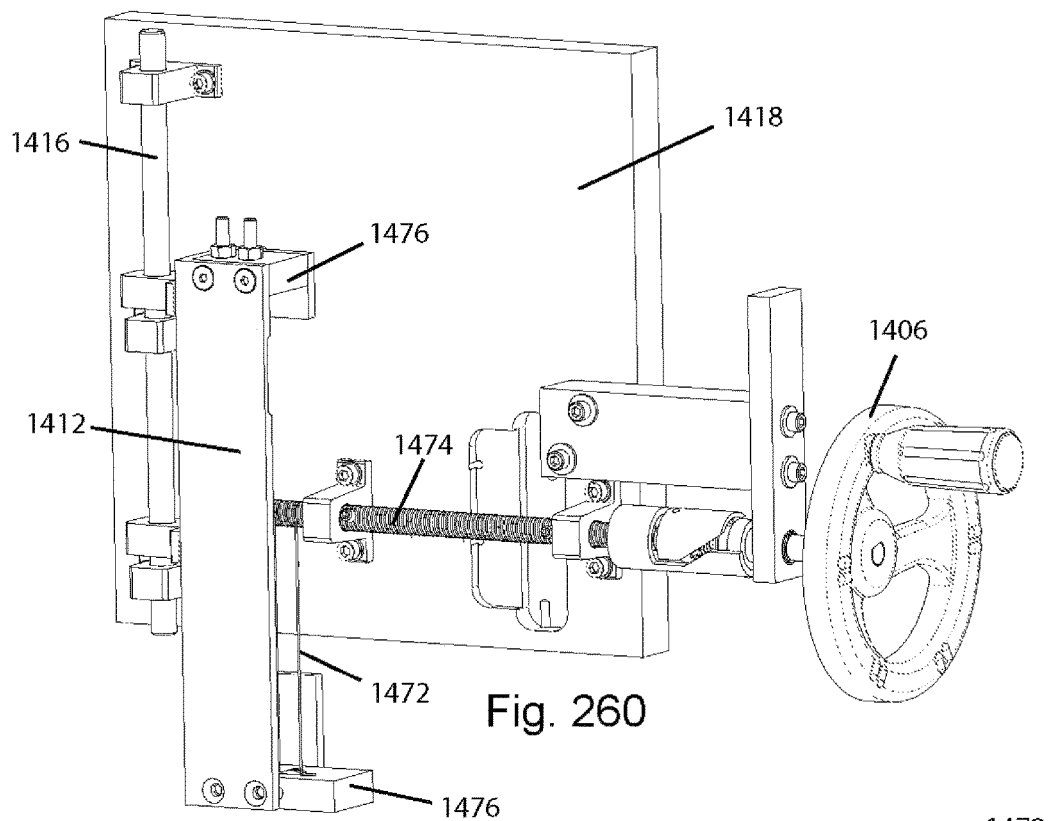

FIG. 260 shows a cable and threaded shaft elevation mechanism mounted to an internal saw structure.

Figure 261:
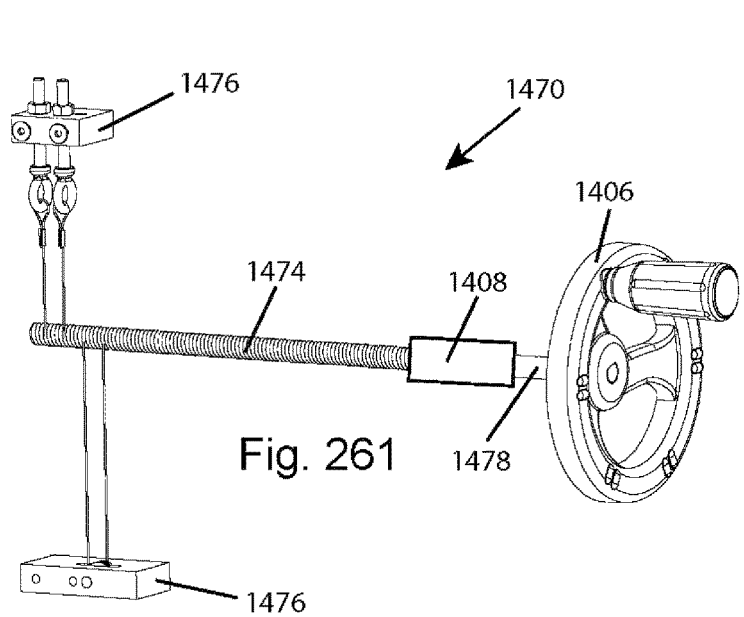

FIG. 261 shows the cable and threaded shaft elevation mechanism of FIG. 260 isolated.

Figure 262:
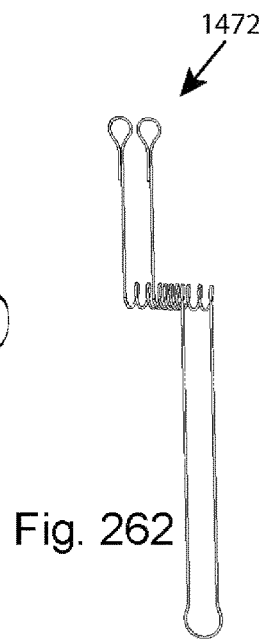

FIG. 262 shows the cable of the elevation mechanism of FIG. 260.

Figure 263:
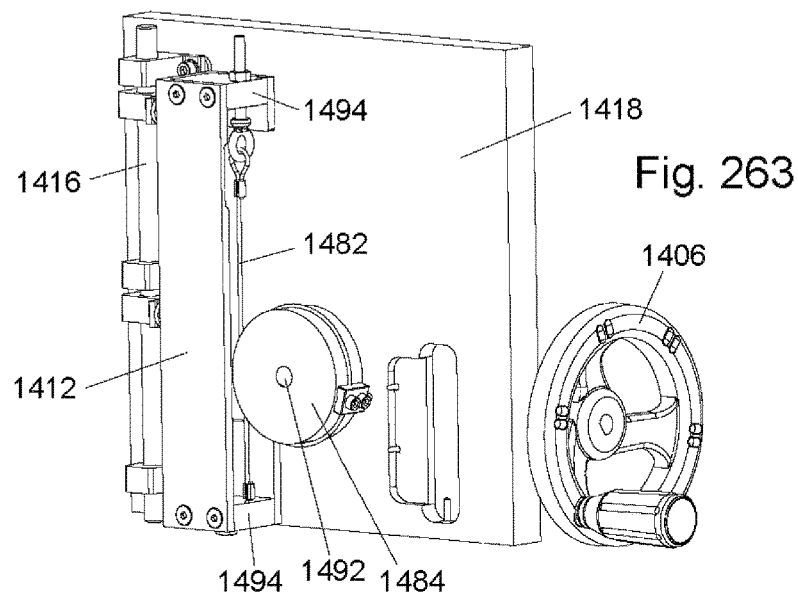

FIG. 263 shows a cable and spool elevation mechanism mounted to an internal saw structure.

Figure 264:
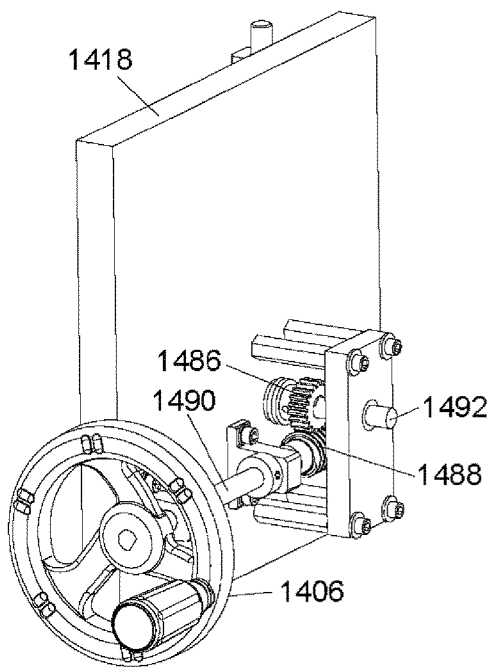

FIG. 264 shows another view of the cable and spool elevation mechanism of FIG. 263 mounted to an internal saw structure.

Figure 265:
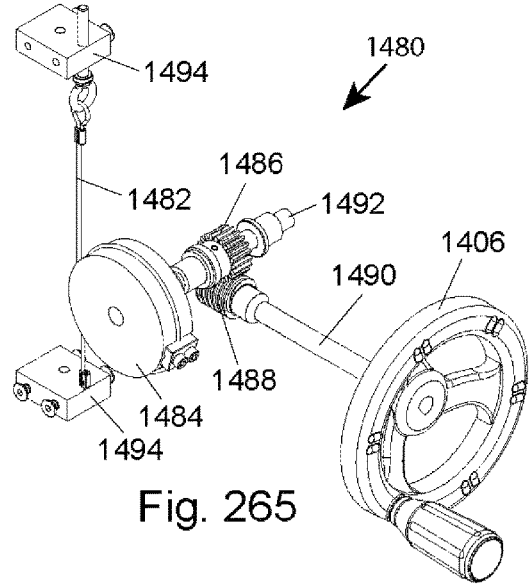

FIG. 265 shows the cable and spool elevation mechanism of FIG. 263 isolated.

Figure 266:
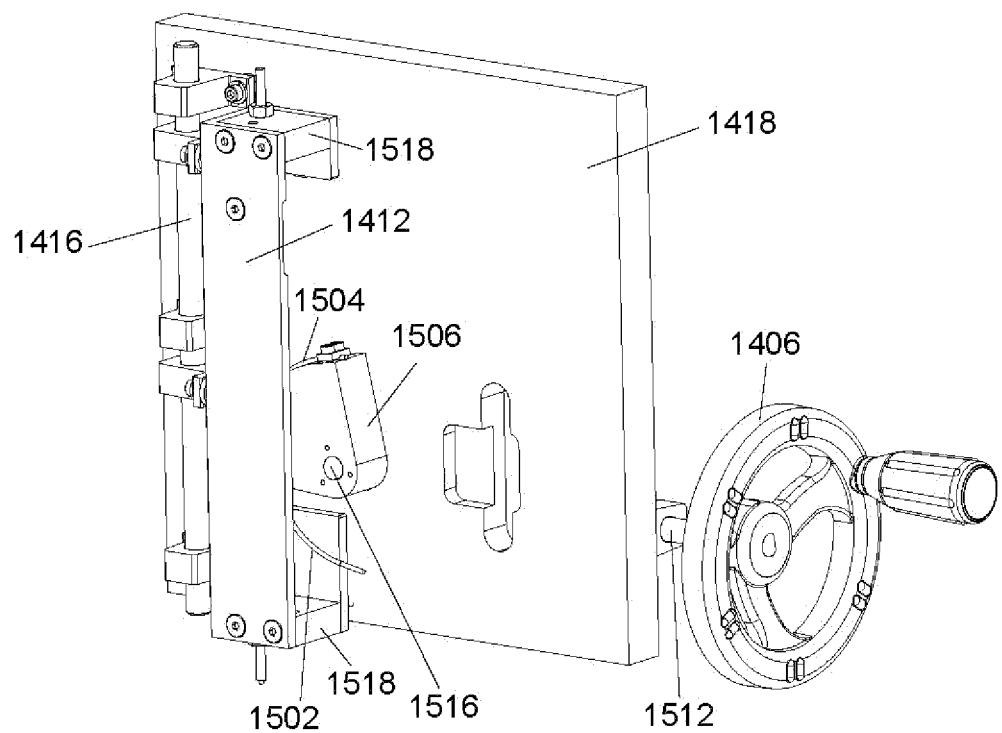

FIG. 266 shows a swinging arc sector and cable elevation mechanism mounted to an internal saw structure.

Figure 267:
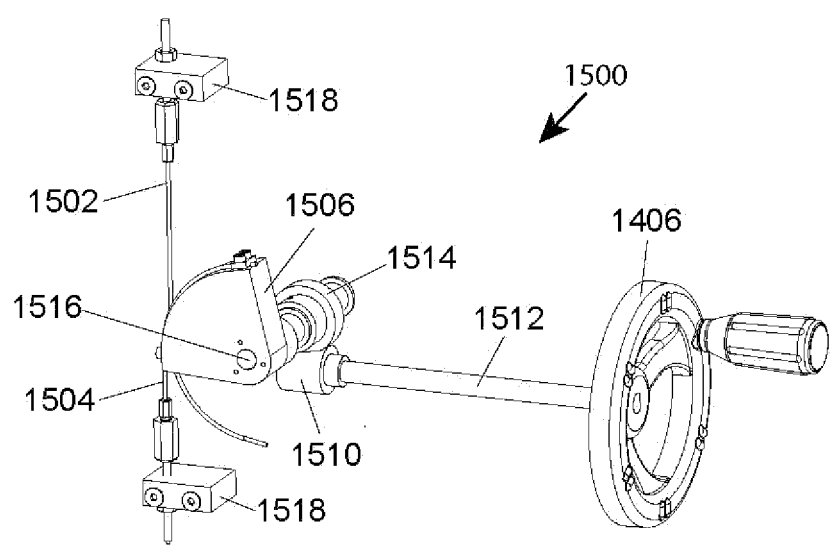

FIG. 267 shows the swinging arc sector and cable elevation mechanism of FIG. 266 isolated.

Figure 268:
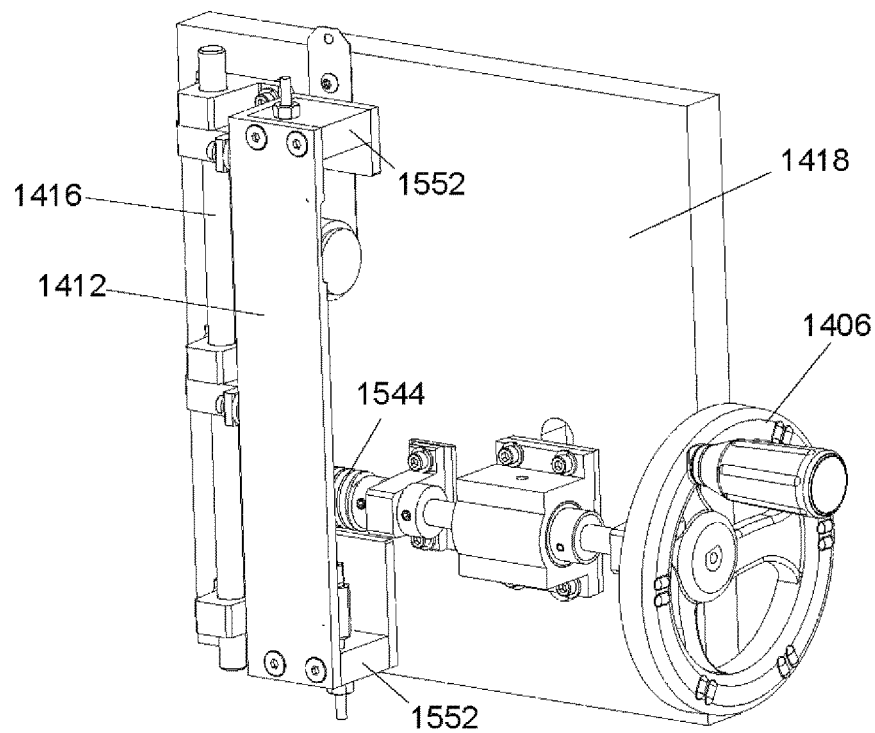

FIG. 268 shows a worm and cable elevation mechanism mounted to an internal saw structure.

Figure 269:
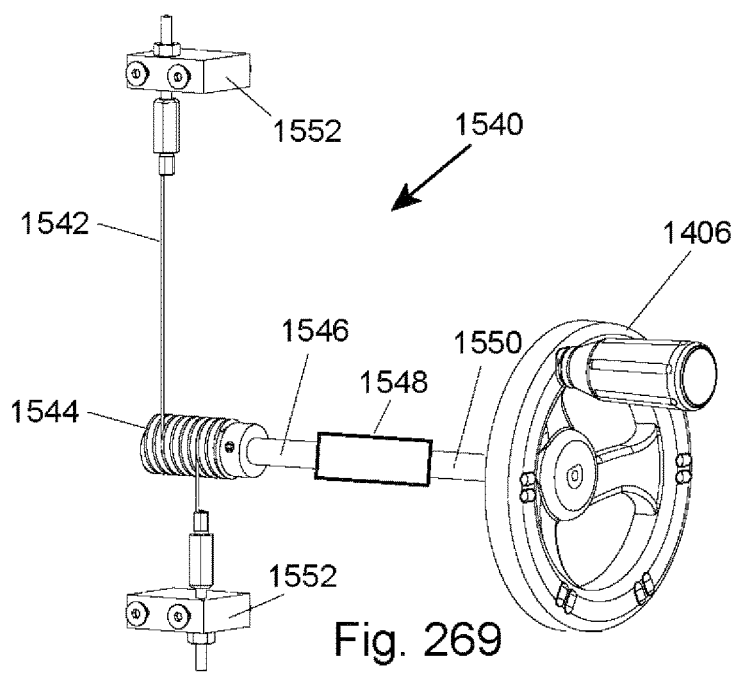

FIG. 269 shows the worm and cable elevation mechanism of FIG. 268 isolated.

Figure 270:
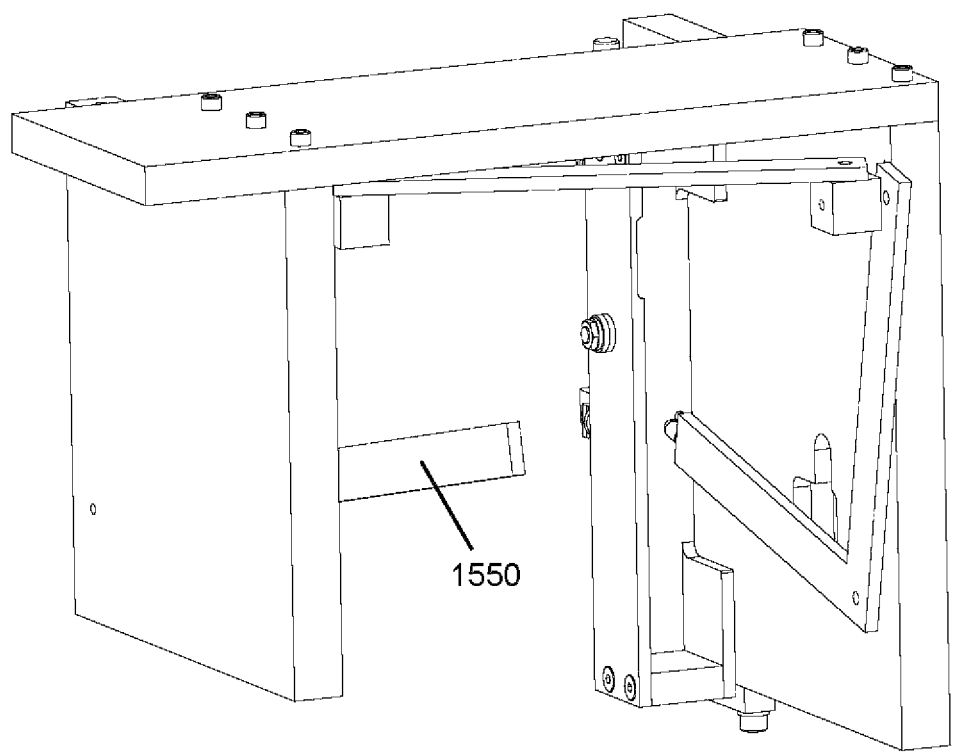

FIG. 270 shows a lever elevation mechanism.

Figure 271:
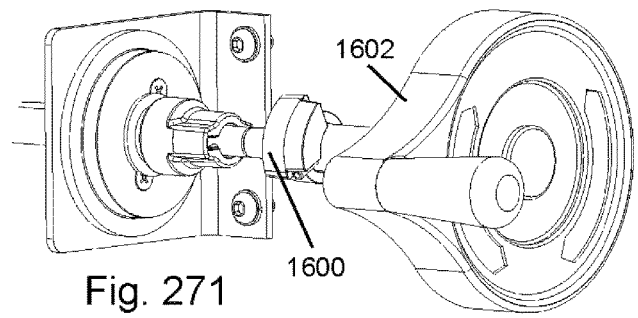

FIG. 271 shows an elevation limit stop installed on the input shaft to which a handwheel is connected.

Figure 272:
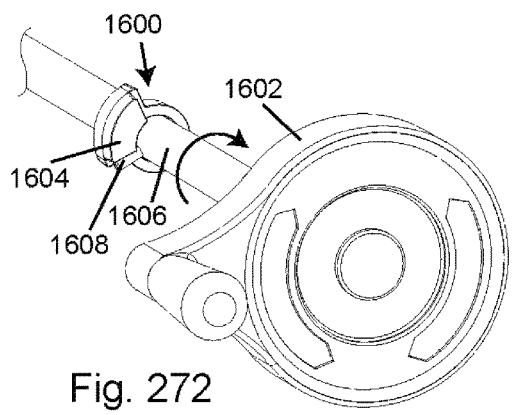

FIG. 272 shows an input shaft fully rotated clockwise and stopped from further rotation by the limit stop of FIG. 271.

Figure 273:
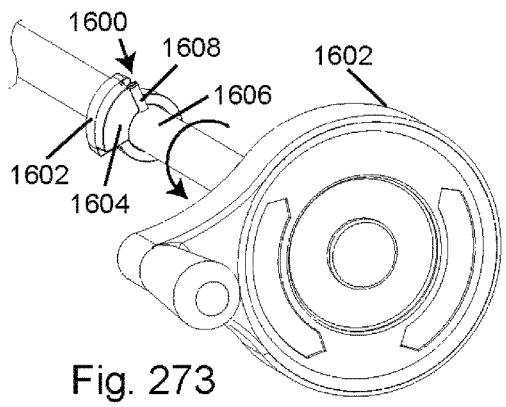

FIG. 273 shows an input shaft fully rotated counter-clockwise and stopped from further rotation by the limit stop of FIG. 271.

Figure 274:
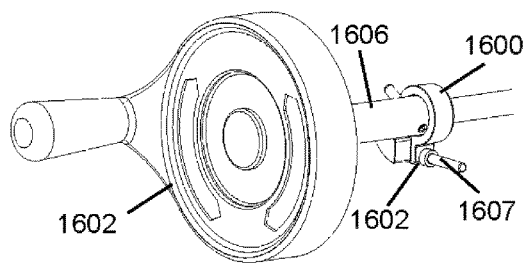

FIG. 274 shows a screw used to adjust the limit stop and to keep it from rotating on the shaft.

Figure 275:
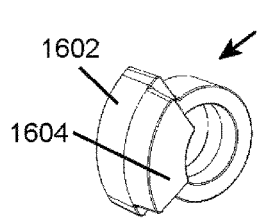

FIG. 275 shows a perspective view of the limit stop of FIG. 271 isolated.

Figure 276:
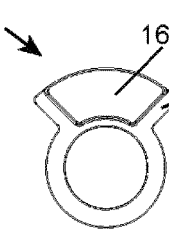

FIG. 276 shows a front view of the limit stop of FIG. 271 isolated.

Figure 277:
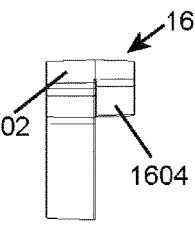

FIG. 277 shows a side view of the limit stop of FIG. 271 isolated.

Figure 278:
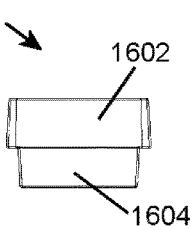

FIG. 278 shows a top view of the limit stop of FIG. 271 isolated.

Figure 279:
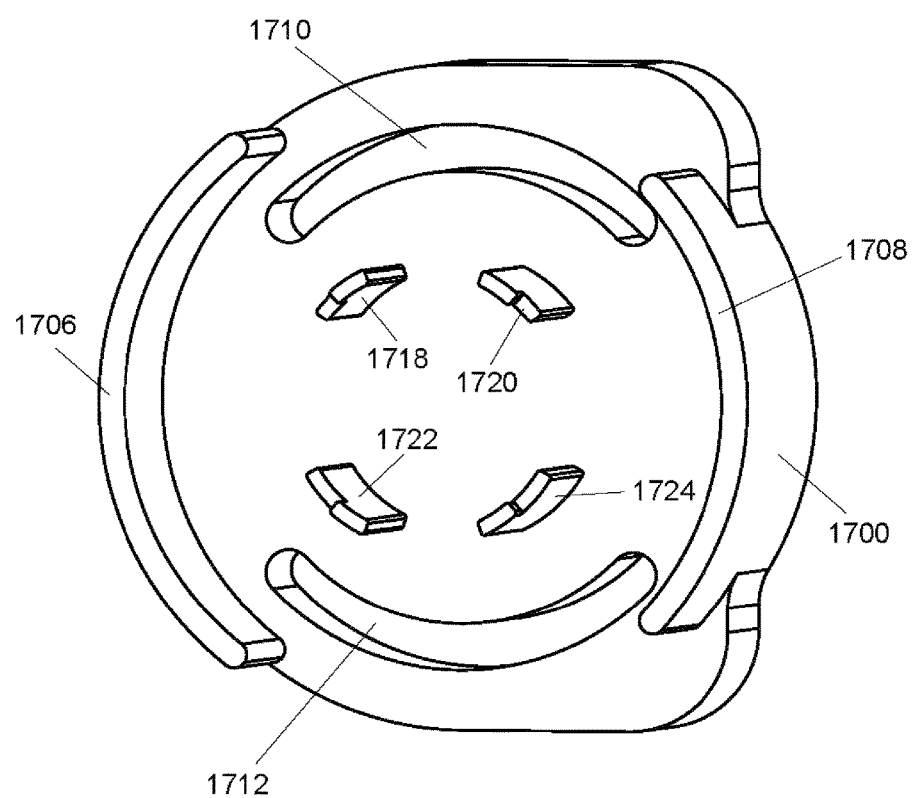

FIG. 279 shows a tool used to assemble the anti-backdrive mechanism shown in FIGS. 3 through 38.

FIG. 280 shows the tool of FIG. 279 with part of the anti-backdrive mechanism in the tool.

FIG. 281 shows the tool of FIG. 279 with still more of the anti-backdrive mechanism in the tool.

FIG. 282 shows the tool of FIG. 279 with the assembled anti-backdrive mechanism.

Figure 283:
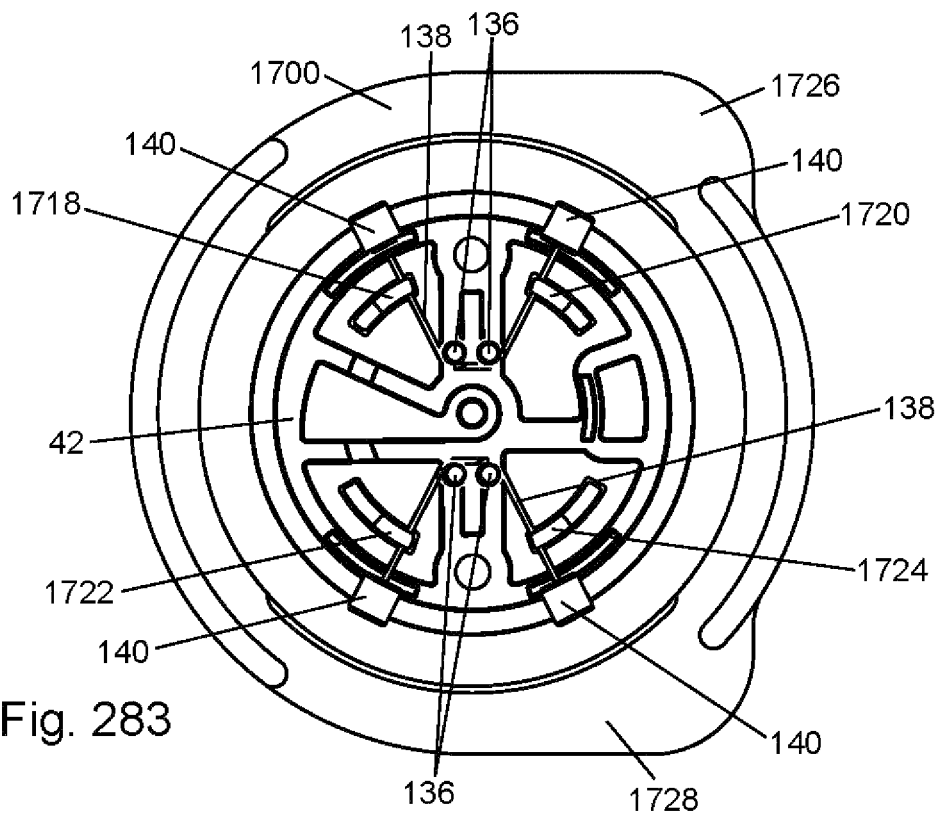

FIG. 283 shows the tool of FIG. 279 with a flange plate, locking springs and locking cylinders installed.

Figure 284:
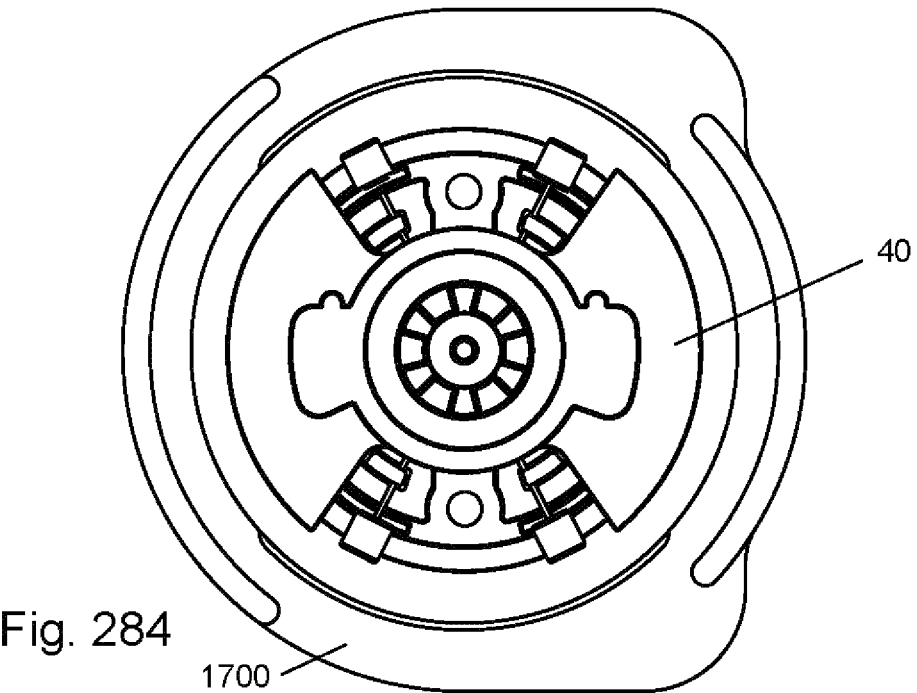

FIG. 284 shows the tool of FIG. 283 with a release plate.

Figure 285:
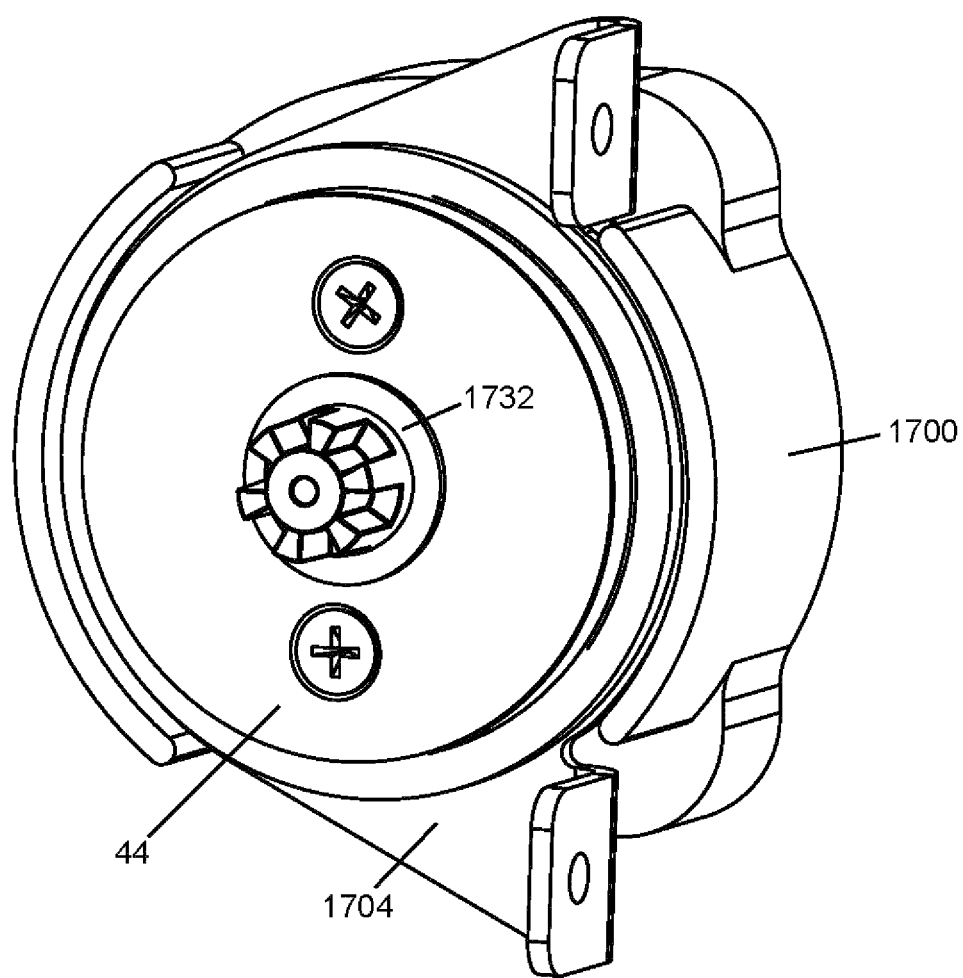

FIG. 285 shows the assembled tool of FIG. 279.

Figure 286:
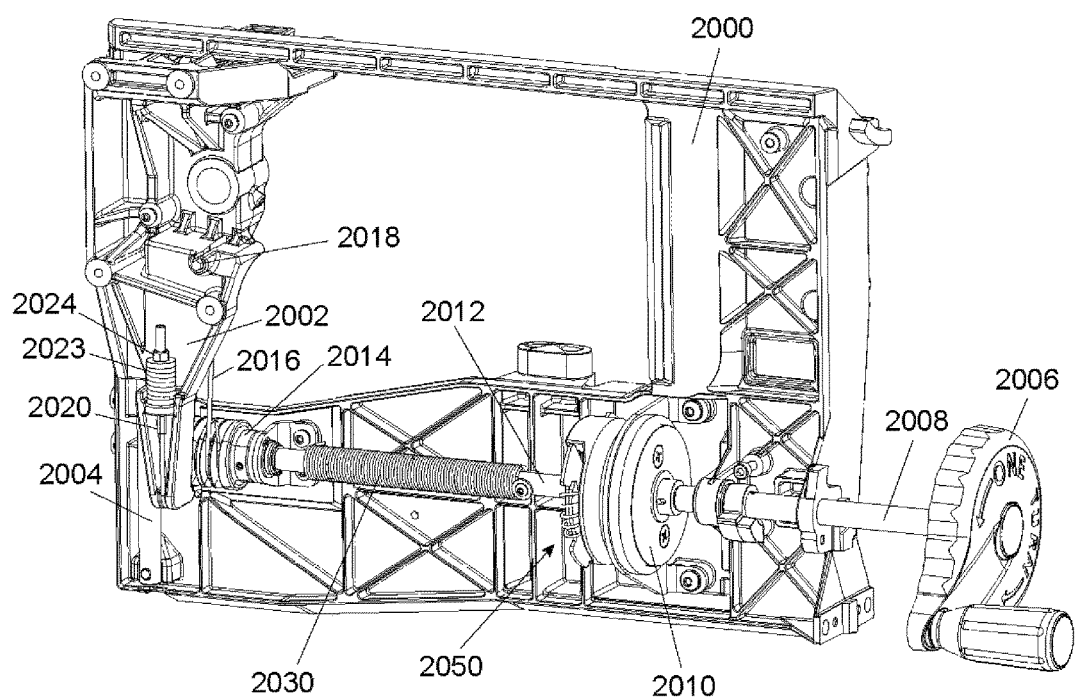

FIG. 286 shows and embodiment of an elevation mechanism with an overload shock absorber.

Figure 287:
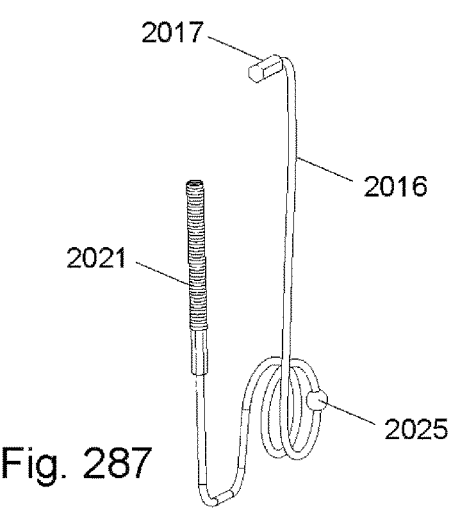

FIG. 287 shows a cable used in the elevation mechanisms of FIG. 286.

Figures 288, 289:
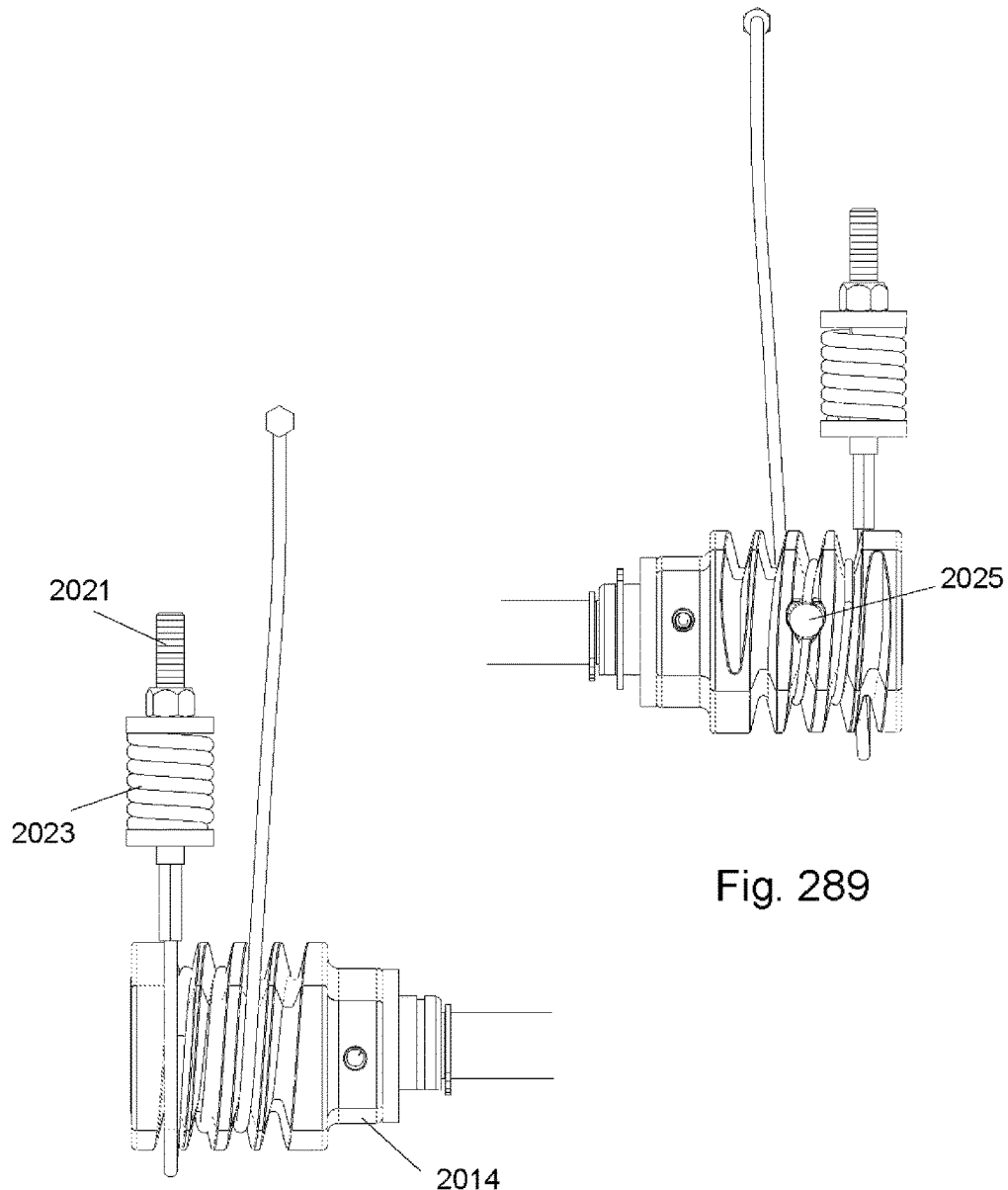

FIG. 288 shows a cable around a spool in the elevation mechanism of FIG. 286.

FIG. 289 shows a locator or stop on the cable shown in FIG. 288.

Figure 290:
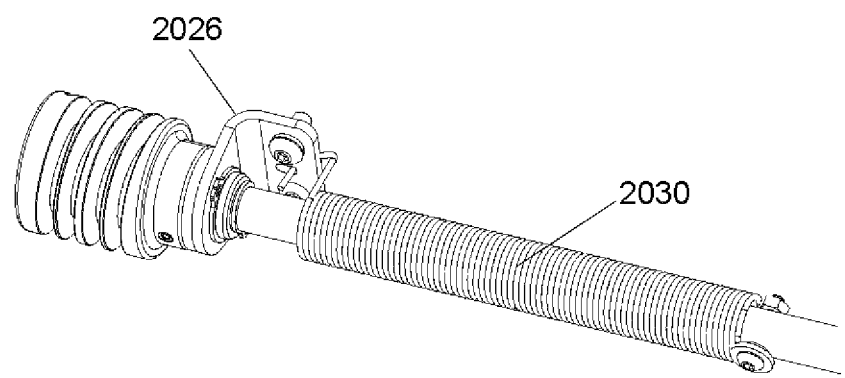

FIG. 290 shows a bracket used in the elevation mechanism of FIG. 286.

Figure 291:
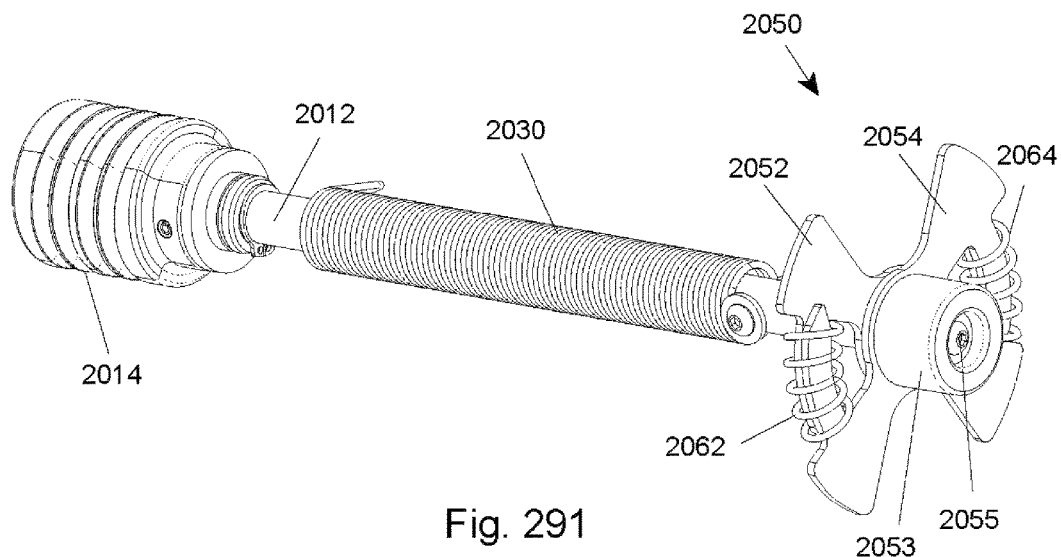

FIG. 291 shows part of an overload shock absorber used in the elevation mechanism of FIG. 286.

Figure 292:
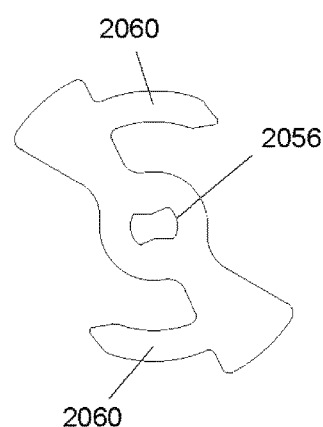

FIG. 292 shows a shock plate.

Figure 293:
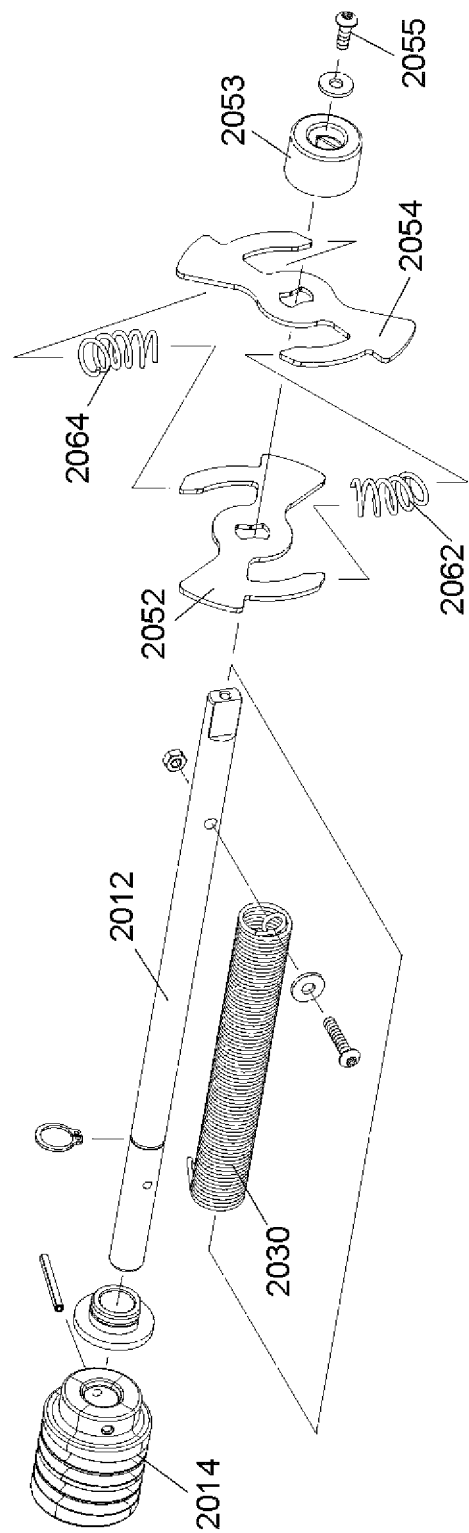

FIG. 293 shows an exploded view of components used in the elevation mechanism of FIG. 286.

Figure 294:
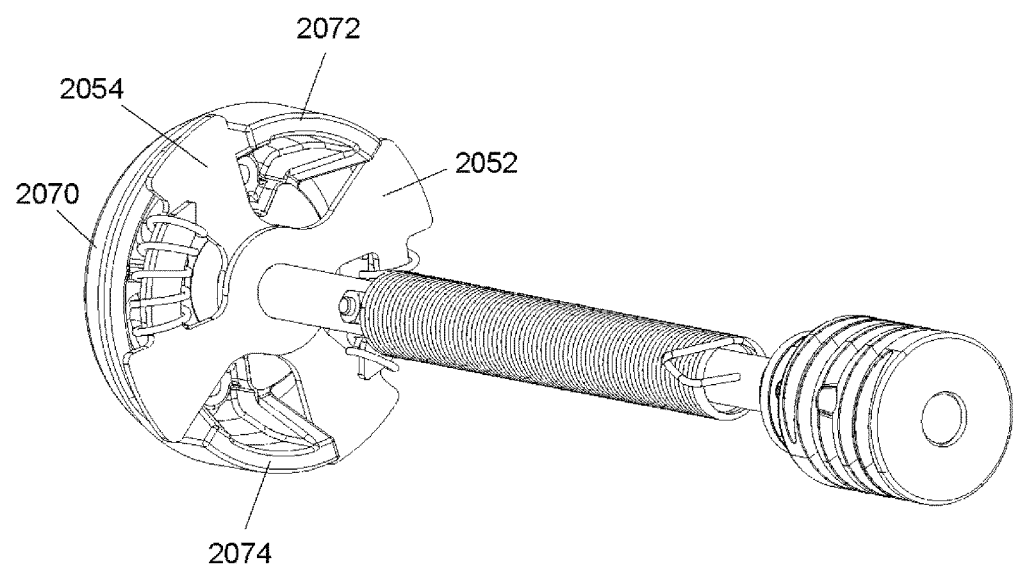

FIG. 294 shows an input coupler used in the elevation mechanism of FIG. 286.

Figure 295:
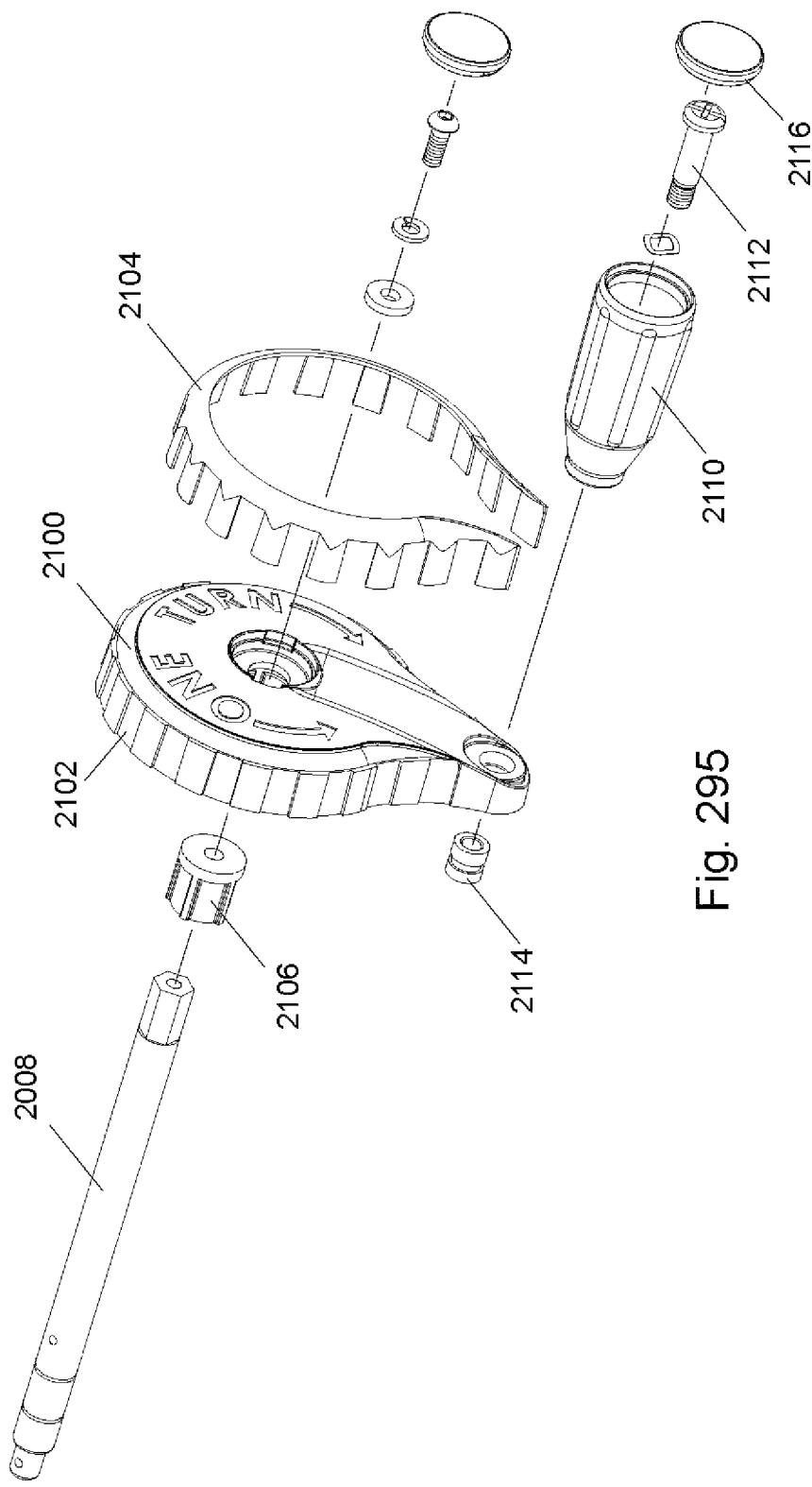

FIG. 295 shows a handwheel used in the elevation mechanism of FIG. 286.

Figure 296:
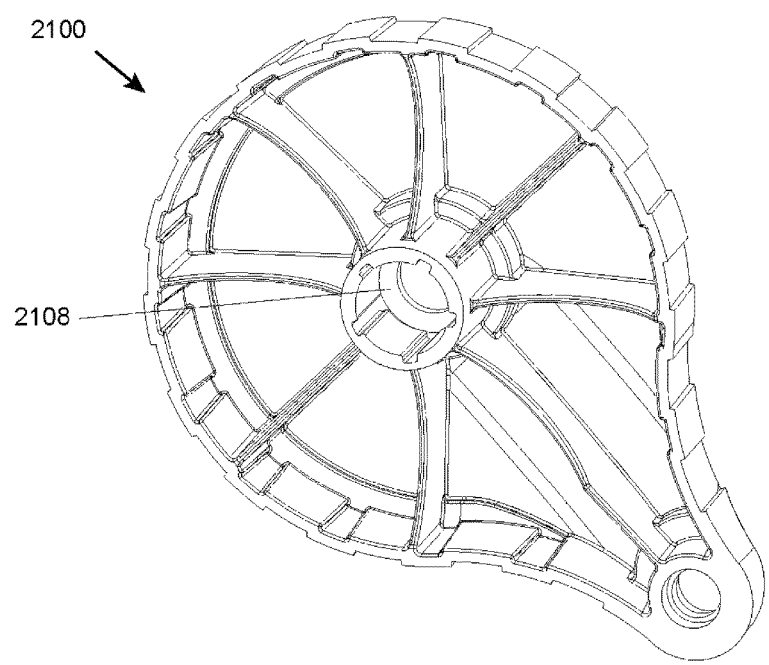

FIG. 296 shows a handle body used in the handwheel of FIG. 295.

DETAILED DESCRIPTION

Figure 1:
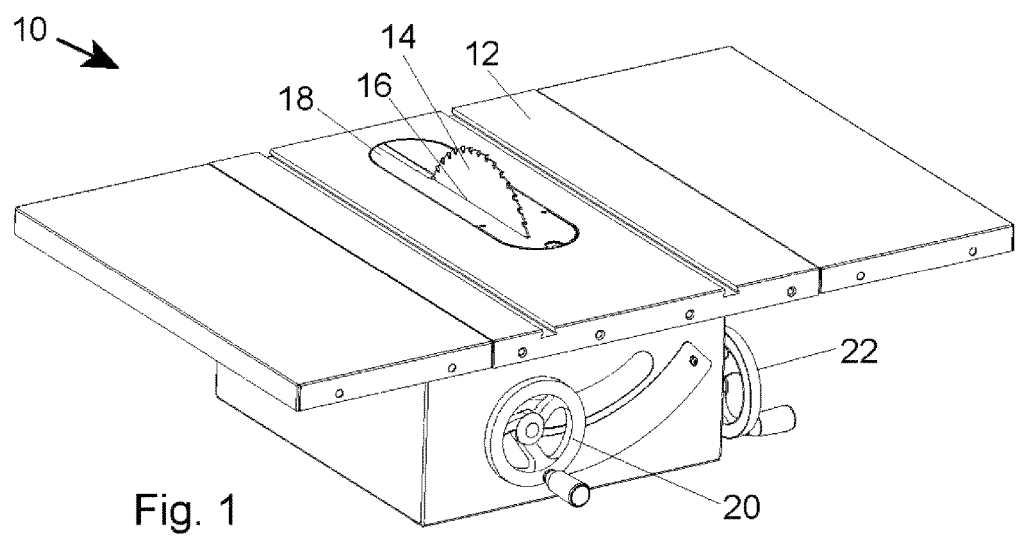
FIG. 1 shows a table saw.

FIG. 1 shows a table saw 10 including a table 12 and a circular blade 14 extending up through a slot 16 in a table insert 18 that fits within an opening in the table. A piece of wood, or other material to be cut, is placed on the table and pushed into contact with the spinning blade to make a cut. The saw includes a motor and drive mechanism (not shown) to spin the blade. The blade may be raised or lowered to adjust to the height of the workpiece by turning an elevation handwheel 20 that extends out from the saw. (Typically in a table saw the blade may also be tilted relative to the table top to make an angled or bevel cut, and saw 10 includes a handwheel 22 that can be rotated to tilt the blade from 0 to 45 degrees.)

Blade elevation mechanisms in table saws often use handwheels, miter gears (also known as bevel gears), and threaded shafts to raise or lower the blade. However, the threads on the shaft must be sufficiently shallow to prevent the weight of the blade, along with the weight of the motor and any other structure being raised with the blade, from causing the blade to fall back down when a user releases the handwheel. This is called "backdrive" because the weight of the structure turns the gears or moves other components of the elevation mechanism in reverse and drives the blade back down. A consequence of shallow threads, however, is that it takes many turns of the shaft (and therefore the handwheel) to raise and lower the blade. A user might have to turn the handwheel 20, 30 or more times to raise or lower the blade. Alternatively, elevation mechanisms use worm gears or rack and pinion gears to raise and lower the blade. Again in those systems, the weight of the blade, along with the weight of the motor and any other structure raised by the elevation mechanism, can cause the blade to move or fall back down when a user releases the handwheel.

Table saw 10 in FIG. 1 includes an elevation mechanism with an anti-backdrive device. The anti-backdrive device allows handwheel 20 to drive the elevation mechanism to raise or lower the blade, but the anti-backdrive device prevents the weight of the blade and other structure from turning, or back-driving, the elevation handwheel. As a result, the elevation mechanism can be constructed so that a relatively few number of turns, a single turn, or even less than a single turn of the handwheel can fully raise or lower the blade. Various embodiments and components of such an elevation mechanism are described below.

Figure 2:
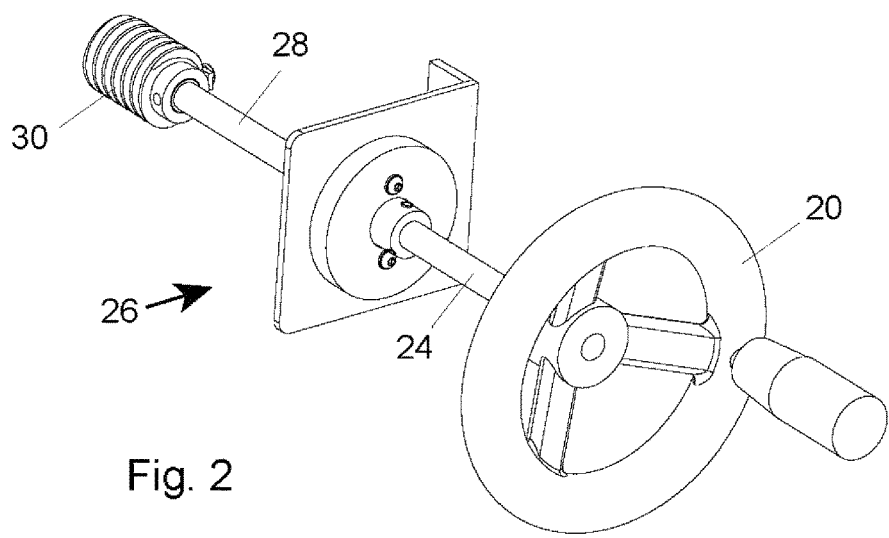
FIG. 2 shows an anti-backdrive mechanism attached to an input shaft with a handwheel at one end and an output shaft with a pulley at the other end.
Figure 12:
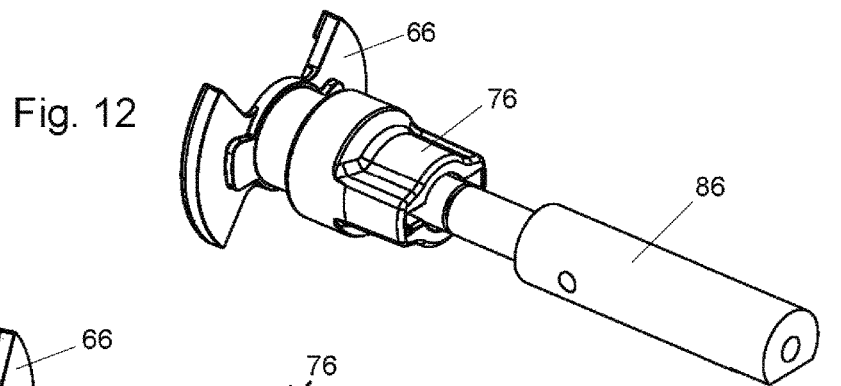
FIG. 12 shows an input assembly incorporating an alternative release plate for the anti-backdrive mechanism of FIG. 6.
Figure 13:
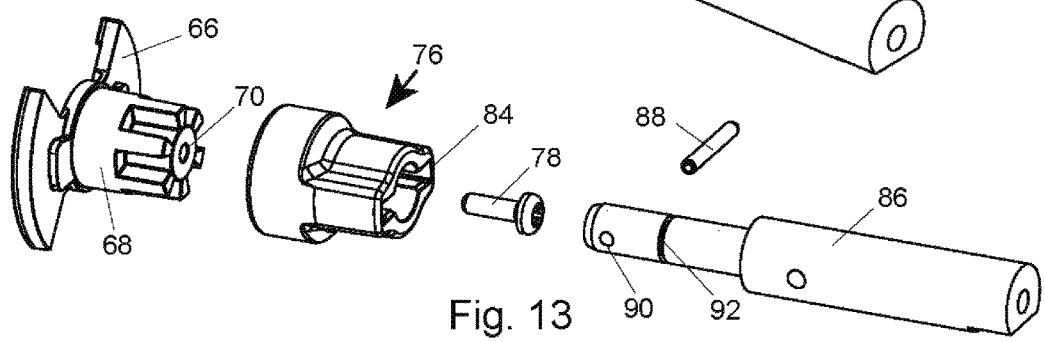
FIG. 13 shows an exploded view of the alternative input assembly shown in FIG. 12.
Figure 14:
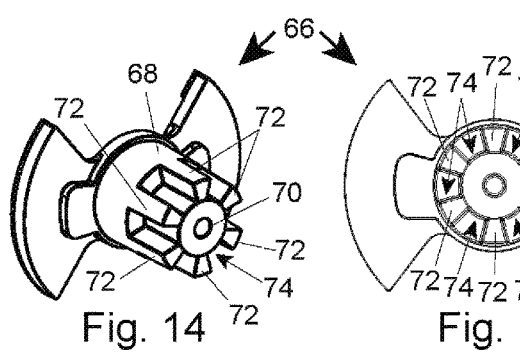
FIG. 14 shows a perspective view of the alternative release plate of FIG. 12.
Figure 15:
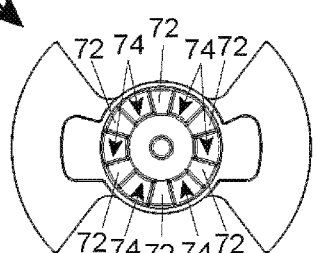
FIG. 15 shows a front view of the alternative release plate of FIG. 12.
Figure 16:
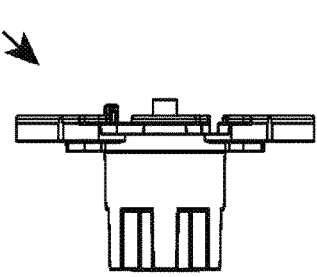
FIG. 16 shows a side view of the alternative release plate of the input assembly of FIG. 12.
Figure 17:
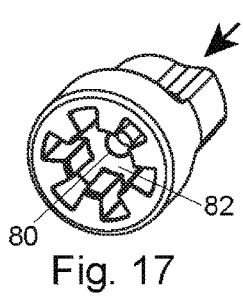
FIG. 17 shows a perspective view of a release plate coupler of the input assembly of FIG. 12.
Figure 18:
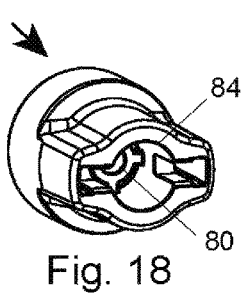
FIG. 18 shows another perspective view of a release plate coupler of FIG. 17.
Figure 19:
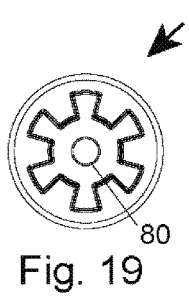
FIG. 19 shows a rear view of a release plate coupler of FIG. 17.
Figure 20:
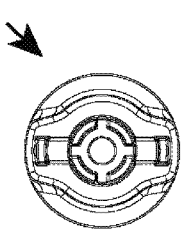
FIG. 20 shows a front view of a release plate coupler of FIG. 17.

FIG. 2 shows elevation handwheel 20 mounted at the end of an input shaft 24 that is connected to an anti-backdrive mechanism 26 which is in turn connected to an output shaft 28 at the end of which is attached a cable pulley 30. The cable pulley 30, as will be described below, meshes with a cable or cables to raise and lower the blade when a user turns handwheel 20. Input shaft 24 extends out from the interior of the saw to connect to elevation handwheel 20 and turns or rotates as the elevation handwheel is turned. The anti-backdrive mechanism 26 transmits the turning motion of the input shaft to output shaft 28 and cable pulley 30. As the output shaft turns, the cable pulley turns and cables wind or unwind about the cable pulley to raise or lower the blade. The anti-backdrive mechanism 26 allows the input shaft to turn the output shaft, but prevents the output shaft from turning the input shaft. More precisely, the anti-backdrive mechanism prevents both the output shaft 28 and the input shaft 24 from turning under a torque applied to the output shaft, but allows both shafts to turn together either clockwise or counter-clockwise when a torque is applied to the input shaft. A torque may be applied to the output shaft by the weight of the structure supporting the blade or by sudden movements of other structures internal to the saw. In any case, the anti-kickback mechanism will prevent such torques from turning either the output shaft or the input shaft so that the cable pulley does not turn and the blade will retain the set elevation.

The anti-backdrive mechanism 26 can be broken into three main structures: a release plate 40, a structure composed of a flange plate 42 rigidly attached to a ramp plate 44, and a vertical plate 46. As shown in FIG. 3, the release plate 40 is attached to the end of the input shaft 24 and rotates as the input shaft and elevation handwheel 20 rotate. The structure composed of the flange plate and ramp plate is attached to the end of the output shaft 28, as shown in FIG. 4, and rotates as the output shaft and cable pulley rotate. The vertical plate 46, shown in FIG. 5, supports the anti-backdrive mechanism in the saw, and is mounted in the saw so that it does not move with respect to other components in the anti-backdrive mechanism.

As shown in FIG. 6, the anti-backdrive mechanism is assembled with the vertical plate 46 positioned in between the flange plate 42 and ramp plate 44. The flange and ramp plates are centered about a large circular cutout 48 in the vertical plate through which pass two screws 50 (identified in FIG. 33) that attach the flange and ramp plates together. Release plate 40 is positioned between vertical plate 46 and ramp plate 44, and the input shaft 24, which is connected to the release plate, passes through a hole at the center of the ramp plate and extends out towards the elevation handwheel.

FIGS. 7 through 11 show the release plate 40 isolated. Release plate 40 is made of a rigid material such as metal or plastic and is generally shaped like a rather thin plate with a circular middle section 52 and two wings, or arced sections 54, one extending out symmetrically to each side beyond the radius of the circular middle section. Each arced section 54 sweeps through about ninety degrees. A short, hollow cylindrical extension 56 extends out from the center of the front side of the release plate and has a hole 58 in the end running parallel to the axis and two small holes 60, axially aligned with each other, passing through the sides of the cylindrical extension. The end of input shaft 24 fits within hole 58 at the end of the cylindrical extension 56 and a spring pin passes through aligned holes 60 and through a hole near the end of the input shaft to attach the release plate to the input shaft. If the release plate is made of plastic, it may not be strong enough to accommodate the turning force, or torque, of the input shaft attached to the release plate by a spring-pin and so an alternative design, such as that shown in FIG. 12 may be used. This design uses a slightly modified release plate 66. Release plate 66 is substantially the same as release plate 40 except that the cylindrical extension on the front of the release plate is modified. As shown in FIGS. 13 through 16 the cylindrical extension 68 on the back side of the release plate is elongated a bit and has a small threaded hole 70 in the end running parallel to and concentric with the axis. Chunks of the cylindrical extension cut longitudinally from the end of the cylindrical extension to about half the length of the cylindrical extension and cut into the cylindrical extension following radial lines for a depth of about half the radius of the cylindrical extension are removed along the circumference of the cylindrical extension 68 leaving six equally sized and spaced remnants 72 that are about one half as wide as the removed chunks alternating with six equally spaced gaps 74 to create a spline type of interface. The cylindrical extension interlocks with a corresponding piece called a coupler 76, shown isolated in FIGS. 17 through 20, which has a matching six segment pattern with the chunks cut into the inner surface of the hollow, cylindrical end of the coupler so that the coupler can fit over the end of the cylindrical extension. The coupler 76 is attached to the cylindrical extension by a screw 78 which passes through a hole 80 in a thick wall 82 which runs perpendicular to the longitudinal axis of the coupler and located at about the middle of the coupler. The back of the head of screw 78 lies against wall 82 and the end threads into hole 70 at the end of the cylinder extension 68. The coupler couples the release plate to the input shaft to provide more surface over which to spread the rotating force upon the cylindrical extension of the release plate thus reducing pressure points that may lead to damage. The front end of the coupler opposite the patterned end is shaped such that the coupler narrows to form a circular opening of a smaller diameter while it also closes, or pinches, in on the sides to form a pocket 84 that has a circular opening in the center which opens into rectangular shaped openings on the sides. The pocket 84 extends into the interior of the coupler for about half the length of the coupler. The end of an input shaft 86 fits within the circular center and the two ends of a spring pin 88 which passes through a hole 90 near the end of the input shaft fit within the rectangular sides. The spring pin pushes on the interior surfaces of the coupler to transfer the turning motion of the input shaft to the coupler which then transmits the turning motion to the release plate. Because the coupler is not rigidly attached to the input shaft, the input shaft is kept from sliding out of the end of the coupler by an E-clip that fits in a groove 92 around the input shaft and abuts the side of a washer that lies against an extension from the internal saw structure which has a hole in it for the input shaft to pass through to mount the input shaft in the saw.

Figure 21:
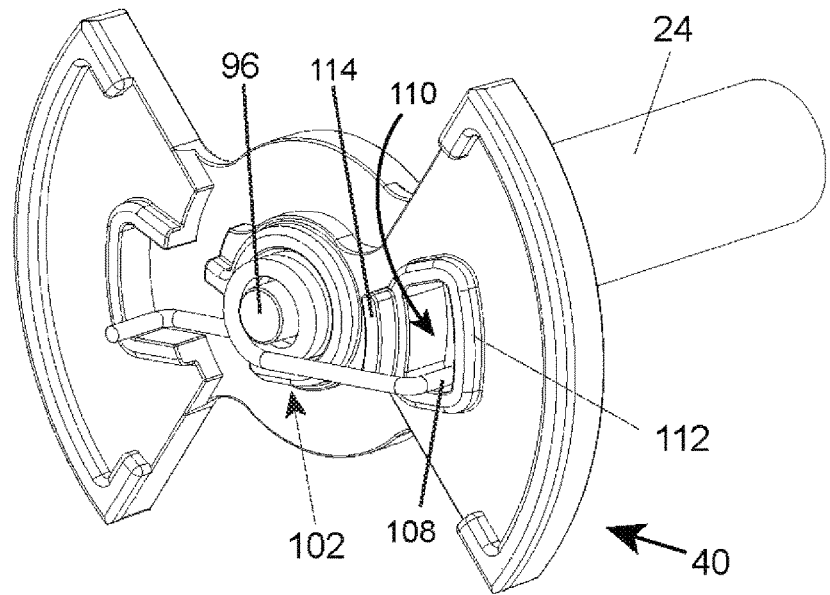
FIG. 21 shows the input assembly of FIG. 3 with a torsion spring installed in the release plate.
Figures 22, 23, 24:
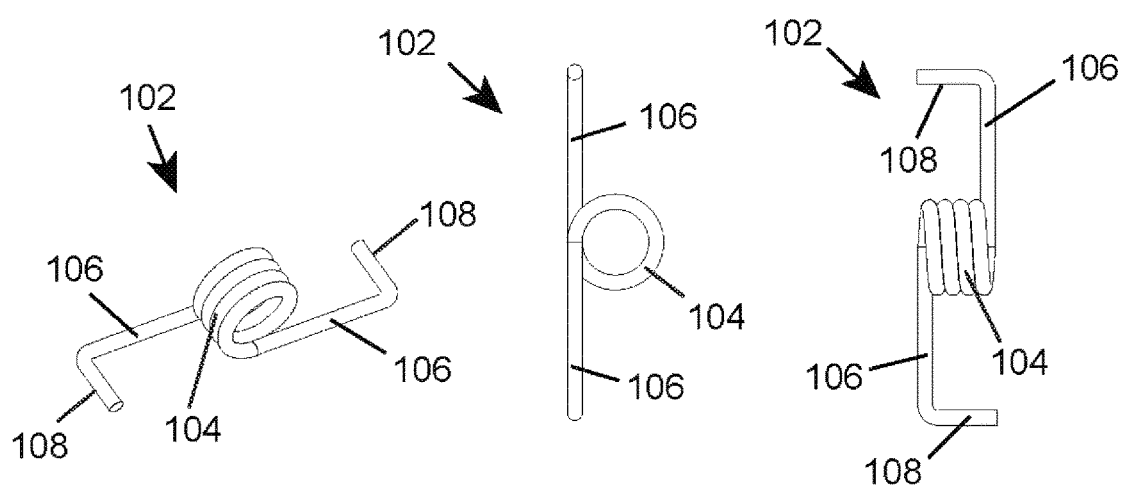
FIG. 22 shows a perspective view of the torsion spring of FIG. 21.
FIG. 23 shows a front view of the torsion spring of FIG. 22.
FIG. 24 shows a side view of the torsion spring of FIG. 22.
Figure 25:
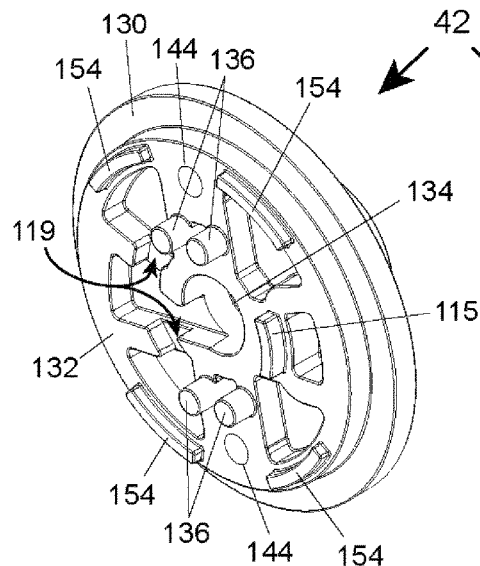
FIG. 25 shows a perspective view of the flange plate of the anti-backdrive mechanism of FIG. 6.
Figure 26:
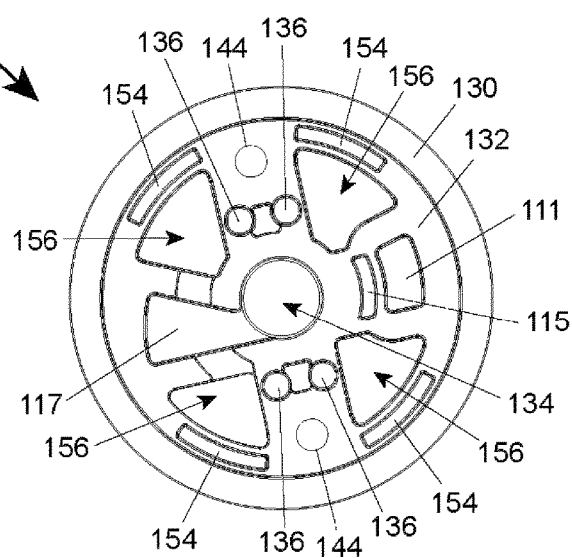
FIG. 26 shows a front view of the flange plate of FIG. 25.
Figure 27:
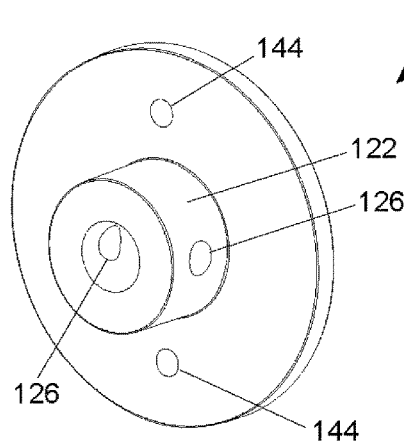
FIG. 27 shows another perspective view of the flange plate of FIG. 25.
Figure 28:
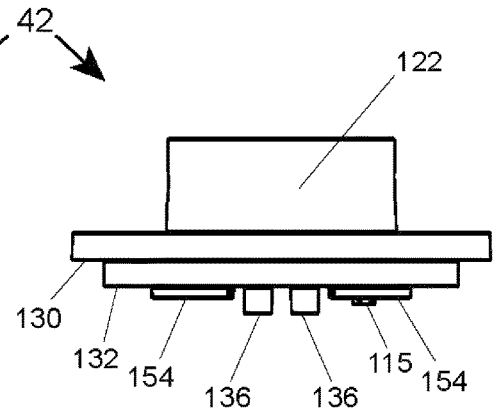
FIG. 28 shows a side view of the flange plate of FIG. 25.

On the face of release plate 40 opposite the face attached to the input shaft, there is a raised rim 94 along the outer edge of each of the side arced sections, as shown in FIGS. 8 and 10, which continues a short distance radially inward at each end. The rims add strength to the release plate and also serve as a standoff reducing the contact area between the release plate and the vertical plate to minimize the friction that arises when the release plate rotates with respect to the vertical plate. Also on the face of the release plate opposite the face attached to the input shaft, there is a small solid cylindrical projection 96 that extends out from the center of the face and is surrounded by a wall 98 that circles around and encloses most of the cylindrical projection except for an opening 100 to one side, as shown in FIGS. 8 and 10. The coil at the center of a torsion spring 102 fits around the cylindrical projection 96 and within wall 98 surrounding the cylindrical projection, as shown in FIG. 21. Torsion spring 102, shown isolated in FIGS. 22 through 24, is generally shaped like a coil 104 with two straight segments 106, one segment continuing out from each end of the coil, extending out in opposite directions along lines parallel to each other and set apart by the height of the coil in a plane perpendicular to the circular face of the coil. When looking down on the circular face of the coil the two straight segments appear to form a straight line tangent to the coil, as shown in FIG. 23. The end 108 of each straight segment is bent ninety degrees towards the opposite end of the coil and along lines parallel to the axis going through the center of the coil. One straight side segment of the torsion spring lies along the surface of the release plate and passes through opening 100 in the wall 98. The other straight side segment of the torsion spring exits the other end of the coil and lies along the surface of the flange plate 42 with the bent end 108 of the torsion spring, which appears on the right side when looking at the face of the release plate containing torsion spring 102 oriented such that the straight segments 106 run horizontally below the coil 104, reaching back towards the release plate where it fits into a generally rectangular recessed area 110 on the release plate surrounded by a wall 112. A spacer structure 114 in the shape of a thin, arced segment projecting outward from the face of the release plate contacts the underside of the straight side segment of the torsion spring leading to the rectangular area 110 to keep the tip of the spring from digging into the release plate at the bottom of the rectangular recessed area. The wall 98 about the cylindrical projection 96 continues out from the center of the release plate and forms a triangular enclosure around a triangular recessed area 116 into which opening 100 spills into, and which appears on the left side opposite the rectangular recessed area 110 when looking at the face of the release plate containing torsion spring 102 oriented such that the straight segments 106 run horizontally below the coil 104. The straight segment 106 of the torsion spring that lies along the release plate is situated within the triangular area 116 and can move within this area as the release plate rotates relative to the flange plate. The triangular area is not completely enclosed but the wall 98 around the area is interrupted on the top and bottom sides by short breaks 118 deep enough to allow a spacer structure 115, similar to spacer 114 on the release plate but extending outward from the inner surface of the flange plate towards the release plate, to pass through as the release plate rotates with respect to the flange plate. The front of the release plate is not entirely flat around the cylindrical extension 56 to which the input shaft attaches but rather is raised in the region corresponding to the circular area 52 at the center of the release plate and to the triangular and rectangular areas 116 and 110 on the other side of the release plate. This raised surface 120 has the shape of a circular area with two small winged sections that extend out to either side as far as the triangular and rectangular areas extend and will be used to help keep the release plate oriented with respect to the ramp plate as will be discussed later.

Flange plate 42, shown isolated in FIGS. 25 through 28, is generally shaped like a circular plate with a hollow cylindrical extension 122 with thick sides extending out from around the center of the rear face. Cylindrical extension 122 fits over output shaft 28 and is held in place by a spring pin which passes through a hole 126 in the side of the cylindrical extension 122, then through a hole near the end of the output shaft and then through another hole 126 in the cylindrical extension directly across from the first hole in the cylindrical extension. The front face of flange plate 42 is recessed along the outer edge to create a narrow surface 130 around the circumference of the plate against which the vertical plate lies while the remaining non-recessed surface 132 of the flange plate passes through the large circular cutout 48 in the vertical plate and protrudes out just a bit beyond the vertical plate. A cylindrically shaped recessed area 134 at the center of the front face of flange plate 42 fits over and surrounds the coil of torsion spring 102. Regions 111 and 117, corresponding to the shaped rectangular and triangular areas 110 and 116 found for the torsion spring on the release plate, are carved into the front face of the flange plate and the release and flange plates are arranged so that when they are put together the rectangular area 110 on the release plate is across from the triangular area 117 on the flange plate while the triangular area 116 on the release plate is across from the rectangular area 111 on the flange plate. As with the triangular region on the release plate, the border along the triangular region on the flange plate is not continuous but is interrupted by breaks 119 along the top and bottom which provide clearance for the spacer structure 114 on the release plate so the release plate may rotate with respect to the flange plate. Unlike the torsion spring pattern on the release plate there are no raised rims about the rectangular or triangular regions on the flange plate but rather they are recessed areas.

As the elevation handwheel 20 first begins to rotate clockwise, the release plate 40 begins to rotate clockwise while the flange plate remains stationary momentarily and the inside wall of the triangular area 116 on the release plate pushes one end of the torsion spring 102 while the other end of the torsion spring is held in place by pressing against the inside wall of the triangular area on the flange plate. Thus the torsion spring 102 deforms, or bends, as the release plate rotates with respect to ramp plate 44, that is, as one end of the spring moves relative to the other end. As the release plate rotates counter-clockwise the situation is reversed and the opposite end of the spring is pushed by the inside wall of the rectangular area 110 on the release plate while the other end of the spring is held in place by pressing against the inside wall of the rectangular area on the flange plate. Again the torsion spring deforms as one end moves relative to the other end. The triangular areas are shaped to accommodate the movement of the entire length of the straight segments of the torsion spring, one of which lies against the surface of the flange plate and the other against the release plate, whereas the rectangular areas need only accommodate the bent ends of the torsion spring. Once the flange plate begins turning, both the input and output shafts turn, and the torsion spring remains in a bent configuration due to the drag on the flange plate from the rest of the saw. Only when the elevation handwheel 20 is released does the torsion spring straighten out again resetting the release plate back to its default position with respect to the flange plate.

Figure 29:
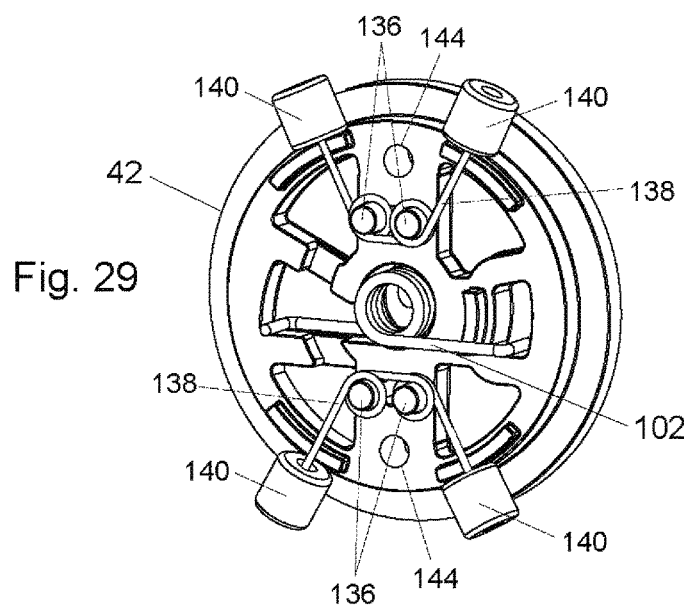
FIG. 29 shows the torsion spring of FIG. 22 and locking springs with locking cylinders situated on the flange plate of the anti-backdrive mechanism shown in FIG. 6.
Figures 30, 31:
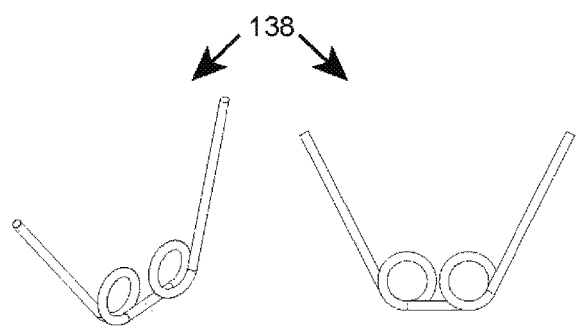
FIG. 30 shows a perspective view of the locking spring shown in FIG. 29.
FIG. 31 shows a front view of the locking spring of FIG. 30.
Figure 32:
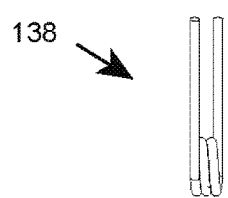
FIG. 32 shows a side view of the locking spring of FIG. 30.
Figure 33:
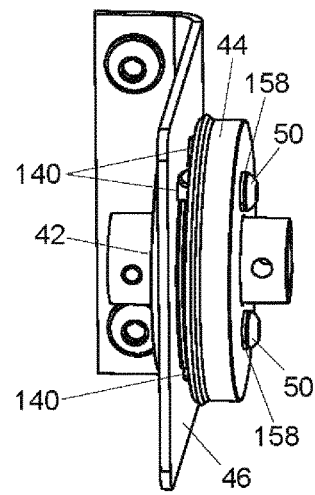
FIG. 33 shows another perspective view of the anti-backdrive mechanism of FIG. 6.

On the front face of the flange plate, which faces the release plate, there are two pairs of cylindrical projections 136 set at equal distances from the center of the plate, one located just above the cylindrical recessed area 134 that surrounds the coil of the torsion spring at the center of the flange plate and one pair below the cylindrical recessed area. Each pair is situated such that a line running through the center of each cylindrical projection in one pair would be parallel to a line running through the straight segments of the torsion spring. A locking spring 138, shaped like two small loops situated side-by-side with a straight segment exiting each loop, fits around each pair of cylindrical projections, one locking spring for each pair of cylindrical projections, as shown in FIG. 29. Locking spring 138 is shown isolated in FIGS. 30 through 32. The two small loops of the locking spring 138 are the same size and are positioned side by side in such a way that the axis through each loop is parallel to each other and separated by a distance that is only slightly larger than the diameter of each loop. The straight segments exit each loop at about a sixty degree outward angle so that an angle of about 120 degrees is formed between them. As mentioned, the two loops in the locking spring fit over the two cylindrical projections 136 and the straight segments extend just a bit past the outer edge of the flange plate. Over the end of each straight segment of each locking spring is placed a small locking cylinder 140 cylindrically shaped with a hole running axially through its length large enough for the straight ends of the locking spring to fit through loosely. The four locking cylinders are held in place by being trapped between the vertical plate and arced recessed areas 146 in ramp plate 44, as can be seen in FIG. 33 and FIG. 34, that follow the arc of the outer edge of the ramp plate. One locking cylinder is trapped within each arced recessed area 146 such that the long side of each cylinder lies against the ramp plate 44 but is allowed to move, or roll, along in an arc just within the outer rim of the ramp plate when pushed by the surfaces 152 along the edge of the winged sections of release plate 40. Four narrow, raised curved sections 154 on flange plate 42 are positioned under each straight segment of the locking spring just below the bottoms of the locking cylinders and cover a width that the spring stretches apart to each side to help keep the spring in position. There are four generally triangular recessed areas 156 carved into the flange plate, one in each corner just inside the raised curved sections 154, to help maintain the flatness of the flange plate during the manufacturing process by keeping a more consistent wall thickness. The flange plate 42 is attached to the ramp plate 44 by the two screws 50 which pass through locking washers 158 and then through bosses 142 in the ramp plate and screw into threaded holes 144 in the flange plate, one located towards the top and one towards the bottom of the flange plate. The screws are situated in such a way that a line joining both screws 50 runs perpendicular to a line running through the straight segments of the torsion spring when the torsion spring is not bent. The bosses on the ramp plate abut the flange plate and set the distance between the ramp plate and the flange plate.

Figure 39:
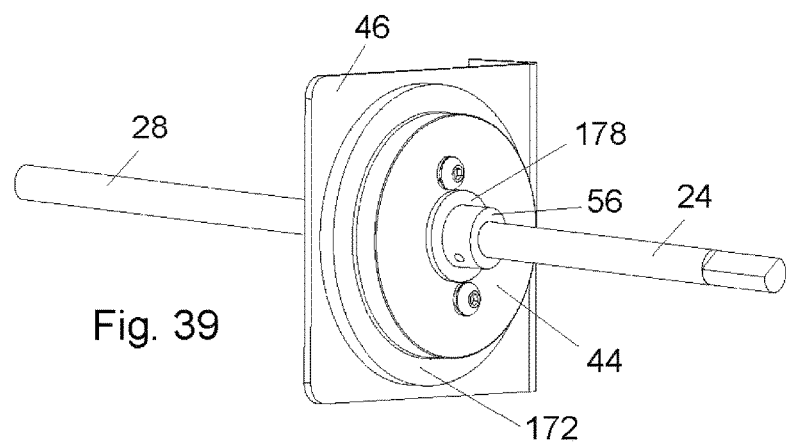
FIG. 39 shows the anti-backdrive mechanism of FIG. 6 with foam filters.
Figure 40:
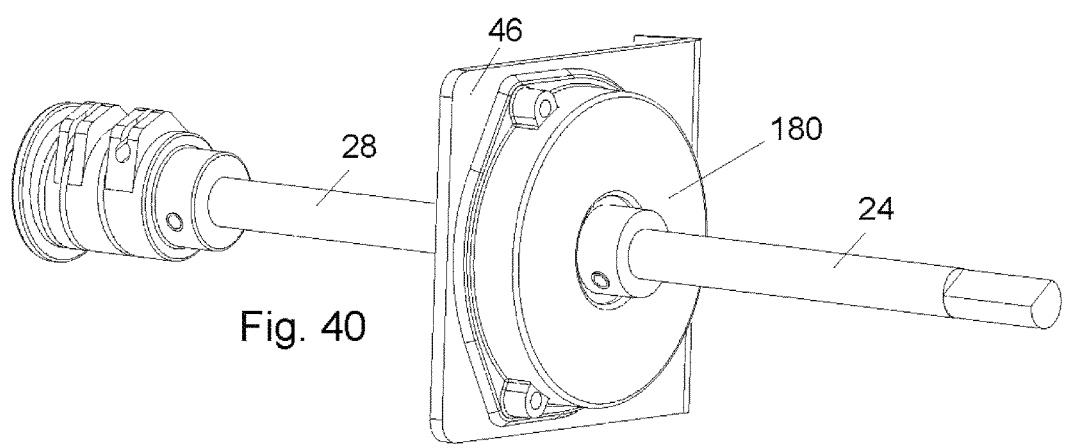
FIG. 40 shows the anti-backdrive mechanism of FIG. 6 with a dust cover.
Figure 41:
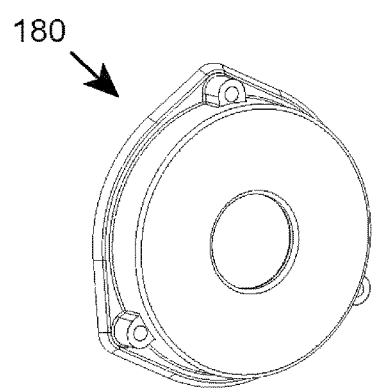
FIG. 41 shows a perspective view of the dust cover of FIG. 40.
Figure 42:
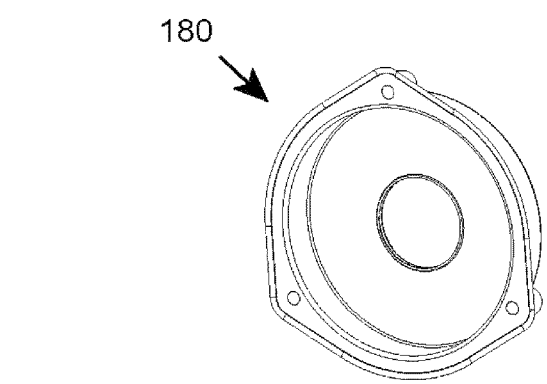
FIG. 42 shows another perspective view of the dust cover of FIG. 40.
Figure 43:
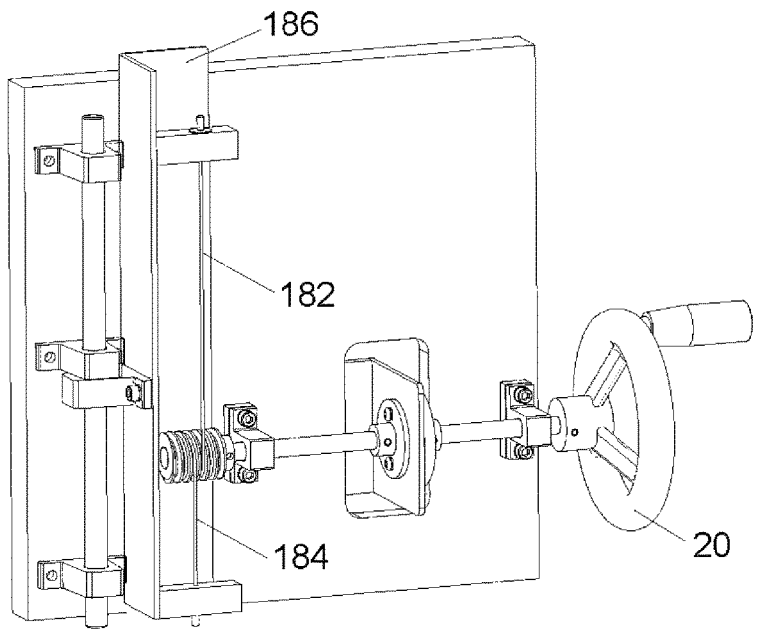
FIG. 43 shows the anti-backdrive mechanism of FIG. 6 driving an elevation mechanism that raises and lowers a blade and is in a fully raised position.
Figure 44:
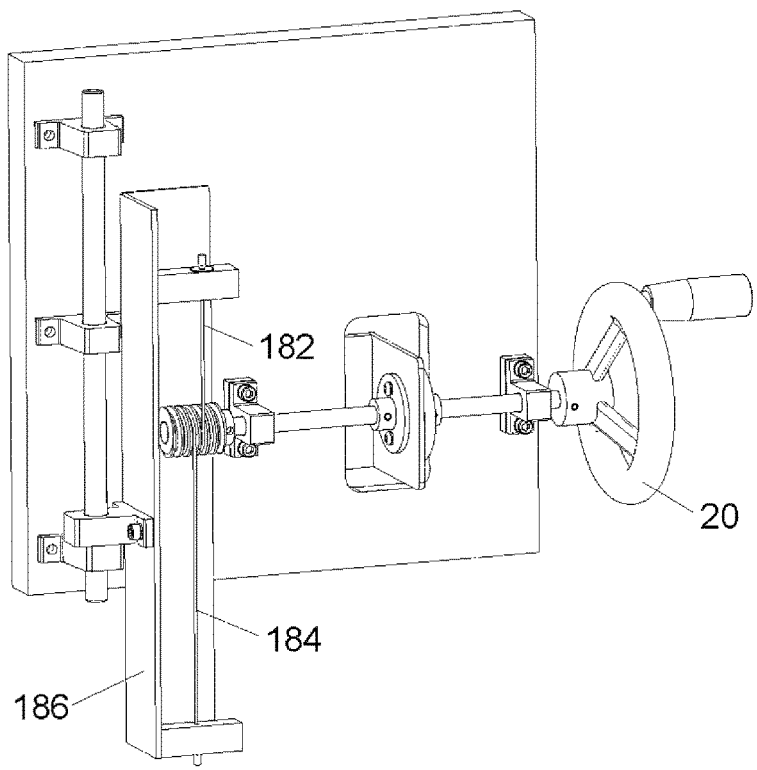
FIG. 44 shows the anti-backdrive mechanism of FIG. 6 driving an elevation mechanism that raises and lowers a blade and is in a fully lowered position.

FIGS. 34 through 38 show ramp plate 44 isolated. Ramp plate 44 is generally shaped like a sided circular plate with a hole 160 in the center through which passes the cylindrical extension 56 on the release plate that surrounds the input shaft 24, and two small holes 162, one above the center hole 160 and one below for screws 50 that attach the ramp plate to the flange plate. The front face of the ramp plate is flat as well as a narrow surface 168 along the outermost edge of the rear face of the ramp plate. The outer side surface 164 around the ramp plate is also flat except for a rim 166 along the rear edge of the outer surface which extends radially outward a bit beyond the outer side surface to form a peak or ridge 170. A foam filter 172, shaped like a flat ring lies along the outer edge of the ramp plate between the vertical plate and the ridge 170, as shown in FIG. 39, to seal the interior of the anti-backdrive mechanism from dust. The part of the ramp plate that presses against the foam filter is peaked in order to minimize friction as the ramp plate turns. Instead of the foam filter a dust cover 180 may be placed over the ramp plate and secured to the vertical plate to help keep dust out of the anti-backdrive mechanism as shown in FIG. 40. Dust cover 180, shown isolated in FIGS. 41 and 42, is shaped like a circular cover with three bosses which are equally spaced along the outside perimeter of the cover and which each have a threaded hole. A screw passes through each threaded hole to attach the cover to the vertical plate. The surface along the edge of the dust cover is flat in order to lie flat up against the vertical plate to help keep the dust out. As shown in FIG. 39, a second smaller flat, ring-shaped filter 178 may be added on the front face of the ramp plate surrounding the cylindrical extension 56 of the release plate to help seal the interior of the anti-backdrive mechanism from dust.

Around the center of the inside face of the ramp plate there is a recessed area 174 shaped like a circle with radial sweeps to each side into which fits the correspondingly shaped raised area 120 on the front of the release plate with a little extra room to accommodate a slight rotation of the released plate. As mentioned earlier, raised area 120 fitted within recessed area 174 helps to keep the release plate oriented with respect to the ramp plate such that the release plate may rotate about 8 degrees in either direction from a centered position relative to the ramp plate. On the inside face of the ramp plate just beyond each screw 50 and between each arced recessed area 146 that run along the outer rim of the ramp plate there are two generally triangular-shaped raised areas that function as stops 176. The outer edge of the stops follow the arc of the outer rim of the ramp plate and the sides of stops 176 follow radial lines moving inward which give them their triangular shape though the stops end before the radial lines intersect so that the tip of the triangle is clipped. The surface along the arced recessed areas 146 on either side of each stop starts with a level rectangular surface 148 near each side of each stop followed by a ramped surface 150 that ramps up to a higher level surface moving away from the stop in either direction, as shown in the cross-sectional view in FIG. 38. The difference between the level of the surface in the arced recessed areas and the adjoining non-recessed surface forms a boundary that helps keeps the locking cylinders confined to the arced recessed area.

The default state of the anti-backdrive mechanism occurs when there is no torque being applied to the elevation handwheel. In the default state the locking cylinders within each pair are forced apart from each other by the locking spring 138 to which they are linked and rest upon the ramped surfaces 150 of the arced recessed areas about half way up the ramp where they become wedged between the bottom surface of the ramp and the vertical plate 46. Also in the default state, torsion spring 102 keeps the release plate oriented symmetrically about a straight line passing through the two screws 50 and the hole 160 in the center of the ramp plate. If a torque is applied to output shaft 28 while the anti-backdrive mechanism is in the default state, the ramp plate will start to turn and two of the locking cylinders 140 will try to move farther up the ramp more strongly wedging the cylinders between the vertical plate and the ramp plate. If the output shaft turns clockwise the upper, left cylinder (when seen from the front of the saw) and the lower, right cylinder will become more strongly wedged. If the output shaft is turned counter-clockwise the other two cylinders will become more strongly wedged. This prevents the ramp plate and thus both the input and output shafts from rotating under the torque applied to the output shaft.

Turning the elevation handwheel 20 releases the anti-backdrive mechanism from the default state. As the input shaft turns, the release plate attached to the end of the input shaft rotates and contacts two of the locking cylinders dislodging them by pushing them down their ramps and against stops 176 which transfers the rotating motion to the ramp plate and to the output shaft attached to the ramp plate. When the elevation handwheel is turned clockwise, the input shaft turns clockwise and the cylinders that are dislodged are the upper-left cylinder and the lower-right cylinder (when seen from the front of the saw). The other two cylinders simply move down their ramps toward the stops as the ramp plate turns so that they do not interfere with the rotating motion. When elevation handwheel 20 is turned counter-clockwise, the upper-right and bottom-left cylinders are pushed toward stops and the other two cylinders move down their ramps toward the stops as the ramp plate rotates. When the elevation handwheel is released, the torsion spring 102 pulls the release plate back to the default position relative to the ramp plate and the locking springs push the locking cylinders 140 up the ramps until they are again wedged between the vertical plate and the ramp plate. A distance is kept between each locking cylinder and the edge of the release plate near each locking cylinder to keep the release plate from accidently hitting the locking cylinders and releasing the anti-backdrive mechanism from the locked state when the elevation handwheel is bumped or when there is vibration or other unintended movement that might cause the input shaft to rotate slightly.

As the elevation handwheel is turned, the output shaft 28 turns along with the cable pulley attached to the end of the output shaft and cables wind or unwind to change the elevation of the blade support structure and blade. There are two cables 182 and 184 attached to cable pulley 30. Cable 182 is attached to cable pulley 30 at one end, winds clockwise about cable pulley and then extends vertically upward and attaches at the other end to the top of blade support structure 186. The other cable, cable 184, is attached to cable pulley 30 at one end, winds counter-clockwise about the cable pulley and then extends vertically downward and attaches at the other end to the bottom of the blade support structure 186. When the elevation handwheel 20 is turned clockwise, the cable pulley turns clockwise and cable 182 unwinds while cable 184 winds, thus pulling the bottom of the blade support structure upward and raising the blade. When the elevation handwheel 20 is turned counter-clockwise, the cable pulley turns counter-clockwise and cable 182 winds while cable 184 unwinds allowing the bottom of the blade support structure 186 to move down and lower the blade. Whether the elevation handwheel is turned clockwise or counter-clockwise, it is the bottom cable 184 which raises or lowers the blade against the downward force of gravity and any unexpected downward force that might arise and would need to be counteracted while the upper cable follows the motion and helps to keep the blade at the set elevation in the case an upward force might arise which would need to be counteracted. A gas spring may be installed in the saw to counteract the downward force of gravity thus allowing the elevation handwheel to be turned more easily and with a more consistent feel whether turning the handle clockwise or counter-clockwise.

Gears could be used to implement the elevation mechanism instead of cables but cables provide some benefits different than gears. For example, cables absorb vibration, they provide a smooth feel as the operator turns the handle to raise or lower the blade, and dust is less likely to build up on cables and degrade performance as often happens with gears. An elevation mechanism using a cable pulley is one type of elevation mechanism, alternative types of elevation mechanisms are discussed below.

FIGS. 45 through 65 show another design for an anti-backdrive mechanism 200 this time incorporating a spring lock. Once again the overall assembly is composed of three main sub-assemblies that move relative to one another: an input shaft assembly 202 shown in FIG. 45, an output shaft assembly 204 shown in FIG. 46 and a fixed assembly 206 shown in FIG. 47. The complete assembly incorporating a spring-lock anti-backdrive mechanism is shown in FIG. 48.

Figure 45:
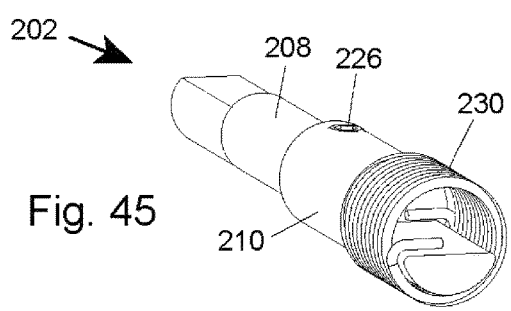
FIG. 45 shows an input assembly of an anti-backdrive mechanism shown in FIG. 48.
Figure 46:
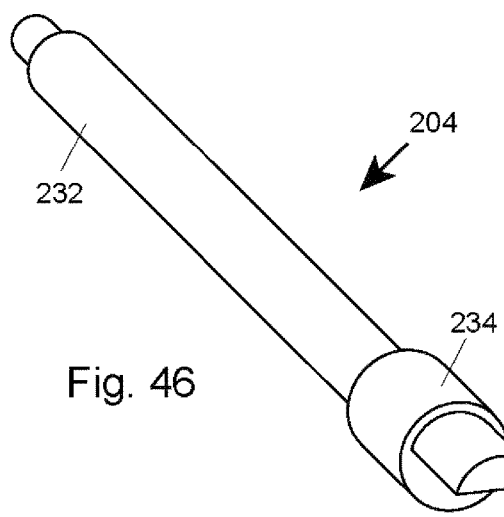
FIG. 46 shows an output assembly of an anti-backdrive mechanism shown in FIG. 48.
Figure 49:
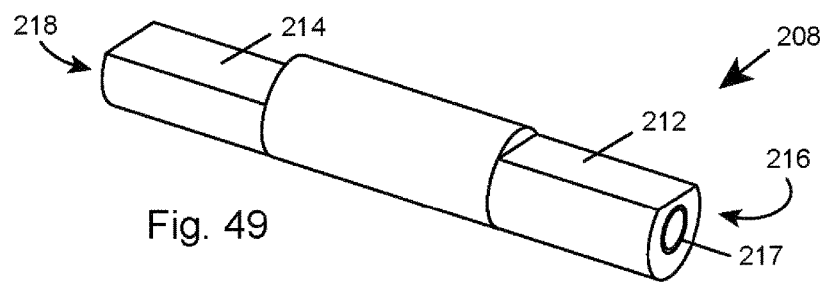
FIG. 49 shows a perspective view of the input shaft of the input assembly in FIG. 45.
Figure 50:
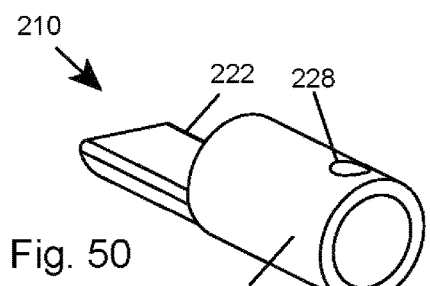
FIG. 50 shows a perspective view of the input arm of the input assembly in FIG. 45.
Figure 51:
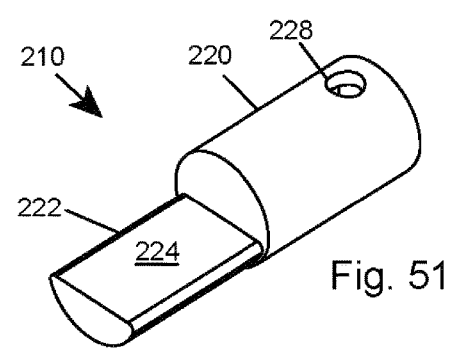
FIG. 51 shows another perspective view of the input arm of FIG. 50.
Figure 52:
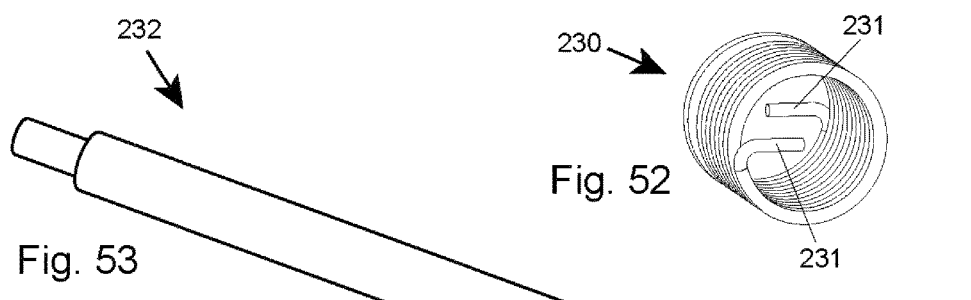
FIG. 52 shows a perspective view of the torsion spring of the input assembly in FIG. 45.
Figure 53:
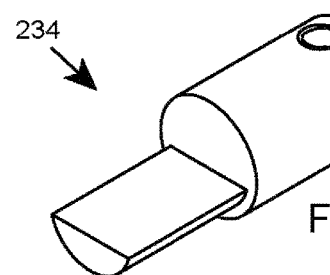
FIG. 53 shows a perspective view of the output shaft of the output assembly in FIG. 46.
Figure 54:
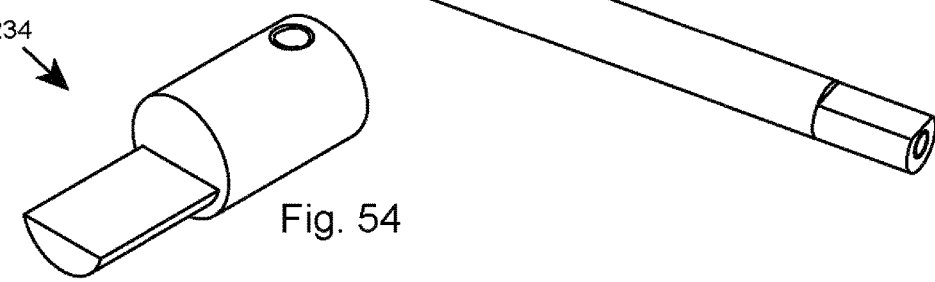
FIG. 54 shows a perspective view of the output arm of the output assembly in FIG. 46.

The input assembly 202 includes an input shaft 208 attached to an input arm 210. Input shaft 208, shown isolated in FIG. 49, is shaped like a solid cylindrical rod with portions cut out longitudinally at each end so to create flat rectangular surfaces 212 and 214 that lie parallel to each other. At one end 216 of the shaft the portion cut away from the shaft to form flat surface 212 runs about as deep as one-eighth of the diameter of the shaft. This end 216 also has a hole 217 running through it along the axis and is used to mount the handwheel 20. A greater portion is cut away at the other end 218 of the shaft running about as deep as one-quarter the diameter of the shaft to form flat surface 214. This end 218 fits into input arm 210, shown isolated in FIGS. 50 and 51. Input arm 210 has a cylindrical section 220 shaped like a hollow cylinder which is followed by a solid semicircular section 222 of nearly equal length that extends out lengthwise, concentric with cylindrical section 220, and is shaped like a solid cylinder cut straight along its length a bit below the diameter so that the semicircular section is less than half of a solid cylinder and has a flat surface 224 the edges along each side of which are rounded. Input arm 210 fits over the end section 218 of the input shaft and is secured by a set screw 226 which passes through a hole 228 on the side of the cylindrical section of the input arm and contacts the flat surface 214 at the end of the input shaft. A torsion spring 230 is placed over the semicircular end of the input arm 210, as shown in FIG. 45. Torsion spring 230, shown isolated in FIG. 52, is shaped like a coil with the ends 231 bent directly inward along radial lines toward the axis of the coil from opposite sides of the coil and opposite ends of the coil such that both straight ends are parallel to each other and also parallel to planes that run perpendicular to the axis through the coil, and both straight ends lie in a common plane which runs along the axis of the coil. The bent ends wrap around the rounded corners and lie over and parallel to the flat surface 224 of the input arm, as shown in FIG. 45. The output shaft assembly, shown in FIG. 46, is similar to the input shaft assembly with an output shaft 232, shown isolated in FIG. 53, that has a portion cut away at one end like end 218 of the input shaft over which is placed an output arm 234 shaped similarly to the input arm 210 except that the output arm 234 has cornered edges along the sides of the semicircular section instead of rounded edges as can be seen in FIG. 54. The length of the semicircular section of the output arm is the same as the length of the semicircular section of the input arm. The end of the output shaft 232 opposite the end that attaches to the output arm will have a configuration suitable for the specific design of the elevation mechanism to which it would be attached.

Figure 47:
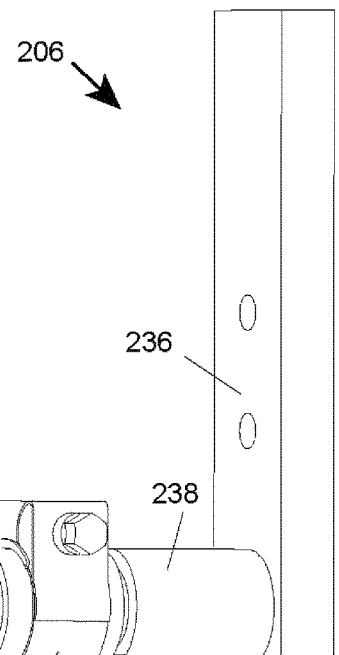
FIG. 47 shows a fixed assembly of an anti-backdrive mechanism shown in FIG. 48.
Figure 48:
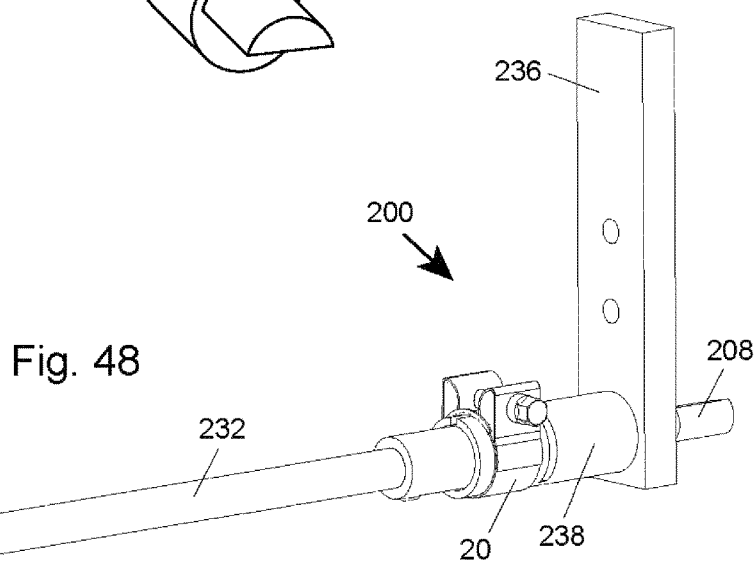
FIG. 48 shows a spring lock anti-backdrive mechanism assembly incorporating the input assembly of FIG. 45, the output assembly of FIG. 46 and the fixed assembly of FIG. 47.
Figure 55:
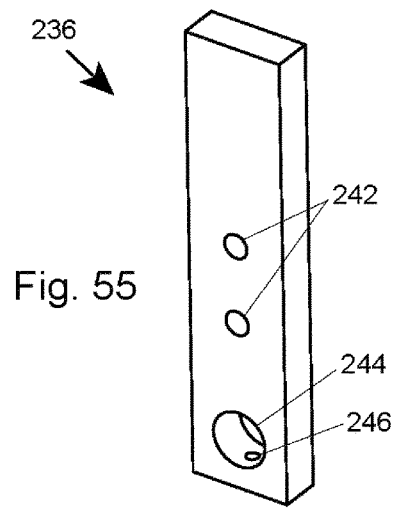
FIG. 55 shows a perspective view of the mounting block of the fixed assembly in FIG. 47.
Figure 56:
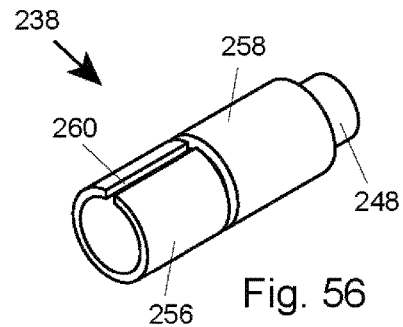
FIG. 56 shows a perspective view of the spilt cylinder of the fixed assembly in FIG. 47.
Figure 57:
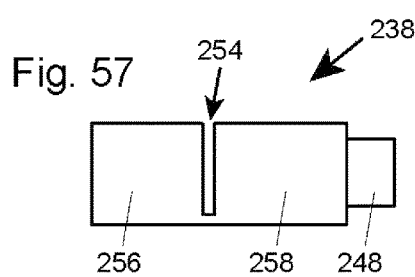
FIG. 57 shows a side view of the split cylinder of FIG. 56.
Figure 58:
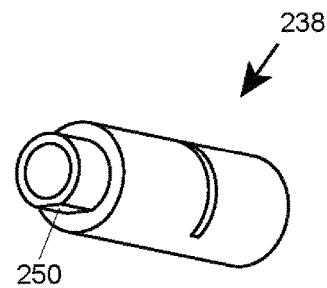
FIG. 58 shows another perspective view of the split cylinder of FIG. 56.
Figure 59:
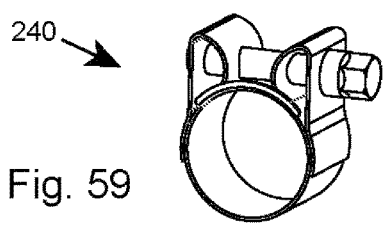
FIG. 59 shows a perspective view of the hose clamp of the fixed assembly in FIG. 47.
Figure 60:
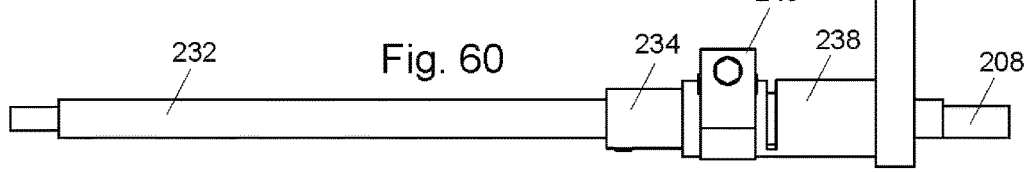
FIG. 60 shows a side view of the anti-backdrive mechanism assembly of FIG. 48.

FIG. 47 shows fixed assembly 206 which consists of a mounting block 236 that supports a split cylinder 238 which is surrounded at one end by a hose clamp 240. Mounting block 236, shown isolated in FIG. 55, is shaped like a narrow rectangular block, vertically oriented, with two small holes 242 located near the middle of the block, one above the other, a large hole 244 located towards the bottom of the mounting block and a small hole 246 which comes up from the bottom edge of the block and passes through to the large hole 244. Small holes 242 are used for screws that rigidly attach the block to the internal structure of the saw. The large hole 244 is used to mount the split cylinder 238. Split cylinder 238, shown isolated in FIGS. 56 through 58, is shaped like a hollow cylinder split into three sections. One end section 248 is shaped like a hollow cylinder of about half the diameter and about one-fifth the length of the entire split cylinder and which is flattened along one side to create a flat surface 250. The end section 248 of the split cylinder fits within large hole 244 located towards the bottom of the mounting block 236. The split cylinder is rigidly attached to the mounting block by a set screw which passes through hole 246 in the bottom edge of the mounting block and presses against the flat surface 250 of the short end section of the split cylinder. The other two sections 256 and 258 of the split cylinder are of the same diameter and nearly equal length with the cylindrical section 256 at the end of the split cylinder being slightly shorter in length than section 258. A gap 254 separates the two cylindrical sections 256 and 258. Gap 254 runs perpendicular to the axis of the split cylinder and goes almost all the way through the split cylinder leaving only a small portion of less than one-eighth the diameter of the cylinder intact. Another narrow segment is cut out along the top of the shorter section 256 running along the length of the section forming a gap 260 that allows the sides of section 256 to be squeezed together, as shown in FIG. 56. Hose clamp 240, shown isolated in FIG. 59, is placed over section 256, as shown in FIG. 60, so that the inner diameter of the section 256 may effectively be reduced.

Figure 61:
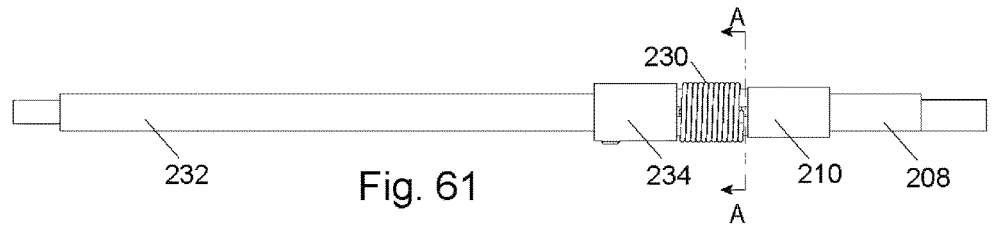
FIG. 61 shows a side view of the input and output assemblies of FIGS. 45 and 46 put together.

The anti-backdrive mechanism is assembled with the input and output shafts aligned concentrically and the output arm 234 positioned above the input arm 208 so that the flat surfaces of each arm face each other but are separated by a gap. The output arm fits within the torsion spring 230 above the two ends of the torsion spring that are wrapped around the input arm 208 so that the torsion spring encompasses the two arms, as shown in FIG. 61. The input and output assemblies 202 and 204 are positioned in the fixed assembly 206 with the longer section 258 of the split cylinder overlapping the cylindrical portion of the input arm and section 256 with the gap along the top overlapping the torsion spring as shown in FIGS. 60 and 61. To compensate for manufacturing variations in the fabrication of the spring the adjustable hose clamp 240 is placed around the spring and is adjusted to align the two ends of the spring along the same line so that there is some room for the input and output arms to rotate enough in each direction to effectively deform the spring. The natural diameter of the torsion spring is made slightly larger than the split cylinder so that the spring presses firmly against the inner surface of the split cylinder when the spring is encased in the split cylinder. This keeps the spring in firmly in place.

Figure 62:
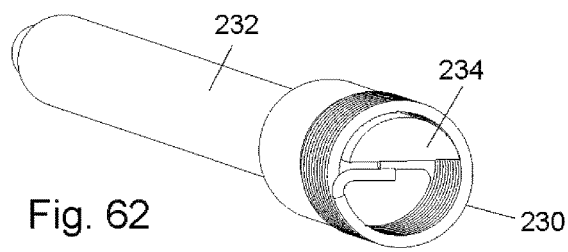
FIG. 62 shows a perspective view of the torsion spring of FIG. 52 placed over the end of the output assembly of FIG. 46.
Figure 63:
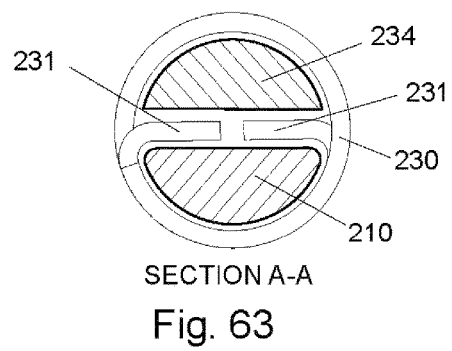
FIG. 63 shows a cross-sectional view of section A-A shown in FIG. 61 which illustrates the input and output arms of FIGS. 50 and 54 positioned within the torsion spring of FIG. 52.
Figure 64:
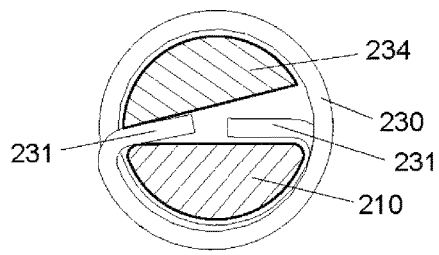
FIG. 64 shows the cross-sectional view of FIG. 63 but with the output arm rotated within the torsion spring and the consequent deformation of the torsion spring.

When the output shaft 232 starts to rotate, the output arm 234 rotates and presses against one end of the torsion spring. The torsion spring is wound in such a way that each end starts parallel to the flat surface of the output arm and then turns away from the output arm, as shown in FIGS. 62 and 63, so the torsion spring will tend to increase in diameter near the end of the torsion spring that the output arm presses against, as shown in FIG. 64. However, the torsion spring is prevented from increasing its diameter because it is already pressing up against the inner surface of the split cylinder so the torsion spring presses against the spilt cylinder even more increasing its resistance from being turned relative to the split cylinder. Ideally, the torsion spring would be made of square wire that is wound into a coil as this would increase the surface area of the spring that is in contact with the inner surface of the split cylinder thereby increasing the friction between the spring and the split cylinder making the spring difficult to turn. When the output shaft is turned in the opposite direction it presses against the other end of the spring but with the same result. Thus the output shaft is prevented from rotating in either direction when a torque is applied to the output shaft. As described earlier, a torque on the output shaft may arise from the load of the blade and blade elevation support structure on the elevation mechanism attached to the end of the output shaft.

Figure 65:
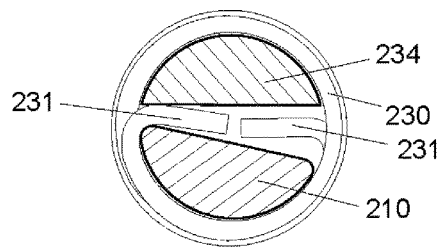
FIG. 65 shows the cross-sectional view of FIG. 63 but with the input arm rotated within the torsion spring and the consequent deformation of the torsion spring.

As the input shaft rotates, input arm 210 rotates and presses on one end of torsion spring 230. Recall that the torsion spring is wound in such a way that it starts parallel to the flat surface of the input arm and then curls around the curved surface of the semicircular section of the input arm and then the end of the spring folds over the edge of the input arm and extends over the flat surface so that when the input arm rotates it pulls the end of the spring in the direction that the spring is wound thus decreasing the diameter of the spring, as shown in FIG. 65. The diameter of the spring is most greatly decreased at the end of the spring that the input arm is pushing against and then less and less so moving toward the other end of the coil. The decrease in the diameter of the spring reduces the force of the spring against the inner surface of the split cylinder which reduces the friction thus allowing the spring and input arm to rotate together within the split cylinder. There will be a certain level of frictional drag arising from the portion of the spring that still has a larger diameter but this drag is easily overcome by the torque applied to the input shaft through the handwheel. The output arm which is confined within the spring is forced to rotate as the input shaft rotates and presses against the spring which then presses against the edge of the output arm causing the output shaft to turn. When the input shaft is turned in the opposite direction it presses against the other end of the spring with the same result. Thus, both the input and output shafts rotate as the handwheel rotates in either direction.

FIGS. 66 through 83 show another variation of an anti-backdrive mechanism 300 using a spring lock. Once again the overall assembly is composed of three main sub-assemblies: an input shaft assembly 302 shown in FIG. 66, an output shaft assembly 304 shown in FIG. 67 and a fixed assembly 306 shown in FIG. 68. The complete assembly incorporating a spring-lock anti-backdrive mechanism is shown in FIG. 69.

Figure 70:
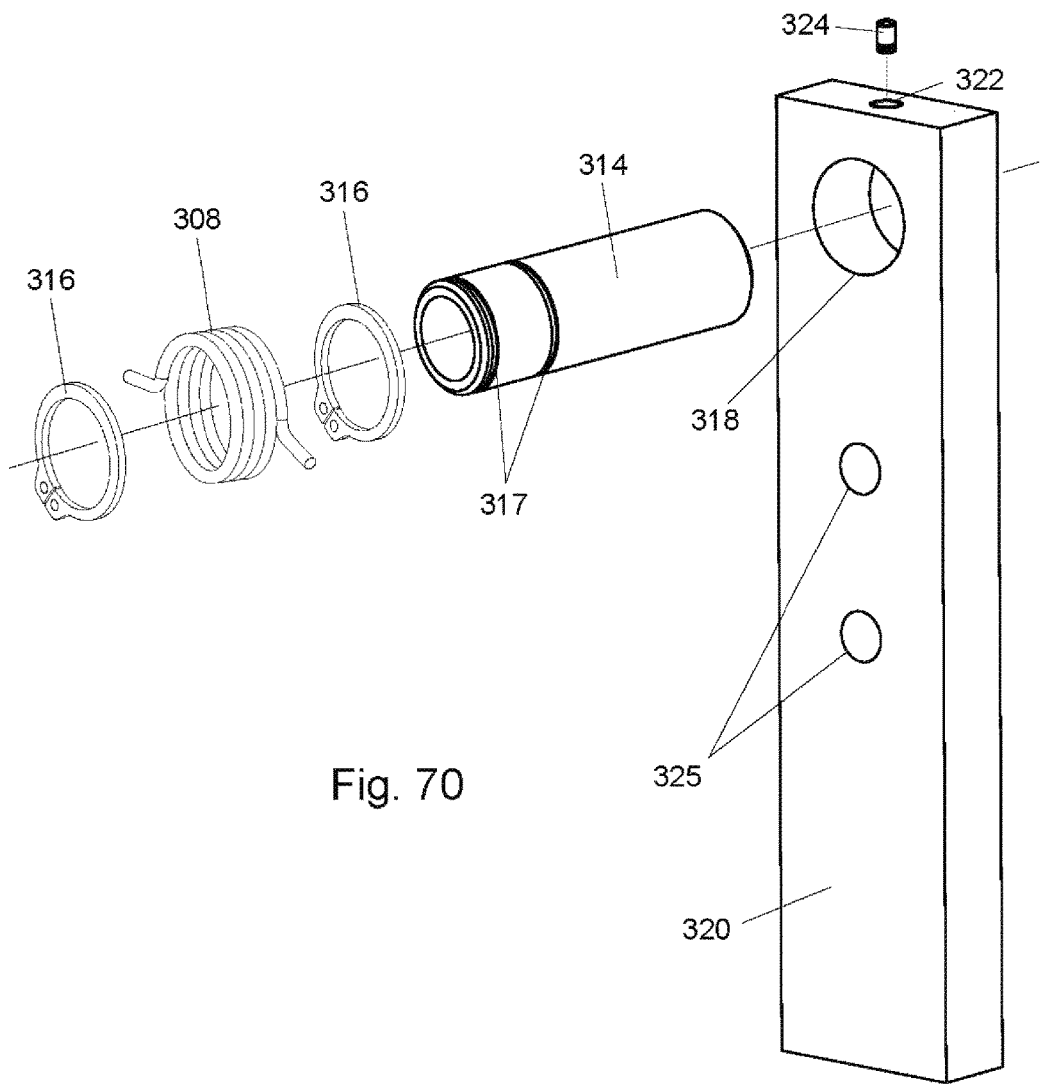
FIG. 70 shows an exploded view of the fixed assembly of FIG. 68.
Figure 71:
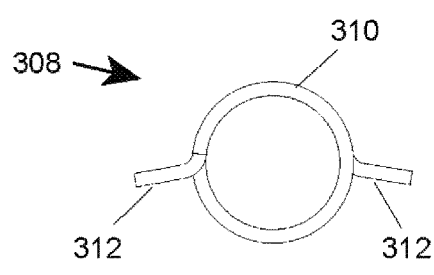
FIG. 71 shows a front view of the spring in the fixed assembly of FIG. 70.
Figure 72:
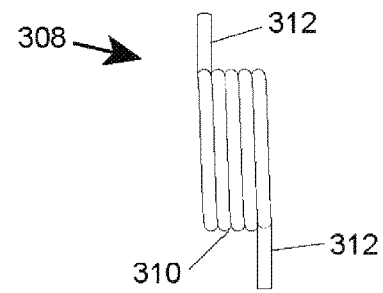
FIG. 72 shows a side view of the spring in FIG. 71.

Anti-backdrive mechanism 300 uses a spring 308 shaped like a coil 310 with the two ends 312 exiting outward from the coil on opposite sides of the coil, as shown in FIGS. 70, 71 and 72. Each spring end 312 consists of a short, straight segment that exits the coil at an angle of a little over ninety degrees with the winding leading to the spring end. An angle of over ninety degrees helps to strengthen the spring against deformations as a force is applied repeatedly to the ends of the spring and more effectively transfers the force tending to unwind the coil. As shown in FIG. 70, which is an exploded view of the fixed assembly 306, spring 308 fits around a cylinder 314 which is fixed to the saw structure. Spring 308 is confined to an area along the cylinder by two E-clips 316, one placed in each of two grooves 317 on the fixed cylinder near each end of the coil so that the space between the E-clips is just slightly larger than the length of the coil. Cylinder 314 passes through a large hole 318 near the top end of a mounting block 320 which also has a small threaded hole 322 drilled into the top edge of the mounting block down toward the large hole 318 through which cylinder 314 passes and in which a set screw 324 is installed, the bottom of which makes contact with the outer surface of cylinder 314 to keep the cylinder from moving. The mounting block 320 also has two threaded holes 325 aligned one above the other along the centerline of the mounting block near the middle of the mounting block through which pass screws to rigidly mount the mounting block to the internal structure of the saw. Thus the fixed cylinder 314 and mounting block 320, being rigidly attached to the internal saw structure, do not move relative to the other components of the anti-backdrive mechanism.

Figure 73:
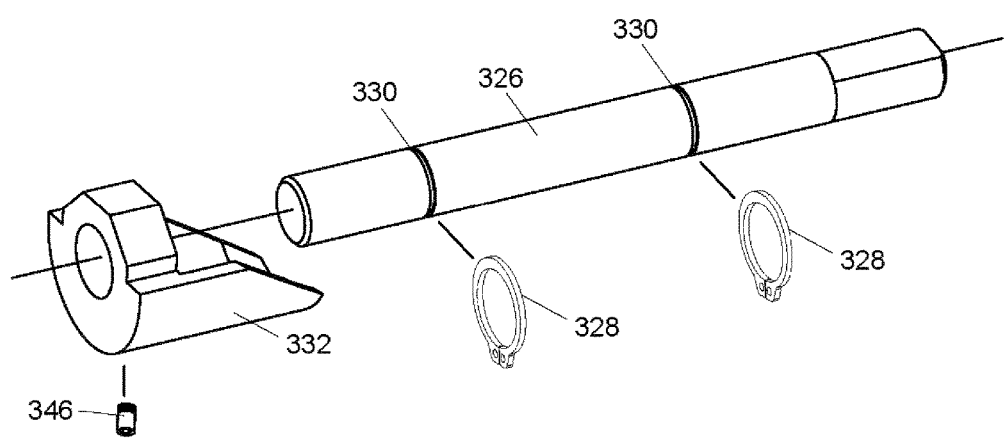
FIG. 73 shows an exploded view of the input assembly of FIG. 66.
Figure 74:
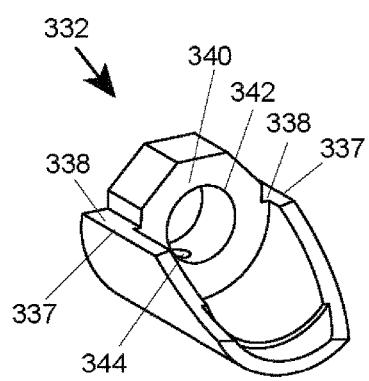
FIG. 74 shows a perspective view of the input engager of the input assembly of FIG. 73.
Figure 75:
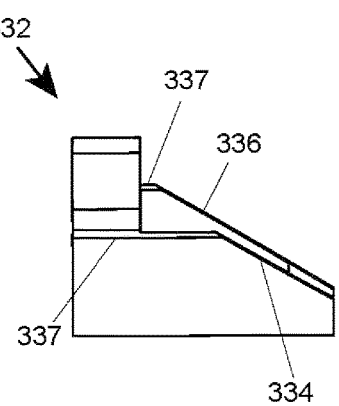
FIG. 75 shows a side view of the input engager of the input assembly of FIG. 73.
Figure 76:
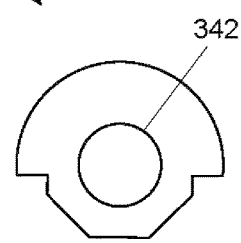
FIG. 76 shows a rear view of the input engager of the input assembly of FIG. 73.

The input shaft assembly, shown in FIG. 73, consists of input shaft 326 attached to an input engager 332 which fits over the end of the input shaft. Input engager 332, shown isolated in FIGS. 74 through 76, is shaped like a cylinder first cut lengthwise in half and then cut at an angle lengthwise along each side starting from near the bottom of the same end and continuing near or just past the middle of the length of the cylinder until the angled cuts 334 and 336 on each side meet horizontal cuts 337 along which the cylinder was cut in half lengthwise. One side angled cut 334 continues for about half the length of the half-cylinder and the angled cut 336 on the other side continues for about two thirds the length of the half-cylinder, as can best be seen in FIG. 75. The remainder of each side is cut horizontally forming two horizontal surfaces 338 at the end of the half-cylinder that are on the same plane. At the end of the input engager, spanning the gap between and rising above the horizontal surfaces 338, there is a thick wall 340 that is generally circular in shape and vertically oriented, and has a large hole 342 that is aligned coaxially with the cylinder. The wall 340 continues above the sides of the half-cylinder but stays within a radius a little smaller than the radius of the half-cylinder. A small threaded hole 344 passes through the bottom side of the half-cylinder underneath wall 340 and empties into the large hole 342 in wall 340. The input shaft 326 is inserted into the large hole 342 in wall 340 and a set screw 346 is installed in the threaded hole 344 along the bottom side of the input engager so that the bottom of the set screw makes firm contact with the side of the input shaft to rigidly attach the input engager to the input shaft. Input shaft 326 of the input assembly 302 passes through the interior of cylinder 314 in such a way that it is free to rotate within the cylinder. Two E-clips 328 fit into grooves 330 on the input shaft, one on each side of the cylinder, to fix the relative positions of the cylinder to the input shaft.

Figure 77:
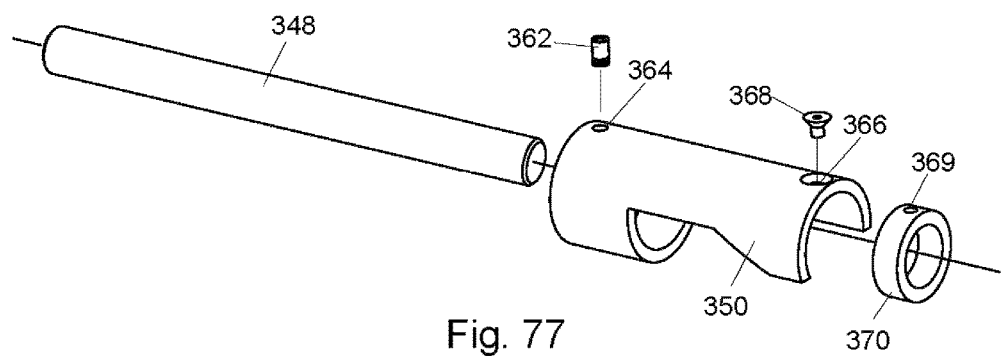
FIG. 77 shows an exploded view of the output assembly of FIG. 67.
Figure 78:
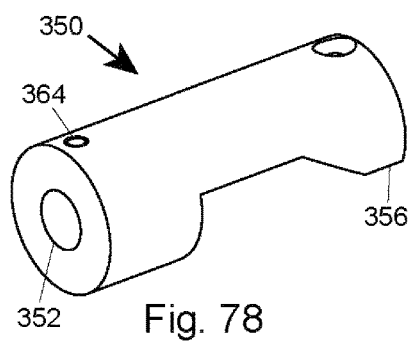
FIG. 78 shows a perspective view of the output engager of the output assembly of FIG. 77.
Figure 79:
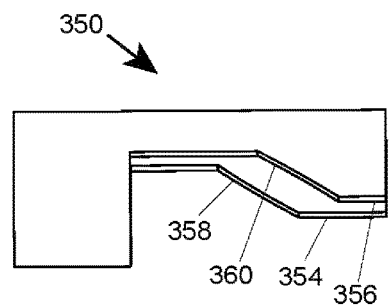
FIG. 79 shows a side view of the output engager of the output assembly of FIG. 77.
Figure 80:
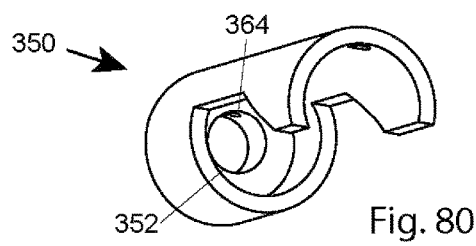
FIG. 80 shows another perspective view of the output engager of the output assembly of FIG. 77.

The output shaft assembly 304, shown as an exploded view in FIG. 77, consists of an output shaft 348 attached to an output engager 350 which fits over the end of the output shaft. Output engager 350, shown isolated in FIGS. 78 though 80, is shaped mostly like a cylinder with one end that is left open and one end that is closed except for a large hole 352 aligned coaxially with the cylinder. At the open end, the cylinder is cut horizontally for a short distance along each side just below a plane longitudinally cutting the cylinder in half so that the portion that is removed at the end is less than the portion that remains at the end. As shown in FIG. 79, the horizontal cuts continue for about one-fourth the length of the cylinder, with the horizontal cut 354 on one side of the cylinder, the right side when looking directly at the open end of the cylinder, slightly longer than the cut 356 on the other side, at which point the cut continues at an angle up to and about half a radius past the plane longitudinally cutting the cylinder lengthwise. Horizontal cut 354 leads into angle cut 358 and the longer horizontal cut 356 leads into angle cut 360. The angled cuts 358 and 360 continue for about another one-fourth of the length of the cylinder after which the cuts becomes horizontal again for about another one-fourth of the length of the cylinder. The last one-fourth of the cylinder, or actually slightly more than one-fourth, is completely cylindrical to the closed end. The angled cuts 358 and 360 on the output engager are cut at the same angle as the angled cuts 334 and 336 on the input engager so that they lie parallel to each other with a gap in between when the mechanism is assembled. The output shaft 348 is inserted into the large hole 352 at the end of the output engager and a set screw 362 is installed in a threaded hole 364 along the side of the output engager that empties into the large hole 352 so that the bottom of the set screw makes firm contact with the side of the output shaft to rigidly attach the output engager to the output shaft. Another hole 366 passes through the side of the output engager near the open end and a screw 368 passes through this hole and threads into a threaded hole 369 in a collar 370 which is like a large metal ring that surrounds the fixed cylinder 314 seated on the input shaft and supports the end of the output engager by keeping it positioned coaxially with the input shaft while allowing the output engager to rotate freely around the fixed cylinder.

Figure 81:
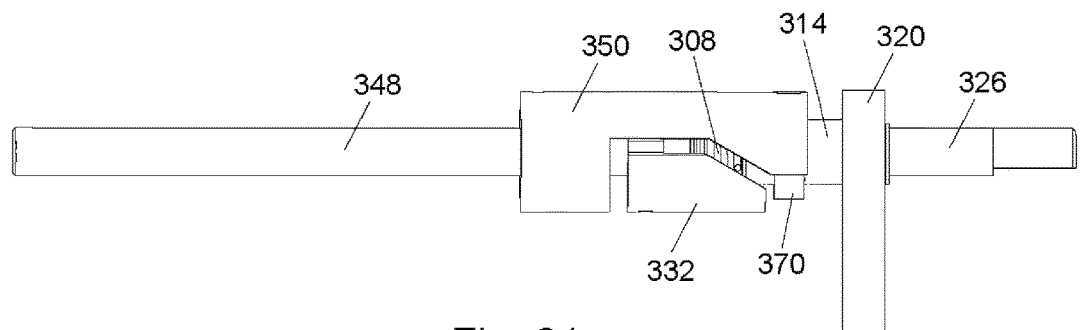
FIG. 81 shows a side view of the anti-backdrive mechanism assembly in FIG. 69.
Figure 82:
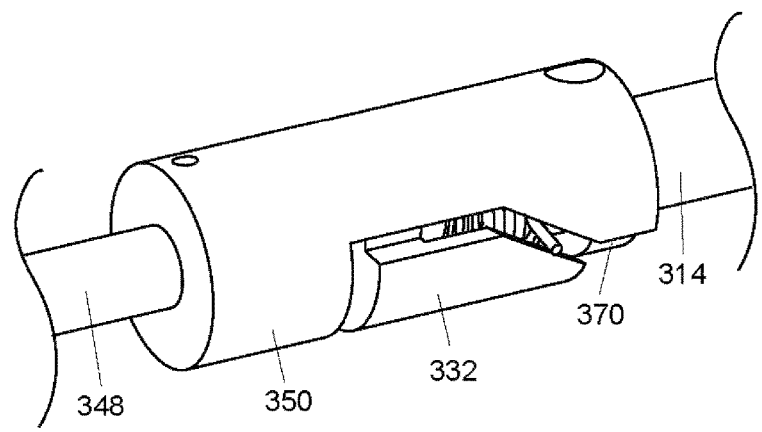
FIG. 82 shows a perspective view of a portion of the anti-backdrive mechanism assembly in FIG. 69 showing the spring relative to the input and output engagers.
Figure 83:
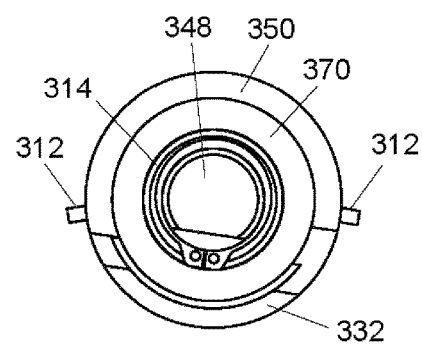
FIG. 83 shows a front view of the nested input and output assemblies showing the ends of the spring sticking out the sides of the input and output engagers.

The anti-backdrive mechanism is assembled with the input and output shafts 326 and 348 arranged concentrically and with the output engager 350 interlaid with the input engager 332 so that the spring 308 is surrounded and angled sides 334 and 336 on the input engager face and are parallel to the angled sides 358 and 360 on the output engager with a gap in between through which extend the ends of spring 308, one end extending out through each side and slanting slightly toward the input engager, as shown in FIGS. 81 through 83. A gap is left between the collar 370 and the end of the input engager 332 to provide clearance.

As the input shaft 326 rotates one of the angled cuts 334 and 336 of the input engager 332 hits an end 312 of the spring 308 and pushes it in the direction of, or towards the last winding of the spring as if to unwind the spring so that the spring expands increasing in diameter most greatly near the end of the spring that is being pushed and less and less moving towards the other end of the spring. When the diameter of the spring 308 increases, the spring loosens so that it turns about the fixed cylinder 314 as the input shaft rotates with a frictional drag that is easily overcome by the torque applied in the input shaft through the handwheel. When the input shaft rotates in the other direction, the angled cut on the other side of the input shaft contacts the other end 312 of the spring 308 which again loosens the spring so that it is free to rotate. Thus, both the input and output shaft rotate as the handwheel rotates in either direction.

A different situation arises as the output shaft rotates. In this case, an angled cut 358 or 360 of the output engager 350 hits an end 312 of the spring 308 and pushes it in the direction of the spring winding which tends to tighten the spring around the fixed cylinder preventing the output shaft from rotating. When the output shaft rotates in the other direction the angled cut on the other side of the output shaft contracts the other end of the spring 308 which again tightens the spring preventing the shaft from rotating. Thus, neither the output shaft nor the input shaft is able to rotate when a torque is applied to the output shaft.

FIGS. 84 through 105 show another design for an anti-backdrive mechanism 400 built around two metal plates situated in a set of three concentrically nested metal cylinders. Once again the overall assembly is composed of three main sub-assemblies: an input shaft assembly 402 shown in FIG. 84, an output shaft assembly 404 shown in FIG. 85 and a fixed assembly 406 shown in FIG. 86. The complete assembly incorporating anti-backdrive mechanism 400 is shown in FIG. 87.

Figure 88:
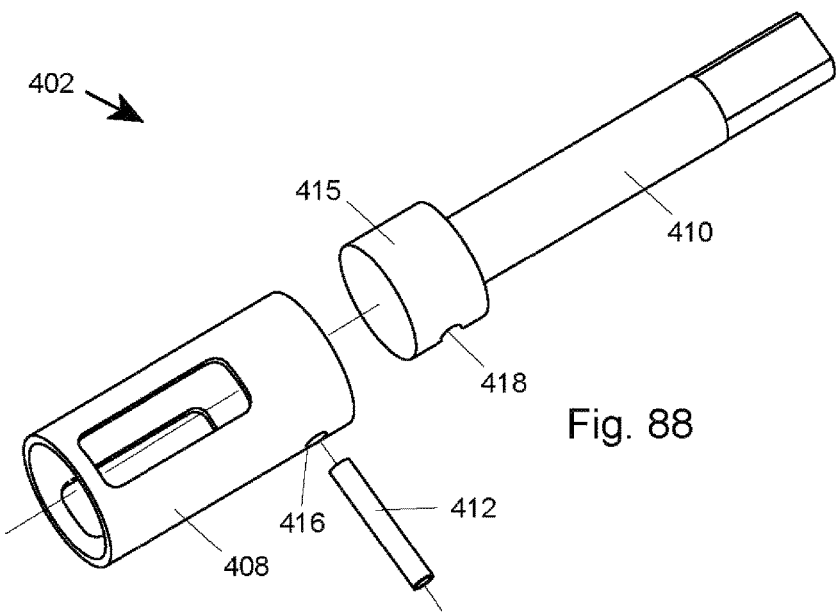
FIG. 88 shows an exploded view of the input assembly of FIG. 84.
Figure 89:
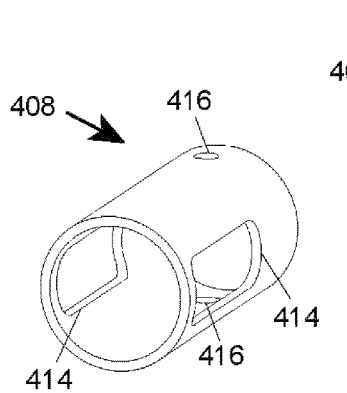
FIG. 89 shows a perspective view of the input hinge of the anti-backdrive mechanism of FIG. 87.
Figure 90:
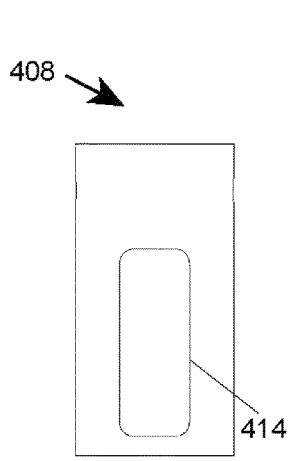
FIG. 90 shows a top view of the input hinge of the anti-backdrive mechanism of FIG. 87.
Figure 91:
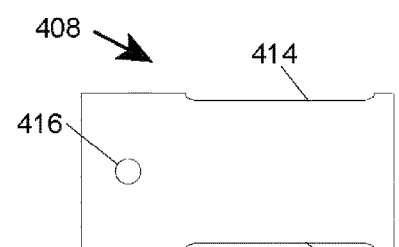
FIG. 91 shows a side view of the input hinge of the anti-backdrive mechanism of FIG. 87.
Figure 92:
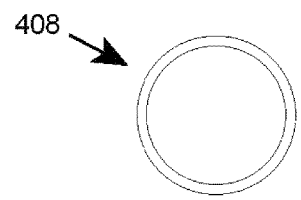
FIG. 92 shows a front view of the input hinge of the anti-backdrive mechanism of FIG. 87.

FIG. 88 shows an exploded view of the input assembly 402 which consists of a cylindrical input hinge 408 attached to an input shaft 410 by a spring pin 412. The input hinge 408 is the middle cylinder of the three nested cylinders in the anti-backdrive assembly and is shaped like a hollow cylinder that has two wide equally sized slots 414 with rounded corners that run longitudinally along the side of the cylinder for about two-thirds of the length of the cylinder and are positioned directly across from each other. The input shaft 410 is shaped like a rod with a short, larger diameter section 415 at the end that fits within one end of the input hinge. The slots in the input hinge do not overlap the last one-third of the length of the hinge where the larger diameter section 415 at the end of the input shaft is inserted into the input hinge. Spring pin 412 passes through a small oval hole 416 on one side of the input hinge 408 and then through a hole 418 through the larger diameter section 415 at the end of the input shaft end then through another small oval hole 416 in the input hinge to secure the input hinge 408 to the input shaft 410.

Figure 98:
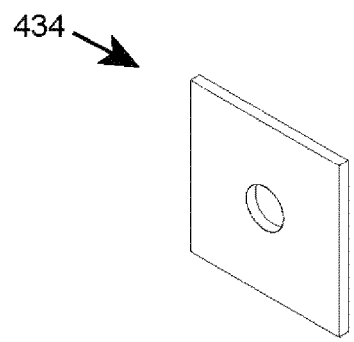
FIG. 98 shows a perspective view of a plate.
Figure 99:
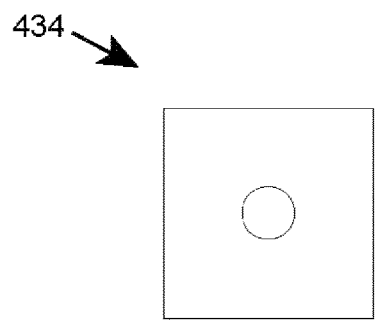
FIG. 99 shows a front view of a plate.

FIG. 93 shows an exploded view of the output assembly 404 which consists of a cylindrical output hinge 420, shown isolated in FIG. 94 through 97, attached to an output shaft 422 by a spring pin 424. The output hinge 420 is the innermost cylinder of the three nested cylinders in the anti-backdrive mechanism and is shaped like a hollow cylinder that has two long slots with rounded corners in it, a narrow slot 426 and a wide slot 428, that run longitudinally along the side of the cylindrical output hinge for about two thirds of the length of the hinge starting from near one end of the hinge. Slots 426 and 428 are positioned across from each other so that the center lines running longitudinally though each slot share the same plane. The wide slot 428 in the output hinge is slightly wider than the wide slots 414 in the input hinge. The output shaft is shaped like a rod with a short larger diameter section 429 at the end that fits within the end of the output hinge. Like the input hinge, the slots in the output hinge do not overlap the last one-third of the length of the hinge where the larger diameter section 429 at the end of the output shaft is inserted into the output hinge. Spring pin 424 passes through a small oval hole 430 on one side of the output hinge 420 and then through a hole 432 through the larger diameter section 429 at the end of the output shaft and then through another small oval hole 430 in the output hinge 420 to secure the output hinge to the output shaft 422. Two square metal plates 434, shown isolated in FIGS. 98 and 99, are set within the output hinge with one end of each plate protruding out through the narrow slot 426 of the output hinge and the other ends of the plate protruding out through the wide slot 428. A spring 436 stretches between the middle of the two plates 434 pushing the plates apart so that there is an angle between the plates and neither plate lies along the diameter of the output hinge.

Figure 100:
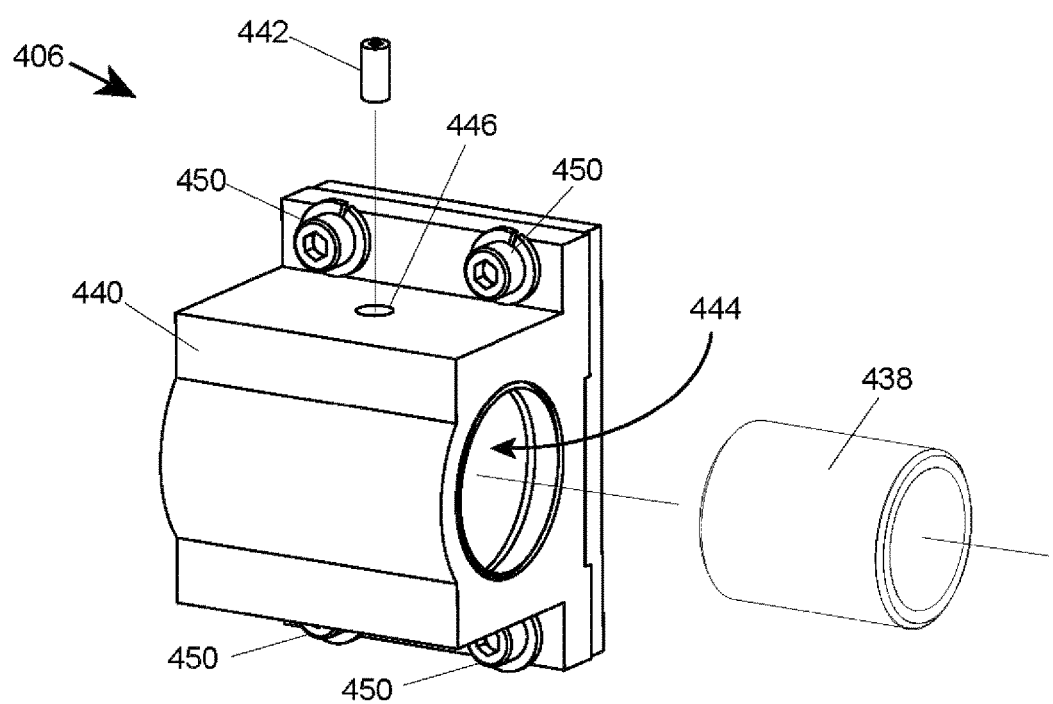
FIG. 100 shows an exploded view of the fixed assembly of FIG. 86.

FIG. 100 shows an exploded view of the main components of the fixed assembly 406 which includes a hollow metal fixed cylinder 438 which fits within a housing block 440 and is secured to the housing block by a set screw 442. Housing block 440 is basically shaped like a metal block with a large hole 444 that runs horizontally through the block and within which fixed cylinder 438, which is the outermost cylinder of the three nested cylinders in the anti-backdrive mechanism, is seated. Set screw 442 passes through a small hole 446 which runs vertically down from the top of the housing block and empties into the large hole 444 where it makes firm contact with the outer surface of the fixed cylinder 438 to keep the fixed cylinder from moving within the housing block. Along the top and the bottom of the housing block there is a narrow rectangular strip with two holes along the top strip and two holes along the bottom strip, through which pass bolts 450 with lock washers to rigidly mount the housing block to the internal saw structure.

Figure 101:
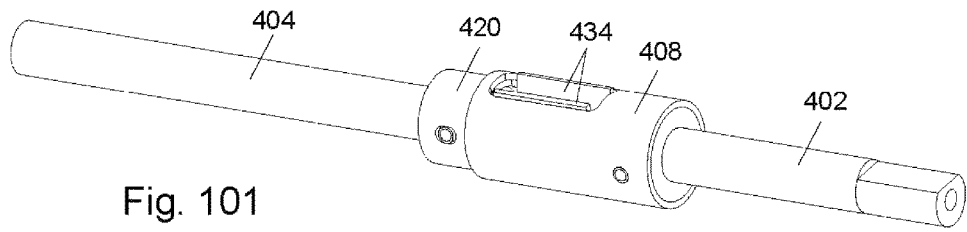
FIG. 101 shows the input assembly of FIG. 84 assembled with the output assembly of FIG. 85.
Figure 102:
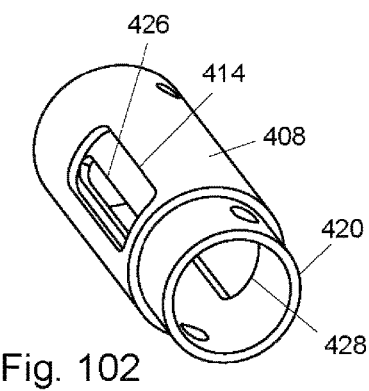
FIG. 102 shows a perspective view of the input hinge of the input assembly of FIG. 84 nested with the output hinge of the output assembly of FIG. 85.
Figure 103:
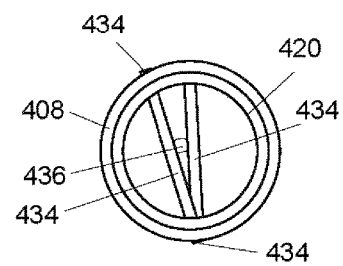
FIG. 103 shows a front view of the nested input and output hinges with plates and a spring.

The anti-backdrive mechanism is assembled with the input hinge 408 overlapping the output hinge 420, as shown in FIG. 101. The nested hinges are oriented so that the narrow slot 426 in the output hinge 420 overlaps one of the wide slots 414 in the input hinge 408, as can be seen in FIG. 102. The edges of the plates 434 extend out slightly through narrow slot 426 and the overlapping wide slot 414, as can be seen in FIG. 103. The other edges of plates 434 extend out through the wide slot 428 in the output hinge 420 and through the other wide slot 414 in the input hinge 408 which overlaps wide slot 428. The narrow slot 426 in the output hinge holds the ends of the two plates close together while the compressed spring 436 stretching between the middle of the two plates 434 pushes the plates apart so that the ends of the plates opposite the narrow slot 426 are spread apart until each plate hits the side of the wide slot 414 in the input hinge nearest each plate. The plates 434 are thus oriented with an angle between them with the distance between the ends of the plates that protrude through the wide slots 414 in the input hinge 408 set by the width of the wide slot 414 in the input hinge 408.

Figure 104:
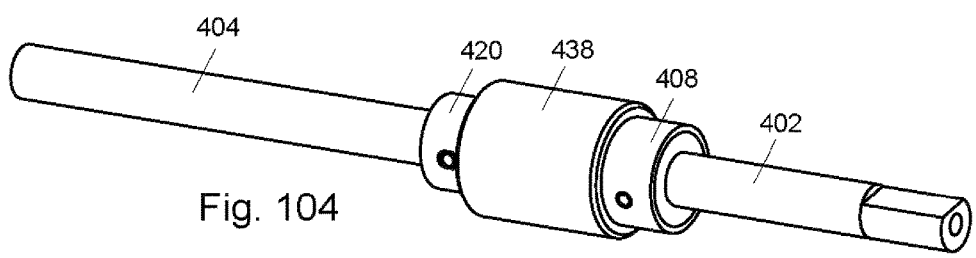
FIG. 104 shows the input assembly of FIG. 84 assembled with the output assembly of FIG. 85 and the fixed cylinder of the fixed assembly in FIG. 86.
Figure 105:
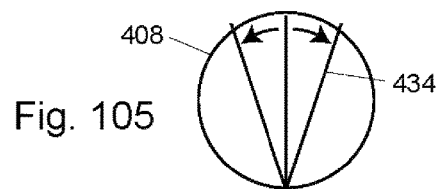
FIG. 105 shows a diagram that illustrates a plate extending past the output hinge when it does not lie along the diameter of the output hinge.

As shown in FIG. 104, the input and output shaft assemblies are positioned within the fixed cylinder 438 of the fixed assembly 406 which has no slots. Plates 434 are sized so that the height of each plate is less than the diameter of the fixed cylinder but will only fit within the fixed cylinder if the plates are aligned along the diameter of the cylinder. When the spring is allowed to push the plates apart so that they lie against the sides of the wide slot 414 in the input hinge the plates would not lie along the diameter and would thus protrude past the outer surface of the output hinge and would not fit within the fixed cylinder. Thus plates 434 are pushed together and spring 436 compressed enough to allow the plates to fit within the fixed cylinder. Once positioned inside the fixed cylinder the spring is released and pushes the plates apart so that the plates make contact with the inner surface of the fixed cylinder. While in this configuration, which is the default configuration, the edges of the plates 434 are wedged by the spring 436 against the inner surface of the fixed cylinder 438 which has no slots and prevents the input and output assemblies from rotating. FIG. 105 shows a diagram that illustrates a plate extending past the output hinge when it does not lie along the diameter of the output hinge.

Since the wide slot 428 in the output hinge 420 is wider than the wide slot 414 in the input hinge 408 which it overlaps, the sides of the wide slot 428 in the output hinge are not in contact with the plates in the default configuration but the sides of the narrow slot 426 in the output hinge are in contact with the plates. Consequently, an attempt to rotate the output hinge amounts to a force applied to the plates by the side of the narrow slot 426 in the output hinge that results in further wedging the edge of one of the plates extending out through wide slot 428 in the output hinge against the inner surface of the fixed cylinder 438. When an attempt is made to rotate the output hinge in the opposite direction, the other plate wedges against the fixed cylinder. Thus, the anti-backdrive mechanism locks due to a wedged plate when an attempt is made to rotate the output shaft 422 in either direction so that neither the output shaft 422 nor the input shaft 410 may rotate.

When an attempt is made to rotate the input shaft 410, which is rigidly attached to the input hinge 408, a different situation arises. In the default configuration, the plates are kept apart at an angle by the spring 436 placed between them, but compressing the spring reduces the angle between the plates enough to set the plates free so they may rotate. Since the wide slot 414 in the input hinge is more narrow than the wide slot 428 in the output hinge, one side of slot 414 in the input hinge overlapping slot 428 will push against the nearest plate when the input hinge rotates which will tend to move that end of the plate towards the other plate by compressing spring 436 so that the plate is more closely aligned with the diameter through the input and output hinges and the fixed cylinder. Since the wide slots 414 in the input hinge are much wider than the narrow slot 426 in the output hinge, no force is applied at this point to the plates near the narrow slot by the input hinge and the edges of the plates through the narrow slot will remain wedged against the fixed cylinder until the angle between the plates decreases enough to unwedge the plate 434. Once one plate is unwedged then the edge of the wide slot 414 in the input hinge overlapping narrow slot 426 will contact one of the plates and both plates along with both input and output hinges will rotate as the input hinge rotates. Bringing the plates into alignment with the diameter of the fixed cylinder frees the plates so that they may rotate with the input and output hinges since they are shorter than the diameter of the fixed cylinder and neither the top or bottom edges of the plates would be wedged against the inner surface or the fixed cylinder. Thus turning the input shaft which is rigidly attached to the input hinge will unlock the anti-backdrive mechanism by unwedging a plate allowing the rotation to be communicated to the output shaft so that both the input shaft and the output shaft rotate.

Figure 106:
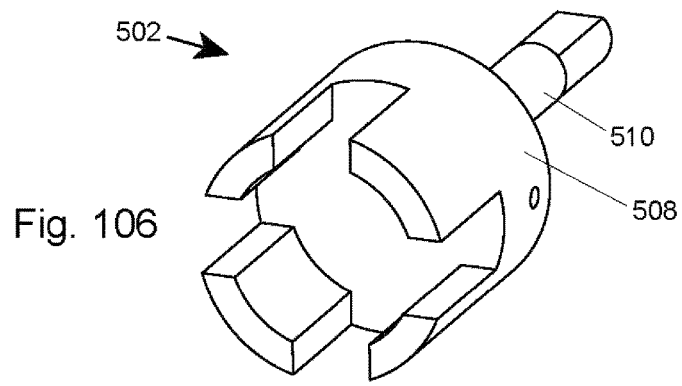
FIG. 106 shows an input assembly of an anti-backdrive mechanism shown in FIG. 109.
Figure 107:
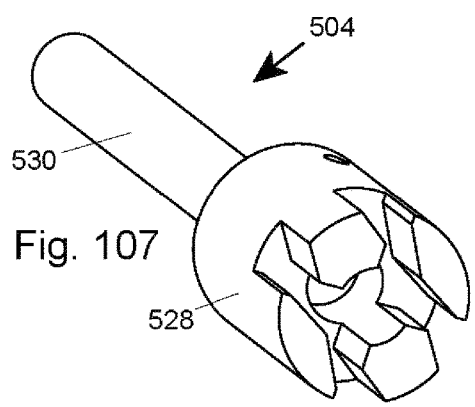
FIG. 107 shows an output assembly of an anti-backdrive mechanism shown in FIG. 109.

FIGS. 106 through 131 show an anti-backdrive mechanism 500 built around a set of four metal plates linked to a hollow cylinder which is fixed to the saw structure and thus unable to move with respect to the other components of the anti-backdrive mechanism. Once again the overall assembly is composed of three main sub-assemblies: an input shaft assembly 502 shown in FIG. 106, an output shaft assembly 504 shown in FIG. 107 and a fixed assembly 506 shown in FIG. 108. The complete assembly incorporating anti-backdrive mechanism 500 is shown in FIG. 109.

Figure 110:
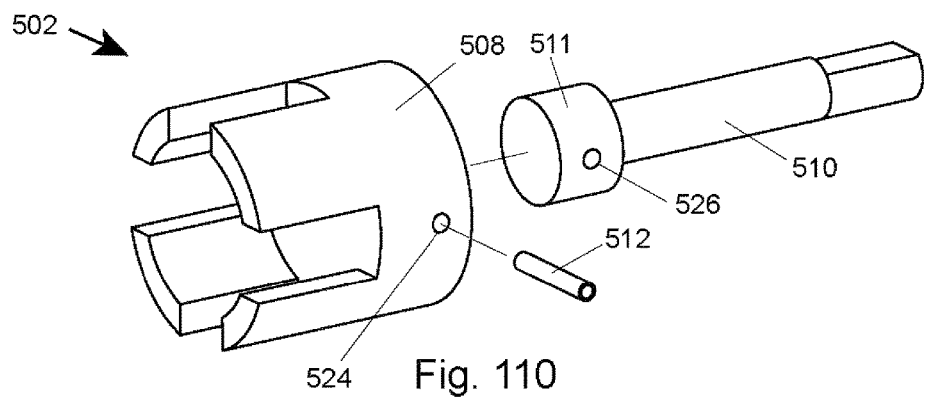
FIG. 110 shows an exploded view of the input assembly of FIG. 106.
Figure 111:
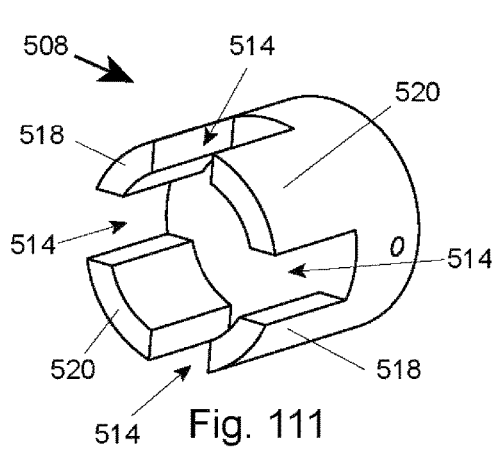
FIG. 111 shows a perspective view of the input hinge of the input assembly in FIG. 106.
Figure 112:
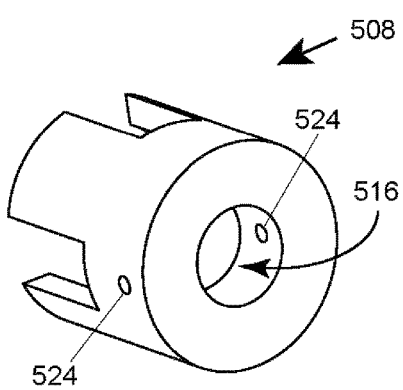
FIG. 112 shows another perspective view of the input hinge of the input assembly in FIG. 106.
Figure 113:
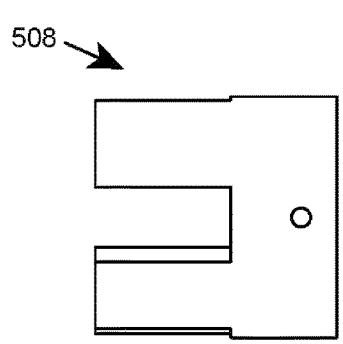
FIG. 113 shows a side view of the input hinge of the input assembly in FIG. 106.
Figure 114:
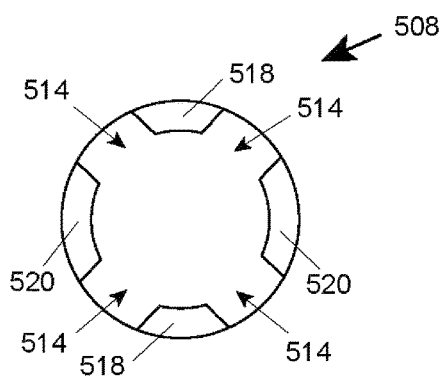
FIG. 114 shows a rear view of the input hinge of the input assembly in FIG. 106.

FIG. 110 shows an exploded view of the input assembly 502 which consists of a cylindrical input hinge 508 attached to an input shaft 510 by a spring pin 512. Input hinge 508, shown isolated in FIGS. 111 through 114, is shaped like a hollow cylinder with portions removed longitudinally along the cylindrical shell so as to leave four walls of the same length along the perimeter with gaps 514 in between. Two of the walls 518 are of a shorter arc length than the other two walls 520, as shown best in FIG. 114, but the four gaps 514 are the same size and are spaced so that walls that are across from each other are of the same size. The walls are joined to a short, solid cylinder that has a large circular recessed area 516 in the center of the outward facing end opposite the end where the walls are attached. The input shaft is shaped like a cylindrical rod with flat surface cut longitudinally in one end to mount a handwheel. The other end of the input shaft has a short cylindrical section 511 of larger diameter. The larger diameter section 511 of the input shaft 510 fits within the large circular recessed area 516 at the end of the input hinge. The input hinge 508 is mounted to the input shaft by a spring pin 512 which passes through a small hole 524 in the side of the input hinge that exits along the side of the large circular recessed area 516, then through a hole 526 that goes through the input shaft and finally through another small hole 524 in the side of the input hinge.

Figure 115:
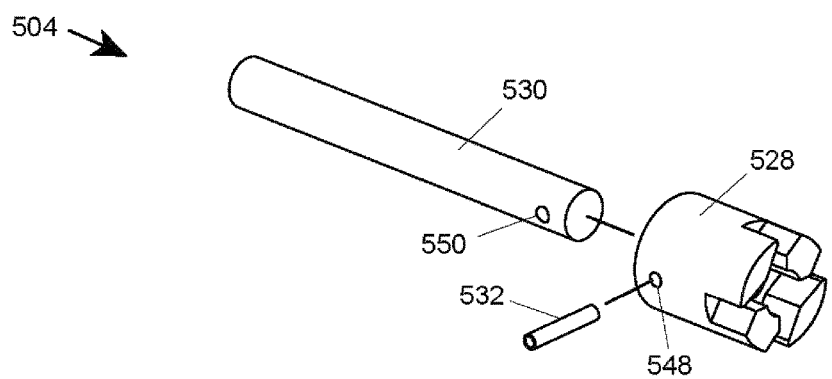
FIG. 115 shows an exploded view of the output assembly of FIG. 107.
Figure 116:
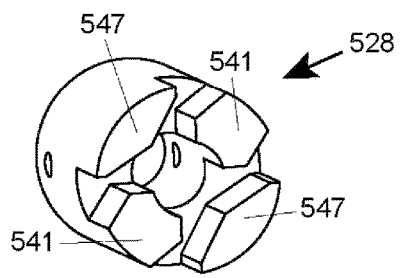
FIG. 116 shows a perspective view of the output hinge of the output assembly in FIG. 107.
Figure 117:
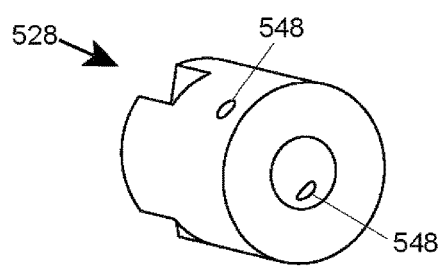
FIG. 117 shows another perspective view of the output hinge of the output assembly in FIG. 107.
Figure 118:
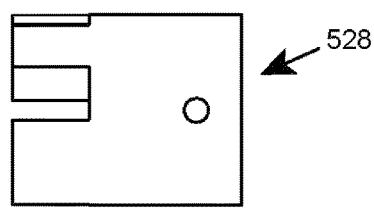
FIG. 118 shows a side view of the output hinge of the output assembly in FIG. 107.
Figure 119:
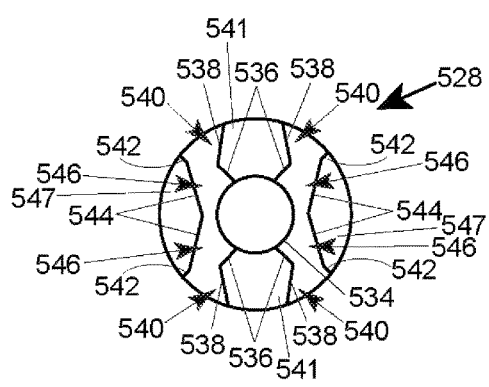
FIG. 119 shows a front view of the output hinge of the output assembly in FIG. 107.

FIG. 115 shows an exploded view of the output assembly 504 which consists of a cylindrical output hinge 528 attached to an output shaft 530 by a spring pin 532. As shown in FIGS. 116 through 119, output hinge 528 is shaped like a cylinder which is mostly solid except for a large hole 534 running through the center along the length of the cylinder and a pattern carved deeply, about one-third the length of the cylinder, into one end. The pattern is shown best in FIG. 119 which looks directly at the patterned end of the output hinge. In forming the pattern, first an 'X' is carved across and centered within the end of the cylinder. In the top and bottom quarters marked off by the 'X' a wall 536 of short length runs along each side of the 'X' from the hole 534 in the center of the cylinder to a little over one-third the distance from the hole in the center of the cylinder to the outer surface of the cylinder. The cylinder is cut away from the end of the wall 536 to the outer surface of the cylinder sweeping through an angle of about sixty degrees with the side of the 'X' forming a wall 538 and carving out a generally triangular area 540 out towards the outer surface of the cylinder. Thus a solid projection 541 is formed the perimeter of which is defined by a wall 538 joined to a wall 536 joined to a portion of the contour of hole 534 in the center of the cylinder which is joined to another wall 536 joined to another wall 538 which joins the counter of the outside surface of the hinge. In each of the side quarters marked off by the 'X' a wall 542 runs alongside the 'X' from the outer surface of the cylinder inward for a length equal to about a little less than one-fourth the distance from the hole in the center of the cylinder to the outer surface of the cylinder. The cylinder is cut away beginning at the end of each wall 542 and moving toward the center of the cylinder sweeping through an angle of about thirty degrees with the each side of the 'X' respectively forming a wall 544 carving out an area 546 along each side of the 'X'. Thus a solid projection 547 is formed the perimeter of which is defined by a wall 542 joined to a wall 544 joined to another wall 546 joined to another wall 542 which joins the counter of the outside surface of the hinge. Two small holes 548 coaxially aligned with each other, one located above the large center hole 534 and one below, pass through the end of output hinge opposite the patterned end. The output shaft 530 is attached to the output hinge 528 by a spring pin 532 which passes through the small holes 548 in the output hinge and a hole 550 in through output shaft.

Figure 108:
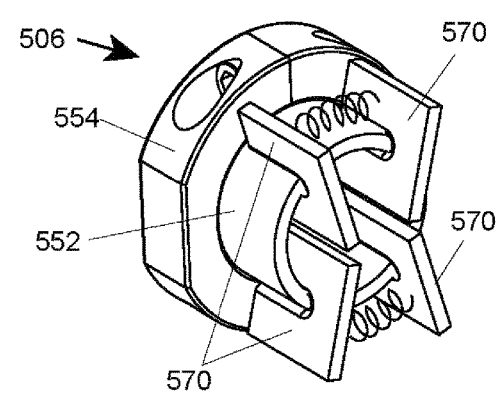
FIG. 108 shows a fixed assembly of an anti-backdrive mechanism shown in FIG. 109.
Figure 109:
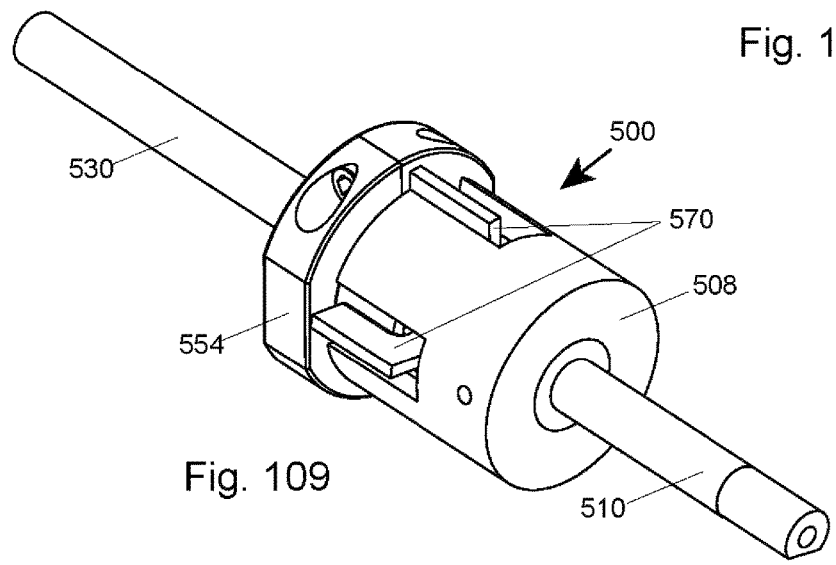
FIG. 109 shows an anti-backdrive mechanism assembly incorporating the input assembly of FIG. 106, the output assembly of FIG. 107 and the fixed assembly of FIG. 108.

As shown in FIGS. 108 and 120, a hollow fixed cylinder 552 is held in position by a collar 554, made up of two semicircular half-pieces 556 and 558, that fits around the fixed cylinder and has a vertical flat surface 560 along the side with two threaded holes 562 in it for two screws that rigidly mount the collar 554 to the saw structure. As shown in FIG. 120, there is a hole 564 running horizontally through each end of the vertically oriented half-collar piece 556 through which pass screws 566, one screw at each end of the half-collar piece, which thread into threaded holes 568 that run horizontally through each end of the corresponding vertically oriented half-collar piece 558 to hold the two semicircular half-pieces of the collar together. The socket head cap screws allow the collar to be clamped tightly around the fixed cylinder holding it firmly in place so that it cannot move relative to the other components of the anti-backdrive mechanism. Four plates 570 are set around the fixed cylinder 552, as shown in FIG. 108. Each plate 570, shown isolated in FIGS. 121 and 122, is shaped like a flat square metal plate with a U 572 shaped cutout that cuts into the plate from along one side continues for about two-thirds the length of the plate curves back around and exists the side it entered. The U is centered along the side of the plate and the edges are rounded all along the cut so that when looking at the side of the plate that the cut enters, it looks like a long rectangular area extending down from one edge of the plate which is capped with a semicircular area and followed by an open area to the midpoint of the side of the plate beyond which there is more open area then another semicircular area oriented so that the straight side of the semicircle joins another long rectangular area that stretches to the other end of the plate so that the bottom half mirrors the top half. The U cutouts with their rounded edges allow the four plates to slip over the edge of the hollow fixed cylinder 552 and rotate slightly from side to side. When the plates are oriented so that they are perpendicular to the outer surface of the fixed cylinder, or approach perpendicular, they are free to move along the cylinder unhindered but when they are slanted at an angle of roughly sixty degrees or less to the outer surface of the fixed cylinder 552 they become jammed or wedged against the fixed cylinder and are not able to move. Rotating the plates even a few degrees from their wedged, or locked position, frees the plates so that they are able to slide along the side of the fixed cylinder.

Figure 124:
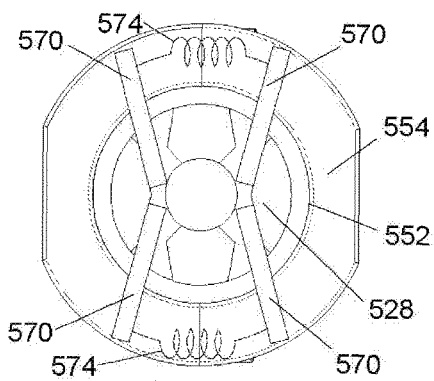

FIG. 123 shows fixed assembly 506 installed on the output assembly 504 with the output hinge 528 seated within the fixed cylinder 552. The width of each line forming the 'X' pattern in the output hinge is equal to the width of a plate 570 and the four plates 570 fit in the carved 'X' pattern, with one plate 570 in each leg of the 'X' pattern, which partially determines the orientation of the plates to the fixed cylinder. Walls 536, 538, 542, and 544 in the output hinge orient each plate perpendicularly to the cylinder and areas 540 and 546 carved out of each quarter of the 'X' pattern provide room for the plates 570 to rotate, so that the two plates in the upper quarter of the 'X' pattern can rotate towards each other and the two plates in the lower quarter of the 'X' pattern can rotate towards each other to lock the plates against the cylinder. As shown in FIGS. 123 and 124, a spring 574 stretches between the two plates 570 in the upper quarter of the 'X' at the outer ends of the plates and another spring 574 stretches between the two plates 570 in the bottom quarter of the 'X' at the outer ends of the plates to keep the plates rotated so that they are wedged, or locked, against the fixed cylinder and lie against walls 544 of the output hinge which is the default state of the anti-backdrive mechanism. The input hinge is axially aligned with the output hinge and placed over the end of the fixed cylinder with each plate 570 passing though one of the gaps 514 in the input hinge. The walls 518 of shorter arc length on the input hinge are positioned between each pair of plates that share a spring 574, as shown in FIG. 124.

Figure 125:
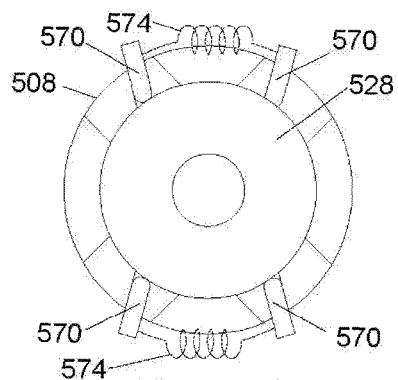
Figure 126:
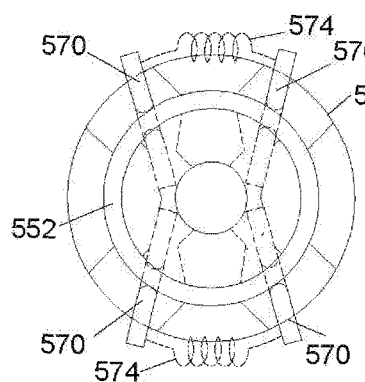
Figure 127:
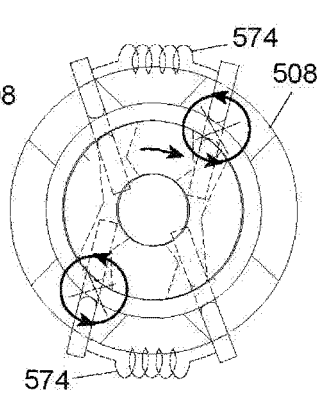

FIGS. 125 through 131 show the relative positions of the input hinge 508, the output hinge 528 and plates 570. FIG. 125 shows the relative positions of the input hinge, output hinge and plates when the anti-backdrive mechanism is in the default state looking down the output shaft towards the anti-backdrive mechanism. FIG. 126 shows the same view but with the output hinge transparent so both the walls of the input hinge and the 'X' pattern on the output hinge can be seen. In the default state the four plates are wedged against the fixed cylinder 552 so that neither the output shaft nor the input shaft can rotate when a torque is applied to the output shaft. When an attempt is made to turn the output shaft, and thus the output hinge attached to the output shaft, two of the plates 570 tend to rotate in a direction that makes them less perpendicular to the surface of the cylinder and those plates become more strongly wedged against the fixed cylinder preventing the output shaft from turning. As shown in FIG. 127 in which the output hinge is transparent, attempting to rotate the output shaft clockwise causes the upper right and lower left plates 570 to wedge against the fixed cylinder 552. Attempting to rotate the output shaft in the other direction causes the other two plates 570 to wedge against the fixed cylinder 552. Thus, in the default state of the anti-backdrive mechanism the output shaft is not able to rotate when a torque is applied to the output shaft.

Figure 128:
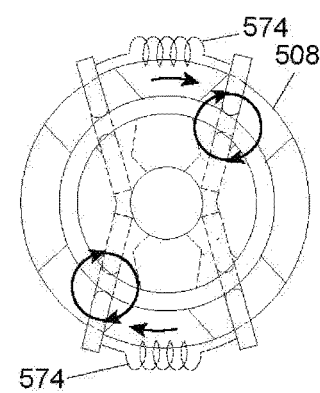
Figure 129:
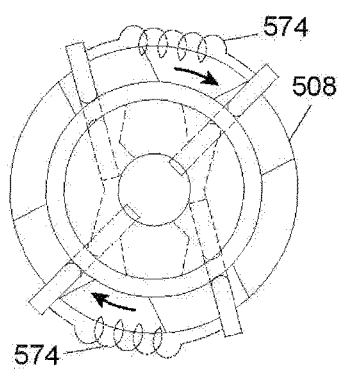
Figure 130:
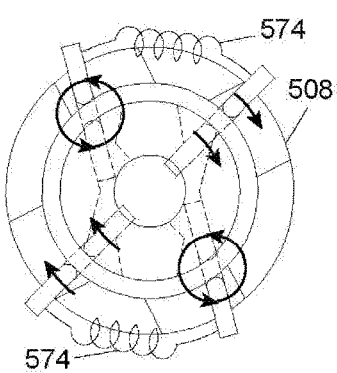
Figure 131:
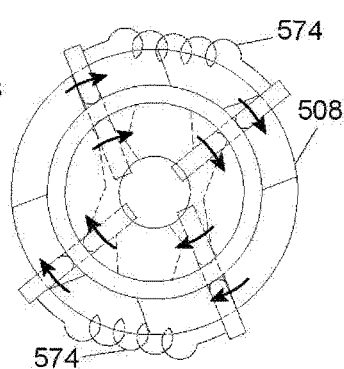

The input hinge 508 attached to the input shaft 510 is used to release or unlock the anti-backdrive mechanism. FIGS. 128 through 131, which show the relative positions of the input hinge, output hinge, and plates, with the output hinge transparent, illustrate the process by which the anti-backdrive mechanism is released. When a torque is applied to the input shaft, input hinge 508 rotates, as shown in FIG. 128, stretching the two springs 574, as shown in FIG. 129, and a corner of each wall 518 of shorter arc-length on the input hinge hits the nearest plate 570 and the two plates rotate in the direction that the input shaft is turning making the plates parallel to the surface of the fixed cylinder so that they are free to move along the cylinder, as shown in FIGS. 128 and 129. As the input hinge further rotates, the two free plates push against their corresponding walls 542 on the output hinge, as shown in FIG. 129, and this causes the output hinge to start rotating, as shown in FIG. 130. As the output hinge rotates, it pushes against the sides of the other two plates that have not yet rotated which provide no resistance due to their orientation and they rotate enough in the opposite direction the that input shaft is turning that they unwedge from the fixed cylinder and are dragged along as the input and output hinges rotate, as shown in FIGS. 130 and 131. Thus the anti-backdrive mechanism is released or unlocked when the input hinge rotates so that both the input shaft and output shaft rotate.

FIGS. 132 through 154 show another example of an anti-backdrive mechanism. This anti-backdrive mechanism 600 uses the orientation of two plates relative to a fixed structure to lock or unlock the mechanism. Once again the overall assembly is composed of three main sub-assemblies: an input shaft assembly 602 shown in FIG. 132, an output shaft assembly 604 shown in FIG. 133 and a fixed assembly 606 shown in FIG. 134. The complete assembly incorporating anti-backdrive mechanism 600 is shown in FIG. 135.

Input assembly 602, shown in the exploded view of FIG. 136, is composed of an input shaft 608 attached to two input shaft plates 610 by four flat head screws 612. Input shaft 608 is shaped like a rod with a flat surface 614 cut about one-sixth the diameter of the shaft deep into the shaft at one end along the top of the shaft upon which the handwheel is mounted. At the other end of the shaft there are two rectangular flat surfaces 616 cut longitudinally about one fourth the diameter of the shaft deep into the shaft on opposite sides of the input shaft so that the flat surfaces 616 run parallel to each other and perpendicular to surface 614. The flat surfaces extend along the input shaft for about a little less than an inch, which is a little less than about one third the length of the input shaft. Each flat surface 616 has two threaded holes 618 situated along the midline running through the length of each flat surface, one hole located towards each end of the flat surface. An input shaft plate 610 fits up against each flat surface 616 at the end of the input shaft 608 as shown in FIGS. 136 and 137. Each input shaft plate 610 is shaped like a rectangular plate with the long sides only slightly longer than the short sides, as shown in FIGS. 138 through 140 which shows an isolated view of the right input shaft plate. The left input shaft plate is a mirror image of the right input shaft plate. Plates 610 fit up against the input shaft with the long sides of the plates perpendicular to the shaft. The short sides of the plates extend beyond the end of the shaft by about half an inch. The outermost surfaces of the plates are slightly recessed along a rectangular area 620 that runs along the edge of the long side of the plate beyond the shaft, as shown in FIG. 137. Two 'U' cutouts 622 are cut into each plate from along the outermost long side extending beyond the end of the shaft so that each 'U' lies parallel to the input shaft with one 'U' above the input shaft and the other 'U' below the input shaft. There is a tapered edge 624 along each 'U' which is tapered such that more of the plate is cut away moving from the surface of the plate that abuts the input shaft to the outer surface. The edge of the 'U' cutout 622 that lies along the surface of the plate which sits up against the shaft extends into the plate as far as the recessed area 620 extends on the outermost surface of the plate and the 'U' along the outermost surface extends just beyond the edge of the recessed area 620. Both the recessed areas 620 and the 'U' cutouts 622 end just before reaching the end of the input shaft. Two holes 626 are drilled into each plate in the non-recessed area of each plate along the midline running through the plate from one long side to the other long side. Holes 626 are cut with countersunk areas 628 under the heads of the screws to accommodate flat head screws 612 so that the head of each screw lies flush with the outer surface of the plate. The flat head screws 612 pass through holes 626 in the input shaft plates and thread into corresponding threaded holes 618 located in the flat surfaces 616 input shaft.

Output assembly 604, shown in the exploded view of FIG. 141, includes an output shaft 630 attached to an output shaft plate 632 through which extends a spring 634. Output shaft 630, shown isolated in FIGS. 142 through 144, is shaped like a rod with two generally rectangular projections 636 sticking out longitudinally from one end which are parallel to each other with a gap 638 between them, as seen best in FIGS. 142 and 144. The rectangular projections are formed as of from a cylinder of smaller diameter than the diameter of the output shaft positioned concentrically with the output shaft with a strip cut out in the middle so that there are left two generally rectangular projections 636 with gap 638 between them. On the outermost sides of each rectangular projection there is a longitudinally oriented flat rectangular area 640 which extends inward from the end of the output shaft about three-fourths the length of the rectangular projections and which is vertically centered on the rectangular projections, as can be seen best in FIG. 143. There are three holes 642, 644 and 646 in each rectangular projection 636 and the holes in one rectangular projection are aligned with the holes in the other rectangular projection, for example, hole 642 in one rectangular projection is directly across from hole 642 in the other rectangular projection. Holes 644 and 646 are within the region of the flat rectangular surface 640, with hole 646 located towards that end of the output shaft, and hole 642 is between the end of the cylindrical section of the output shaft and the flat rectangular surface 640. All three holes are aligned along the midline running parallel to the rectangular projections and hole 646 is slightly larger than holes 642 and 644, as can be seen in FIG. 143. Output shaft plate 632, shown isolated in FIG. 145, is shaped like a larger rectangle 648 with a smaller rectangular extension 650 that lies parallel to the larger rectangle and extends out from the middle of one of the long sides of the larger rectangle. The extension 650 is about as long as the larger rectangle is wide and the short side of the smaller rectangle abuts the long side of the larger rectangle so as to form a short, stubby 'T' shape oriented sideways. There is a hole 652 in the larger rectangular piece of output shaft plate 632 that is centered between the two short sides of the rectangle but is closer to the long side with the extension than to the other long side. In the smaller rectangular extension 650 there are two smaller holes 654 and 656 situated side-by-side whose centers are aligned along the same line that passes through the center of the larger hole 652 in the larger rectangle 648. A narrow collar 658 shaped like a narrow slice of a hollow cylinder cut along two sides to form two flat surfaces 659 that are positioned parallel to and across from each other fits over the rectangular projections and is seated between the cylindrical portion of the output shaft and the flat rectangular surface 640. Collar 658 has two holes 660 that pass through the flat surfaces 659 on each side of the collar to the large hole 662 through the center of the collar. Output shaft plate 632 is situated between the parallel extensions 636 of the output shaft 630 and a pin 664 passes through holes 660 on the collar, through holes 642 in each rectangular projection 636 and through hole 654 in the output shaft plate to help secure the output shaft plate to the output shaft. Output shaft plate 632 is also mounted to the end of the output shaft 630 by a screw 668 that passes through holes 644 in the rectangular projections 636 and through the hole 656 in the output shaft plate 632. Spring 634, shaped like a straight coil about an inch long passes through holes 646 in the rectangular projections and hole 652 in the output shaft plate and is centered about the output shaft plate extending out to either side about three-eighths of an inch, as can be seen in FIG. 133.

FIG. 147 shows an exploded view of the fixed assembly 606. The fixed assembly 606 includes a fixed brake plate 670, shown isolated in FIG. 148, which is shaped like a metal plate vertically oriented with a large circular cutout 672 centered vertically and positioned horizontally more toward one side, and which has two holes 674, lined one above the other, along the opposite side. A screw passes through each hole 674 to rigidly attach the brake plate to the internal saw structure so that the brake plate is unmovable with respect to the other components in the anti-backdrive mechanism. The ends of two rectangular rotating plates 676, oriented so that they mirror each other, fit through the large circular cutout 672 in the brake plate 670 with the rotating plates and are positioned so that flat surfaces 677 on the edges along the length of each plate are coplanar and the faces of the plates facing each other are either nearly parallel or have a slight angle between them as the plates pivot mildly about a line running perpendicular to the long sides. FIGS. 149 and 150 show a rotating plate 676 isolated. Each rotating plate 676 is generally a rectangular plate with two holes 678 and 680 drilled into the surface 677 of the long, thin side edge of the plate so that they run parallel to the plate. Hole 678 is located near the end of the plate and closer to one face of the plate and the other hole 680 is located more towards the center of the plate and closer to the other face of the plate. On one edge 681 along the short side of the rotating plate, the edge nearest to holes 678 and facing the other rotating plate, is rounded, as shown in FIG. 149. The same pattern is repeated on the opposite side edge of the plate so that the two holes 678 near the end of the plate are axially aligned and the two holes 680 towards the center of the plate are axially aligned. A metal dowel pin 682 is inserted into each of the four holes 678 and 680 and extends outward from the edges of the plate about one-quarter inch. Each pair of pins 682 on the same plate side edge straddles the brake plate with the holes 678 and 680 towards the end of each plate on the back side of the brake plate and the pins nearest the face of each plate which faces the other plate on the front side of the brake plate. Along the shorter side of each rotating plate 676 opposite the end near the brake plate there are two threaded holes 684, one near each corner of the plate. A custom screw 686 which has a button styled head without a socket and a threaded portion with a hexagonal socket in the end is inserted into each hole 684 from the inner face of the plate to the outer face so that the button heads are faced inward and toward the button heads of the screws on the other plate. The hexagonal sockets allow for adjusting the screws.

The anti-backdrive mechanism is assembled with the output shaft plate 632 seated in the gap between the heads of the custom screws 686 on the rotating plates 676 in the fixed assembly and the output shaft passing between the rotating plates 676 and through the large circular cutout 672 in the brake plate 670 of the fixed assembly, as shown in FIG. 135. The rounded sides of collar 658 serve as a standoff between the rotating plates around the point where the plates pivot. The input shaft is coaxially aligned with the output shaft and the 'U' cutouts 622 on the input shaft plates fit about the custom screws 686 on the rotating plates in the fixed assembly. Rounded edges 681 along the short sides of each rotating plate which face each other and are nearest to holes 678 allow the rotating plates to be at an angle to the brake plate without interference with the output shaft.

When the rotating plates 676 are parallel to each other, and thus perpendicular to the brake plate 670, the distance between each pin 682 in a pair sharing the same surface 677 is greater than the thickness of the brake plate and the plates are free to move along the edge of the large circular cutout 672 in the brake plate so that they can rotate around in a circle. But as the ends of the rotating plates 676 farthest away from the brake plate are spread apart they reach an angle of about five degrees between the rotating plates 676 at which the plates are stopped from spreading farther apart by pins 682 because the distance between each pin in a pair has come to equal the thickness of the brake plate thus preventing further rotation of the rotating plate. Attempting to spread the plates farther apart causes the pins 682 to jam against the brake plate 670 so that the plates do not move relative to the brake plate. When the plates are jammed against the brake plate, the anti-backdrive mechanism is locked. A spring 634 stretches between the inner face of each plate near the end farthest from the brake plate to push the plates apart so that the default state of the anti-backdrive mechanism is the locked state. Attempting to rotate the output shaft when the anti-backdrive mechanism is in the locked state causes the output shaft plate to push against the heads of two of the custom screws 686 in the rotating plates which tends to push the rotating plates farther apart further jamming the pins 682 against the brake plate 670, as illustrated in FIGS. 151 and 152. Rotating the output shaft in the opposite direction causes the output shaft plate to push against the heads of the other two custom screws 686 again jamming the anti-backdrive mechanism so that the input and output shafts will not rotate.

FIGS. 153 and 154 illustrate what happens when the input shaft is rotated. When the input shaft is turned, the input shaft plates rotate and hit against the underside of the button-head custom screws 686 which pulls two of the screws, one above the input shaft and one below, inward. That, in turn, pulls the ends of the rotating plates inward making the rotating plates more parallel. This frees the rotating plates so that they can rotate along with the input shaft and the heads of the button head screws push on the output shaft plate so that it rotates as well. Rotating the input shaft in the opposite direction pulls the other two screws, one above the input shaft and one below, which again draws the rotating plates inward so they are more parallel and free to rotate. Turning or rotating the input shaft thereby releases the anti-backdrvie mechanism. The custom screws 686 allow for adjusting the amount of play there is when the input shaft is rotated before it engages the plates and turns the output shaft. Tightening the four screws 686 moves the ends of the rotating plates 676 closer together so that the plates are closer to being parallel to each other in the default state which means that the input shaft does not need to rotate as much to release the anti-backdrive mechanism.

FIGS. 155 through 179 show an anti-backdrive mechanism 700 that uses the orientation of a movable plate assembly relative to a fixed plate rigidly attached to the saw structure to lock or unlock the anti-backdrive mechanism. Once again the overall assembly is composed of three main sub-assemblies: an input shaft assembly 702 shown in FIG. 155, an output shaft assembly 704 shown in FIG. 156 and a fixed assembly 706 shown in FIG. 157. The complete assembly incorporating the anti-backdrive mechanism 700 is shown in FIG. 158.

Input assembly 702, shown in the exploded view of FIG. 159, is composed of an input shaft 708 attached to an input cylinder 710. Input shaft 708 is shaped like a cylindrical rod with a flat surface 712 cut longitudinally for about an inch along one end of the input shaft for mounting a handwheel. At the other end of input shaft 708, there is a larger diameter section 714 which is about one-sixth the length of the input shaft and has a diameter about twice that of the rest of the shaft. There is a hole 716 running through the larger diameter section 714 from one side to the other which is centered along the length of the larger diameter section 714. Input cylinder 710, shown isolated in FIGS. 160 through 162, is shaped like a hollow cylinder sized to fit over the larger diameter section 714 of the input shaft and which has two wide slots 718 with rounded corners cut longitudinally into the cylinder and aligned directly across from each other leaving two equally sized extensions 720 along the perimeter of the cylinder. Slots 718 are about as wide as a little over one-fourth the perimeter of the cylinder and are cut into the cylinder starting from one end and continuing for a little over two-thirds the length of the cylinder. In the last one-third of the length of the cylinder where slots 718 do not extend, there are two small holes 722 aligned across from each other and positioned along longitudinal midlines running through slots 718. A spring pin 724 passes through holes 722 in the input cylinder and through hole 716 in the inputs shaft to attach the input cylinder 710 to the input shaft 708.

Output assembly 704, shown in the exploded view of FIG. 163, is composed of an output shaft 726 attached to an output cylinder 728. Output shaft 726 is shaped like a cylindrical rod with a larger diameter section 730 at one end which has a diameter about twice the size of the diameter of the rest of the output shaft and which is about one-sixth the length of the output shaft. There is a hole 732 running through the larger diameter section 730 from one side to the other which is centered along the length of the larger diameter section 730. Output cylinder 728, shown isolated in FIGS. 164 through 167, is shaped like a hollow cylinder sized to fit over the larger diameter section 730 of the output shaft and which has two angled slots 734 that start at one end and continue inward and at an angle of about thirty degrees from horizontal towards the opposite side of the cylinder for about two-thirds the length of the cylinder. Each slot 734 covers an arc-length of about one-eighth the perimeter of the cylinder, as can be seen best in FIG. 165. Between slots 734 there are extensions which are remnants left along the perimeter of the cylinder, one extension 736 which has a smaller arc-length at the end of the cylinder where the slots begin, a little over one-eighth the perimeter of the cylinder, and one extension 738 which has a larger arc-length at the end of the cylinder where the slots begin, a little over one-half the perimeter of the cylinder, as can best be seen in FIG. 165. In the last one-third of the length of the cylinder where slots 734 do not extend, there are two small holes 740 aligned across from each other and positioned along a line running horizontally through the cylinder and which is midway between parallel lines running through each end of slots 734. A spring pin 742 passes through holes 740 in the output cylinder and through hole 732 in the output shaft to attach the output cylinder 728 to the output shaft 726.

Fixed assembly 706, shown in the exploded view of FIG. 168, is composed of a fixed brake plate 744 and a movable plate assembly 746. Brake plate 744 is shaped like a generally square metal plate, vertically oriented, with a large circular cutout 748 centered vertically but shifted more to one side horizontally. Along the other side there is a rectangular block 750 which is vertically oriented and has two holes 752, one toward the top and one toward the bottom of the rectangular block for screws 754 to pass through to rigidly mount the fixed brake plate to the internal structure of the saw. The rectangular block may be a separate piece attached to the brake plate with screws that pass through holes 755, one near the top of the block and one near the bottom, and through corresponding holes in the brake plate. FIGS. 169 through 171 show movable plate assembly 746 which consists of two rectangular slabs 756 held together by an 'H' shaped block 758 that is almost as deep as the slabs are long and which is inserted between the slabs to hold the edges of the two slabs together with the open ends 760 of the 'H' sized to fit the thickness of the rectangular slabs. The rectangular slabs 756 are mirror images of each other and the rectangular slab 756 that appears to the left in FIG. 168 which views the fixed assembly from the side of the input shaft, is shown isolated in FIGS. 172 through 174. Along the middle of the long side of each rectangular slab 756 opposite the side inserted into the 'H' shaped block there is a notch 762 cut out of the slab that looks like a square cut all the way through the rectangular slab when looking down at the face of the rectangular slab, as shown in FIG. 174. When looking along the outside edge of the rectangular slab along which the notch is cut out, however, notch 762 looks more like an 'X' in that the sides of the notch are cut at angles. As can be best seen in FIG. 173 which shows a side view of the rectangular slab 756 facing notch 762, the angled cut along the side of notch 762 that appears to the left in FIG. 173 consists of a short segment 764 of negative slope which joins a longer segment 766 of positive slope. The short segment of a negative slope starts from the top face of the slab at a point between the edge of the long side that appears to the left on the rectangular slab in FIG. 173 and the middle of the long side of the rectangular slab but closer to the middle, and stops before reaching the midline running longitudinally through the long side of the rectangular slab. The longer segment 766 starts where the short segment stops and continues towards the bottom face of the rectangular slab along a positive slope. The angled cut along the side of notch 762 that appears to the right in FIG. 173 is also made up of two segments, a longer segment 766 with a negative slope and a shorter segment 764 with positive slope. The longer segment 766 starts from the top face of the rectangular slab at a point between the edge of the long side that appears to the right on the rectangular slab in FIG. 173 and the middle of the long side of the rectangular slab but closer to the middle, and stops just beyond the midline running longitudinally through the long side of the rectangular slab at which point it joins a shorter segment 764 of negative slope that continues toward and stops at the bottom face of the rectangular slab. The points at which the longer and shorter segments 764 and 766 of each angled cut meet forms peaks 768 and 770 which are rounded and slightly set off from each other as the upper and lower sloped segments on each side are of a slightly different length with the peak 768 that appears along the left side of the notch in FIG. 173 positioned a little above the longitudinal midline of the long side of the rectangular plate and peak 770 that appears along the right side of the notch in FIG. 173 positioned a little below the longitudinal midline of the side.

The anti-backdrive mechanism is assembled as shown in FIG. 158. Output cylinder 728 has an inner diameter that is slightly larger than the outer diameter of the input cylinder 710 and fits over the input cylinder with the slotted end of the input cylinder inserted into the slotted end of the output cylinder and the input shaft 708 coaxially aligned with the output shaft 726. The input and output cylinders 710 and 728 are rotated with respect to each other so that the angled slots 734 in the output cylinder overlap the wide slots 718 in the input cylinder. The input and output cylinders are positioned within the large circular cutout 748 in the fixed plate, as shown in FIG. 158, and the movable plate assembly 746 is positioned within the input and output cylinders, 710 and 728, with the rectangular slabs 756 extending out to each side through slots 718 and 734 in the input and output cylinders, and the notches 762 on each side of the rectangular slabs fitted around the edge of the large circular cutout 748. As shown in FIG. 177, the peaks 768 and 770 along the sides of each notch 762 in the rectangular slabs 756 of the movable plate assembly make contact with the fixed brake plate 744. The movable plate assembly is positioned within the input and output cylinders in such a way that when the output cylinder is oriented so that the angled slots 734 in the output cylinder slope downward moving from the open end of the output cylinder toward the end attached to the output shaft, the short segments 764 of the angled cuts along the side of notches 762 of the rectangular slabs are above the longer segments 766 on the side of the brake plate facing the output shaft so that peaks 768 ride along the rear surface of the brake plate. The distance between peaks 768 and 770 is a little larger than the thickness of the brake plate 744 so that the movable plate assembly 746 would rest freely at an angle relative to the brake plate in the absence of the input or output cylinders. Slots 734 in the output cylinder are angled in such a way that they slope in the same direction as the rectangular slabs 756 in the movable plate assembly would slope if hanging freely against the brake plate, as shown in FIG. 177, though the slope of the angled slots is more steep than the slope of the movable plate. The width of each slot 734 in the output cylinder 728 is such that when the output cylinder is oriented so that slots 734 slope downward moving from the front of the anti-backdrive mechanism toward the rear, as shown in FIG. 178, the front, outside corner of one of the rectangular slabs 756 contacts the bottom of one of the slots 734 and the rear, outside corner of the other rectangular slab 756 contacts top of the other slot 734. When the output cylinder is rotated around so that it is oriented so that the slots 734 slope upward moving from the front of the anti-backdrive mechanism toward the rear, then the front, outside corner of one of the rectangular slabs 756 contacts the top of one of the slots 734 and the rear, outside corner of the other rectangular slab 756 contacts bottom of the other slot 734. The angle and width of slots 734 allow the rectangular slabs to remain lodged against the fixed brake plate 744. The width of the wide slots 718 in the input cylinder 710 are sized so that they do not contact the rectangular slabs 756 unless the input cylinder is rotated about 10 degrees at which point the top of one slot would contact the front, outside corner of one of the rectangular slabs and the bottom of the other slot would contact the rear, outside corner of the other rectangular slab, if the output cylinder is oriented such that slots 734 slope downward moving from the front of the anti-backdrive mechanism toward the rear as shown in FIG. 179.

In the default state of the anti-backdrive mechanism when no torques are applied to either the input or output cylinders the movable plate assembly 746 assumes a default orientation in which the rectangular slabs 756 of the movable plate assembly are lodged, or wedged against the fixed brake plate 744 so that the input and output assemblies are unable to rotate and the anti-backdrive mechanism is locked. When there is an attempt to rotate the output shaft, as shown in FIG. 178, the slots 734 in the output cylinder push against the rectangular slabs 756 of the movable plate assembly at the front, outside corner of one rectangular slab and the rear, outside corner of the other rectangular slab kitty-corner from the first corner which tends to rotate the movable plate assembly 746 in such a way as to increase the angle of the movable plate assembly to the fixed brake plate 744 more firmly wedging rectangular slabs 756 against the fixed brake plate 744. An attempt to rotate the output shaft in the other direction causes the slots 734 in the output cylinder to contact the other front and rear corners of the rectangular slabs 756 which also tends to rotate the movable plate assembly 746 in such a way as to increase the angle of the movable plate assembly to the fixed brake plate 744 more firmly wedging the rectangular slabs 756 of the movable plate assembly 746 against the brake plate 744. Thus an attempt to rotate the output shaft in either direction, clockwise or counter-clockwise causes the movable plate assembly to further jam against the fixed brake plate preventing the input and output shafts from rotating and locking the anti-backdrive mechanism.

A different situation arises when the input shaft is rotated. When the input shaft rotates, as shown in FIG. 179, the wide slots 718 in the input cylinder 710 contact the rectangular slabs 756 of the movable plate assembly at the front, outside corner of one rectangular slab and the rear, outside corner of the other rectangular slab kitty-corner from the first corner which tends to rotate the movable plate assembly 746 in such a way as to decrease the angle of the movable plate assembly to the fixed brake plate 744 thereby freeing the movable plate assembly so that it may rotate along with the input cylinder. As the movable plate assembly rotates, the rectangular slabs 756 push on the output cylinder so that both the input and output assemblies rotate with the rotating input shaft. An attempt to rotate the input shaft in the other direction causes the slots 718 in the input cylinder to contact the other front and rear corners of the rectangular slabs 756 which also tends to rotate the movable plate assembly 746 in such a way as to decrease the angle of the movable plate assembly to the fixed brake plate 744 thus freeing the movable plate assembly and enabling the input and output assemblies to rotate along with the rotating input shaft. Thus an attempt to rotate the input shaft in either direction, clockwise or counter-clockwise causes the movable plate assembly to rotate freely, bound by but not wedged against the edge of the large circular cutout 748 of the fixed brake plate, thus allowing the input and output shafts to rotate and unlocking the anti-backdrive mechanism.

FIGS. 180 through 191 show an anti-backdrive mechanism 1000 that incorporates a spring lock. Once again the overall assembly is composed of three main sub-assemblies that move relative to one another: an input shaft assembly 1002 shown in FIG. 180, an output shaft assembly 1004 shown in FIG. 181 and a fixed assembly 1006 shown in FIG. 182. The complete spring-lock assembly incorporating anti-backdrive mechanism 1000 is shown in FIG. 183.

The input assembly includes an input shaft 1008 and a spring 1010. As shown in FIG. 180, the input shaft 1008 is shaped like a cylindrical rod that is tapered for roughly one inch at about a thirty degree angle at one end 1012. The tip of end 1012 is cut off along a plane perpendicular to the longitudinal axis through the shaft to form a blunt point 1014. The thirty degree cut forming the taper at end 1012 is not cut uniformly along a plane over the whole region of the shaft but rather the sides 1016 of the shaft follow the thirty degree angled cut while a concave recessed area 1018 is carved out moving in from sides 1016 towards the interior of the shaft. The recessed area 1018 gets deeper moving inward reaching all the way down to the center of the shaft near the beginning of the taper, as shown in the cross-sectional view of FIG. 184. From there the bottom of the recessed area 1018 continues longitudinally toward the end of the shaft for about half the length of the tapered end along a nearly horizontal line 1020. Line 1020 then expands to form a flat surface 1022 which is slanted following the taper but at an angle slightly less than thirty degrees and continues to the end of the shaft. Surfaces 1024 join the flat surface 1022 to sides 1016 along the tapered end 1012 and are sloped downward moving outward from the interior of the shaft. Surfaces 1024 also extend back along curved contours to either side of line 1020 joining line 1020 to the sides 1016 of the tapered cut. Spring 1010, shown isolated in FIGS. 185 through 187, is shaped like a coil of roughly four turns and fits over the end of the tapered end 1012 of the input shaft. The ends 1026 of the spring are bent radially inward for about one-quarter inch and are positioned across from each other within a 120 degree section of the coil such that they mirror each other when the spring is viewed from the front. Spring ends 1026 lie against surfaces 1022 on either side of the flat surface 1022, as shown in FIG. 188.

The output assembly 1004 consists only of an output shaft which is shaped like a cylindrical rod with an end 1028 which is tapered and shaped in the same way as the input shaft 1008, as shown in FIG. 181.

FIG. 182 shows fixed assembly 1006 which consists of a mounting block 1030, a fixed cylinder 1032, two spacer mounts 1034 and a set screw 1036. The mounting block is rigidly attached to the internal structure of the saw. As shown in the exploded view of FIG. 189, mounting block 1030 is shaped like a block that has a square face and is about one-half inch thick with a large hole 1038 in the center through which fits the fixed cylinder 1032. Fixed cylinder 1032 is shaped like a plain hollow cylinder almost two inches long. Set screw 1036 threads into a small hole 1040 along the top of the mounting block and contacts the outer surface of the fixed cylinder 1032 so that it does not move relative to the mounting block. A cylindrical spacer mount 1034, which is shaped like a hollow cylinder at a constant outer diameter for one inch and a thin section of larger outer diameter 1042 at one end, is inserted into each end of the fixed cylinder 1032 with the larger diameter sections 1042 situated outside the fixed cylinder as they are of too large a diameter to fit within the fixed cylinder.

The anti-backdrive mechanism is assembled with the input shaft 1008 and output shaft 1004 aligned concentrically with the tapered end 1028 of the output shaft overlapping the tapered end 1012 of the input shaft and oriented such that the recessed areas 1018 of each tapered end face each other, as shown in FIG. 190. The tapered end of the output shaft is inserted into spring 1010, about three-quarters of the way along the tapered end from the end of the shaft so that the sides 1016 of the tapered end nearly contact the ends 1026 of spring 1010 which are wrapped around the tapered end of the input shaft. A spacer mount 1034 is placed over the input and output shafts with the larger diameter sections 1042 of the spacer mounts facing outward and with spring 1010 situated between the inward facing ends of the spacer mounts, as shown in FIG. 191. As mentioned earlier, the spacer mounts fit within the fixed cylinder 1032 which is sized so that spring 1010 makes contact with the inner surface of the fixed cylinder in the default state of the anti-backdrive mechanism.

When the output shaft starts to rotate, one side 1016 of the tapered end 1028 of the output shaft contacts the nearest end 1026 of spring 1010 which is wrapped around the input shaft. As the output shaft pushes on the end of the spring it tends to unwind the spring increasing the diameter of the coil of the spring causing the spring to become wedged against the inner surface of the fixed cylinder 1032 which prevents the output shaft from rotating. Attempting to rotate the output shaft in the other direction causes the other side 1016 of the tapered end 1028 of the output shaft to contact the nearest end 1026 of spring 1010 again tending to unwind spring 1010 wedging the spring against the inner surface of the fixed cylinder and preventing the output shaft from further rotating.

As the input shaft rotates, the tapered end 1012 of the input shaft 1008 pushes against one end 1026 of spring 1010 which tends to wind the spring thus decreasing the diameter of the coil of the spring releasing the spring from the inner surface of the fixed cylinder so that it is free to rotate within the fixed cylinder. Thus, as the input shaft rotates, so does spring 1010 and output shaft 1004. Rotating the input shaft in the other direction causes the tapered end 1012 of the input shaft to push against the other end 1026 of the spring which again tends to wind the spring thus decreasing the diameter of the coil of the spring releasing the spring from the fixed cylinder so that the input shaft, spring and output shaft may rotate.

FIGS. 192 through 224 show an anti-backdrive mechanism 1100 also incorporating a spring lock. Once again the overall assembly is composed of three main sub-assemblies that move relative to one another: an input shaft assembly 1102 shown in FIG. 192, an output shaft assembly 1104 shown in FIG. 193 and a fixed assembly 1106 shown in FIG. 194. The complete assembly incorporating the spring-lock anti-backdrive mechanism 1100 is shown in FIG. 195.

FIG. 196 shows an exploded view of the input assembly 1102 of the anti-backdrive mechanism which includes an input shaft 1108 attached to an input engager 1110 by a set screw 1112. As shown in FIGS. 197 through 199 the input shaft 1108 is shaped like a cylindrical rod which has a section 1114 of slightly smaller diameter at one end that is about one and a half inches long and which is cut straight across longitudinally at a depth of about one-fifth the diameter of section 1114 leaving a flat surface 1116 along the length of section 1114. The other end of the input shaft is cut longitudinally for about one inch along the shaft at a depth of about one-fourth of the diameter of the shaft to create a flat surface 1118 for mounting the elevation handwheel. A groove 1120 is positioned along the cylindrical portion of the shaft about two inches in from the smaller diameter section 1114 and in which is installed an eclip 1122.

The input engager 1110, shown isolated in FIGS. 200 through 206, has an overall shape like a short thick-walled hollow cylinder 1124 about three-quarter inch long positioned inside and merged with a longer hollow cylinder 1126 of about two inches long which has a large portion of the surrounding wall removed. Cylindrical section 1126 of the input engager is first cut longitudinally along each side of the input engager beginning at the end with the inner cylindrical section 1124 with longitudinal cut 1127 ending at the end of section 1126 and longitudinal cut 1129 stretching a little further. The longitudinal cuts 1127 and 1129 are made at an angle to the radius of the cylinder moving inward from the outer surface of the input engager towards the inner cylindrical section 1124 forming flat angled surfaces 1128 and 1130 that run parallel to the axis of the input engager but are at about a forty-five degree angle to the radius of the input engager. The angled surfaces 1128 and 1130 slope in such a way that a greater arc length is covered in traveling from one angled surface to the other along the outside surface of the input engager than would be covered in sweeping through the same arc section at the diameter of the inner cylindrical section of the input engager, as can be seen in FIG. 202. Angled surfaces 1128 and 1130 are cut symmetrically so as to mirror each other when the input engager is viewed from the front, as shown in FIG. 202. Angled surface 1130, which appears on the right in FIG. 202, runs along the length of the inner cylindrical section 1124 and the other angled surface 1128, which appears on the left in FIG. 202, runs a little farther so that it covers about two-thirds the length of the input engager as can be seen on the right in FIG. 200 which shows a view of the bottom of the input engager with the input engager rotated so that the bottom view faces the open area in the cylinder wall. At the end of each of the longitudinal cuts 1127 and 1129 the input engager is cut at about a forty-five degree angle to a plane through the axis of the input engager and these forty-five degree cuts 1131 and 1133 form surfaces 1132 and 1134 that are at an angle to the radius moving inward just like angled surfaces 1128 and 1130 and which travel along the sides of the cylinder enclosing more of the space within the engager so that by the time the cuts exit the engager about three-fourths of the circumference of the engager remains, as shown in FIG. 205. Surface 1132 continues to the end of the input engager, as can be seen in FIG. 200. Surface 1134, which appears to the right when the input engager is viewed from the rear with the open portion along the side of the input cylinder facing downward as shown in FIG. 202, ends shortly before the end of the input engager, as can be seen in FIG. 200, and is joined to a short flat surface 1136 formed by another longitudinal cut 1135 that runs to the end of the input engager parallel to the axis of the input engager as can be seen in FIGS. 200 and 205. Surface 1136 is cut at an angle to the radius moving inward similarly to surfaces 1128, 1130, 1132 and 1134. A distance of a little less than half an inch can be seen between the two forty-five degree cuts 1131 and 1133 when the input engager is viewed from the side, as shown in FIG. 205. The end of input shaft 1108 is inserted into hole 1137 which passes through the center of cylindrical section 1124 entering hole 1137 from the end that is within the input engager so that the end of the input shaft is flush with the end of the input engager when fully inserted and the shaft runs all the way through the input engager. A set screw 1112 threads into a small hole 1138 located on the outer surface of the engager which passes through the inner cylindrical section 1124 and empties into hole 1137 to make contact with flat surface 1116 on the input shaft. An eclip 1122 fits within groove 1120 to position the input shaft within the anti-backdrive mechanism.

FIG. 207 shows an exploded view of the output assembly 1104 of the anti-backdrive mechanism which includes an output shaft 1140 attached to an output engager 1142 by a set screw 1144. As shown in FIGS. 208 and 209 the output shaft 1140 is shaped like a cylindrical rod with a section 1146 of slightly smaller diameter at one end which runs for about one and one-half inches and which is cut longitudinally along the shaft at a depth of about one-fifth the diameter of section 1146 leaving a flat surface 1148 along the length of the smaller diameter section 1146.

The output engager 1142, shown isolated in FIGS. 210 through 214, has an overall shape like a cylinder that is mostly hollow except that it is enclosed on one end with a thick wall 1150 that has a hole 1152 through the center for the output shaft 1140 and there is a section 1154 of greater wall thickness along the inner cylinder wall which extends from wall 1150 to the end of the output engager and covers about one-fourth the inner circumference of the output engager. Section 1154 is cut in such a way as to create two ramps 1156 and 1158, shown best in the cross-sectional view of FIG. 211. Cuts 1159 and 1161 are made longitudinally along section 1154 starting from the inner surface of wall 1150 and running parallel to the axis, creating a flat surface 1160, which appears on the right when the output engager is viewed from the front and oriented such that section 1154 is at the bottom of the engager and flat surface 1162, which appears on the left when the output engager is viewed from the front and oriented such that section 1154 is at the bottom as shown in FIG. 212. Surface 1160 continues for about one and a half inches and surface 1162 continues for about one inch on the other side, as shown in FIGS. 210 and 211. Surfaces 1160 and 1162 are at an angle to the radius of the outer cylinder and slope in the negative and positive directions respectively when the output engager is viewed from the front with section 1154 at the bottom, as shown in FIG. 212. At the end of cuts 1159 and 1161, the cylinder is cut at an angle and these cuts 1163 and 1165 form ramp 1156 at the end of flat surface 1160 and ramp 1158 at the end of flat surface 1162. Each ramp is about one inch long with one ramp starting about one-half inch before the other ramp begins. Ramp 1156 extends to the end of the output engager while ramp 1158 ends about one-half inch before the end of the cylinder and another longitudinal cut creates a flat surface 1164 which runs from the end of ramp 1158 to the end of the output engager. As shown in FIG. 213, a small hole 1166 is located on the outer surface of the output engager near the enclosed end and empties into hole 1152 that runs through the center of wall 1150. Output shaft 1140 is inserted into hole 1152 and a set screw 1144 threads into hole 1166 and contacts the flat surface 1148 of the output shaft to secure the output shaft to the output engager.

FIG. 215 shows an exploded view of fixed assembly 1106 which consists primarily of a mounting block 1168, a fixed cylinder 1170 and a spring 1172. The mounting block 1168 is shaped like a three-dimensional 'E' oriented sideways such that the openings between the three legs of the 'E' open out to the side and with the middle extension located closer to the leg of the 'E' at the rear than at the front. There is a hole in each metal slab forming a leg of the 'E' which is centered vertically and located closer to the open end of the 'E'. The hole 1174 through the front metal slab, or leg of the 'E, is larger than the holes 1176 through the other two metal slabs, or legs of the 'E'. One end of fixed cylinder 1170 is inserted into hole 1174 in the mounting block. Fixed cylinder 1170, shown isolated in FIGS. 217 through 219, is shaped like a hollow cylinder with two narrow sections 1178 of slightly larger diameter spaced nearly equally along the outside of the fixed cylinder and about a little over one-half inch apart. There is a groove 1180 on the outside surface at one end of the fixed cylinder for an eclip 1182 and at the other end of the cylinder a cut is made longitudinally about as deep as about one-eighth the diameter of the cylinder leaving a flat surface 1184 that ends just before the nearest narrow section 1178. The end of fixed cylinder 1170 which has flat surface 1184 is inserted into a hole 1174 at the end of the mounting block 1168 and a set screw 1186 threads into a small 1187 on the side of the mounting block which empties into hole 1174 so that the set screw 1186 makes contact with the flat surface 1184 on the fixed cylinder to secure the fixed cylinder to the mounting block. Spring 1172, which is shaped like a coil as shown in FIGS. 220 through 222, fits over the end of the fixed cylinder between E-clip 1182 and the nearest narrow section 1178, as shown in FIG. 194. The two ends 1188 of spring 1172 exit outward from the coil at an angle of a little over ninety degrees with the winding leading to each end. The two spring ends are spaced so that there is about one-quarter the circumference of the coil between them. The ends exit the coil symmetrically so that they mirror each other when the spring is viewed from the front about a line drawn through the coil in the middle of the two ends of the spring. Two small stress diffusers 1189 are placed on the spring, one on each end 1188 of the spring. The stress diffusers 1189 have a generally rectangular shape with a small hole 1190 through the center of the large faces for the end of the spring to fit through without falling out. Stress diffuser 1189 are sized to fit within the gaps that are left between the angled cuts on the input and output engagers when the input and output engagers are assembled, as shown in FIG. 223.

The anti-backdrive mechanism is assembled with the input shaft running through the middle of the fixed cylinder 1170 and through hole 1174 in the mounting block. Eclip 1122, which is placed around the input shaft in groove 1120, is positioned within a recessed area 1191 on the outside of the mounting block around hole 1174. A thin, rectangular shaped metal plate 1192 with a large hole 1193 in the center of it and two small holes 1194, one above and one below the hole in the center, is placed over the end of the mounting block and secured by two screws 1195 one of which passes through each hole 1194 and into corresponding holes 1196 in the mounting block to cover recessed area 1191 and eclip 1122, as shown in FIG. 216. The input engager is oriented with respect to the fixed cylinder such that the ends 1188 of spring 1172 run parallel to the angled surfaces 1132 and 1134 of the cuts 1131 and 1133 along the sides of the input engager. The spring end 1188 nearest the end of the fixed cylinder 1170 resides alongside the 45 degree angled cut 1131 which appears on the left of the input engager when the input engager is viewed from the rear and oriented such that the portion along the side of the input engager that is removed faces downward, as shown in FIG. 202. Angled cut 1131 continues to the end of the input engager to accommodate the movement of spring end 1188 and the stress diffuser 1189 placed on the end of the spring. The other spring end, which is next to one of the narrow sections 1178 of slightly larger diameter, is near the 45 degree angled cut 1133 which appears on the right of the input engager when the input engager is viewed from the front and oriented such that the portion along the side of input engager that is removed faces downward. Angled cut 1133 begins and ends earlier than angled cut 1131 to accommodate the movement of the end of the spring and the stress diffuser 1189 placed on the end of the spring which are located further along the fixed cylinder. The output shaft 1140 runs through holes 1176 in the other two legs of the 'E' shaped mounting block, as shown in FIG. 195. The input and output shafts are aligned concentrically and the input engager is inserted into the output engager with the output engager oriented such that longitudinal cut 1159 in the output engager runs alongside the longitudinal cut 1127 in the input engager with a gap 1197 of about a little less than half an inch between them, as shown in FIG. 223, and the longitudinal cut 1161 in the output engager runs alongside the longitudinal cut 1129 in the input engager with a similarly sized gap 1198 between them. Likewise, the 45 degree angled cut 1163 of the output engager runs alongside the 45 degree angled cut 1131 of the input engager with gap 1197 running in between them, and 45 degree angled cut 1165 of the output engager runs alongside the 45 degree angled cut 1133 of the input engager with gap 1198 running in between them. The ends 1192 of spring 1172 fit through the gaps 1197 and 1198 on either side of the spring and the stress diffuser 1189 on each spring end fit within gaps 1197 and 1198 and are oriented such that the long sides of the rectangular shaped stress diffuser 1189 lie parallel to the angled cuts 1131 and 1133, as shown in FIGS. 223 and 224.

When the output shaft starts to rotate clockwise, when viewed from the front, surface 1158 contacts the side of stress diffuser 1189 on the end of the spring 1172 and pushes upon the end of the spring in the direction that tends to wind the spring more tightly around the fixed cylinder. The tightly wound spring prevents the output shaft from turning so that neither the output shaft nor the input shaft can rotate. When the output shaft starts to rotate counter-clockwise, surface 1156 contacts the side of stress diffuser 1189 on the other end of the spring 1172 on the other side of the input engager and pushes upon the end of the spring in the direction which again tends to wind the spring. Thus, neither the output shaft nor the input shaft rotates when the output shaft is rotated.

When the input shaft starts to rotate clockwise, when viewed from the front, surface 1132 of angled cut 1131 contacts the side of stress diffuser 1189 on the end of the spring 1172 and pushes upon the end of the spring in the direction that tends to unwind the spring. As the diameter spring expands, the spring loosens about the fixed cylinder and is free to rotate as the input shaft rotate and stress diffuser 1189 pushes against the surface 1156 on the output engager so that the output engager rotates as the input engager rotates. When the input shaft rotates counter-clockwise, surface 1134 of angled cut 1133 contacts the side of stress diffuser 1189 on the end of the spring 1172 on the other side of the input engager and pushes upon the end of the spring in the direction which again tends to unwind the spring and stress diffuser 1189 pushes against the surface 1158 on the output engager so that the output engager rotates as the input engager rotates. Thus, the output shaft rotates when the input shaft is rotated.

FIGS. 225 through 228 show another anti-backdrive mechanism 1200 also incorporating a spring lock. Once again the overall assembly is composed of three main sub-assemblies that move relative to one another: an input shaft assembly 1202 shown in FIG. 225, an output shaft assembly 1204 shown in FIG. 226 and a fixed assembly 1206 shown in FIG. 227. The complete assembly incorporating the spring-lock anti-backdrive mechanism 1200 is shown in FIG. 228.

The input assembly 1202, shown in FIG. 225, consists of one piece shaped like a cylindrical rod 1208, which serves as the input shaft, joined to a rather narrow rectangular extension 1210 with a width that is the size of the diameter of the cylindrical rod and which is oriented such that the long side extends out perpendicularly from near one end of the rod. A rectangular block 1212 of about the same width of the rectangular extension is joined to the end of the narrow rectangular extension 1210 and is oriented so that the long side of the rectangular block runs parallel to the rod. The surface at the end of the rectangular extension abuts the surface of one of the long, narrow sides of the rectangular block and the surface of the long face of the rectangular extension closest the end of the cylindrical rod is flush with the surface of one of the short sides of the rectangular block so that the rectangular block is supported at one end, the end of the rectangular block nearest the end of the cylindrical rod, so that the rectangular block is held at a distance from and parallel to the cylindrical rod with open space in between the rectangular block and the cylindrical rod.

The output assembly, shown in FIG. 226, consists of one piece shaped like a long section 1214 of cylindrical rod, which serves as the output shaft, followed by a short section 1216 of increasing diameter which is in turn followed by a section 1218 of larger diameter which is about half as long as the section of smaller diameter. At the end of the larger diameter section 1218 there is a triangular extension 1220 shaped like an isosceles triangle and oriented so that the end of the section of larger diameter extends into and forms one corner of the triangle and is flush with the outside surface of the triangle opposite the side of the triangle that the rod enters. The triangular extension is perpendicular to the cylindrical rod and the two corners opposite the corner through which the section 1218 of larger diameter passes each have a generally rectangular extension 1222 that runs parallel to the rod in the direction opposite to the cylindrical rod. One edge 1224 along each of the rectangular extensions is rounded on the corner that faces the other extension and is flush with the end of the triangular extension.

FIG. 227 shows the fixed assembly which consists of a rather thin, rectangular plate 1226, a hollow fixed cylinder 1228 and a spring 1230. The fixed cylinder 1228 passes through a large hole 1232 in the center of the rectangular plate and the spring 1230 fits around the fixed cylinder. The spring 1230 is shaped like a coil with two long straight ends 1234 extending tangentially out from either side of the coil so that the two long straight ends run parallel to each other. The tips 1236 of the long straight ends are curved ninety degrees outward and point away from each other. Four small holes 1238, one located in each corner of the rectangular plate, are used for rigidly mounting the fixed assembly to the internal structure of the saw so that the fixed assembly does not move when other parts of the anti-backdrive mechanism move.

As shown in FIG. 228, the anti-backdrive mechanism is assembled with the cylindrical rod 1208 of the input assembly passing through hole 1240 which runs through the center of the hollow fixed cylinder 1228 of the fixed assembly from the side of the fixed cylinder that has the spring mounted to it and out to the other side of the rectangular plate 1226. The rectangular block 1212 on the input assembly fits in between the long straight ends 1234 of spring 1230. The output assembly is aligned with the input assembly such that the cylindrical section 1214 of the output assembly is concentric with the cylindrical rod 1208 of the input assembly and the end of the output assembly with the triangular extension 1220 abuts the end of the input assembly near rectangular block 1212. The rectangular extensions 1222 on the triangular extension 1220 of the output assembly straddle the rectangular block 1212 and the long straight ends 1234 of spring 1230.

When the output shaft, or cylindrical rod 1214, starts to rotate clockwise, as seen from the front, the rectangular extension 1222 of the triangular extension 1220 pushes against one of the long straight ends 1234 of spring 1230 in a direction that tends to wind the spring more tightly around the fixed cylinder. This prevents the output shaft, and thus the input shaft, from rotating. Rotating the output shaft in the counter-clockwise direction causes the rectangular extension on the other side of the rectangular block 1212 to push against the other long straight end 1234 of spring 1230 again preventing the output and input shaft from rotating.

When the input shaft starts to rotate clockwise, as seen from the front, a different situation arises as the rectangular block 1212 pushes against one of the long straight ends 1234 of spring 1230 in a direction that tends to push the long straight end of the spring away from the fixed cylinder 1228 slightly unwinding the spring. With the spring loosened around the fixed cylinder, it is free to rotate. The long straight end 1234 of the spring upon which the rectangular block is pushing contacts the nearest rectangular extension 1222 of the triangular extension 1220 to transmit the rotating motion of the input shaft to the output shaft. Rotating the input shaft in the counter-clockwise direction causes the rectangular block 1212 to contact the other long straight end 1234 of spring 1230 in a direction which again tends to loosen the spring around the fixed cylinder allowing the spring to rotate and the long straight end 1234 of the spring upon which the rectangular block is pushing contacts the nearest rectangular extension 1222 of the triangular extension 1220 to transmit the rotating motion of the input shaft to the output shaft. Thus, whether the input shaft turns clockwise or counter-clockwise, both the input shaft and the output shaft are able to rotate.

FIGS. 229 through 242 show another example of an anti-backdrive mechanism. This anti-backdrive mechanism 900 uses the orientation of two plates relative to a fixed structure to lock or unlock the mechanism. Once again the overall assembly is composed of three main sub-assemblies: an input shaft assembly 902 shown in FIG. 229, an output shaft assembly 904 shown in FIG. 230 and a fixed assembly 906 shown in FIG. 231. The complete assembly incorporating anti-backdrive mechanism 900 is shown in FIG. 232.

The input assembly 902, shown in FIG. 229 and in the exploded view of FIG. 234, consists of a slotted plate 908 fitted on the end of an input shaft 910 and a collar 912 situated on the input shaft between the slotted plate and the rest of the input shaft and attached to the input shaft by a set screw 914. Slotted plate 908, shown isolated in FIGS. 235 through 237, is shaped like a narrow square plate a couple inches wide. There is a hole 916 passing through the center of the plate that is circular for about 270 degrees but is cut straight along one side with the straight cut 918 running parallel to one side of the plate. On either side of the center hole 916 there are rectangular slots 920 running perpendicular to the straight cut in the center hole, one slot on each side of the center hole 916. The slots are almost as long as the plate with a border left between each slot and the edge of the plate. Three sides of each slot are cut straight through the plate so that they leave surfaces along the edges of the slots that fall on planes which are parallel to the edge of the plate, but the long side 922 of each slot closest to the edge of the plate are cut through the plate along a plane that is at an angle of about sixty degrees, as shown best in the cross-sectional view of FIG. 235. The slotted plate 908 fits over the end of the input shaft which has a section 924 of smaller diameter compared to the rest of the cylindrical shaft which is shaped to match the hole at the center of the slotted plate, that is, it is shaped like a cylindrical of smaller diameter cut longitudinally to form a flat surface 926 along the section. The circular collar 912 also fits over the end of the input shaft and is situated between the slotted plate and the long section of the input shaft which has a larger diameter. Set screw 914 threads into a hole 928 in the collar and makes contact with the flat surface 926 along section 924 of the input shaft to attach the collar to the input shaft. At the end of the input shaft opposite the end to which the plate is mounted, there is a section of slightly smaller diameter which is also cut longitudinally to form a flat surface 928 which is used to mount a handwheel.

The output assembly, shown in FIG. 230 and in the exploded view of FIG. 238, consists of an output shaft 930, a spacer collar 932 and a spring 934. The output shaft 930 is shaped like a cylindrical rod with a hole 936 passing through the shaft near one end. Collar 932 is generally rectangular but with the short sides rounded so that they bow outward. Coaxially aligned holes 938 run through the long sides of the collar and a large hole 940 passes through the center of the collar. The output shaft fits through hole 940 in the collar which is positioned near one end of the output shaft. Spring 934 fits through hole 938 on one side of collar 932, then through hole 936 in the output shaft and finally through hole 938 on the other side of collar 932. Spring 934 is long enough to extend out from collar 932 by about one-quarter to one-half inch on each side of the collar.

The fixed assembly, shown in FIG. 231 and in the exploded view of FIG. 239, consists of a fixed brake plate 942 and two rotating plates 944. Fixed brake 942 is shaped like a narrow plate with a basically square face and a large circular hole 946 which passes through the plate from the front face to the rear. A rectangular block 948 of about one-fourth the width of the plate is vertically oriented and runs along one edge of the plate to rigidly mount the plate to the internal structure of the saw. Holes 950 located near the top and bottom of the rectangular block 948 and passing front to back are used for screws that attach the rectangular block to the brake plate 942, and two more holes 952 which pass through the rectangular block from the side to side are used for screws to rigidly mount the brake plate to the internal structure of the saw. Rotating plates 944, shown isolated in FIGS. 240 through 242, are generally rectangular plates with notches 954 cut out of the top and bottom sides near one end. Notches 954 are cut such that each looks like a square cut all the way through the rotating plate when looking down at the face of the rotating plate, as shown in FIG. 242. When looking along the outside edge of the rotating plate along which the notch is cut out, however, notch 954 looks more like an 'X' in that the sides of the notch are cut at angles. As can be best seen in FIG. 241 which shows a side view of the rotating plate 944 facing notch 954, the angled cut along the side of notch 954 that appears to the left in FIG. 241 consists of a short segment 956 of negative slope which joins a longer segment 958 of positive slope. The short segment 956 of a negative slope starts from the top face of the plate at a point between the edge of the long side that appears to the left on the rotating plate in FIG. 241 and the middle of the long side of the rotating plate but closer to the middle, and stops before reaching the midline running longitudinally through the long side of the rotating plate. The longer segment 958 starts where the short segment stops and continues towards the bottom face of the rotating plate along a positive slope. The angled cut along the side of notch 954 that appears to the right in FIG. 241 is also made up of two segments, a longer segment 958 with a positive slope and a shorter segment 956 with negative slope. The longer segment 958 starts from the top face of the rotating plate at a point between the edge of the long side that appears to the right on the rotating plate in FIG. 241 and the middle of the long side of the rotating plate but closer to the middle, and stops just beyond the midline running longitudinally through the long side of the rotating plate at which point it joins the shorter segment 956 of negative slope that continues toward and stops at the bottom face of the rotating plate. The points at which the longer and shorter segments 958 and 956 of each angled cut meet forms peaks 960 and 962 which are rounded and slightly set off from each other as the upper and lower sloped segments on each side are of a slightly different length with the peak 960 that appears along the left side of the notch in FIG. 241 positioned a little above the longitudinal midline of the long side of the rotating plate and peak 962 that appears along the right side of the notch in FIG. 241 positioned a little below the longitudinal midline of the side.

As shown in FIGS. 232 and 233, the anti-backdrive mechanism is assembled with the input and output shaft coaxially aligned with the slotted plate of the input shaft positioned at the rear of the fixed brake plate 942 and the input shaft extending through the large circular cutout 946 in the fixed brake plate out towards the front. Collar 912 on the input shaft is situated between the rotating plates 944 at the end of the rotating plates which have notches 954. Collar 932 on the output shaft is situated between the rotating plates 944 on the other side of the slotted plate 908 at the end of the rotating plates without notches 954. Spring 934 presses against the inner faces of the rotating plates 944 and the sides 922 of slots 920 in the slotted plate that are cut at an angle allow spring 934 to push the rotating plates outward so that they are at an angle to the fixed brake plate 942.

When the output shaft 930 starts to rotate in either the clockwise or counter-clockwise direction, as seen from the front, spring 934 which pushes against the inner faces of the rotating plates 944, keeps the plates pushed outward away from each other and at an angle to the fixed brake plate 942 so that peaks 960 and 962 on each rotating plate are wedged against the fixed brake plate preventing the rotating plates, and thus the input shaft, from rotating.

When the input shaft starts to rotate clockwise, as seen from the front, a different situation arises as the slotted plate 908 on the input shaft pushes against the rotating plates 944 compressing spring 934 on the collar of the output shaft and pulling the rotating plates inward as the slotted plate rotates and the distance between the contact points at which the slotted plate applies the turning force on each rotating plate is reduced. As the rotating plates are drawn together they become more perpendicular to the fixed brake plate and there is more space between each side of the fixed brake plate and peaks 960 and 962 so that the rotating plates are free to rotate. Rotating the input shaft in the counter-clockwise direction causes the same effect only the contact points are at the opposite corners of each rotating plate. The rotating plates contact spring 934 in the collar on the output shaft and transmit the rotating motion to collar 932 on the output shaft which rotates the output shaft. Thus, whether the input shaft turns clockwise or counter-clockwise, both the input shaft and the output shaft are able to rotate.

FIGS. 243 through 253 show another example of an anti-backdrive mechanism. This anti-backdrive mechanism 1300 uses the orientation of two plates relative to a fixed structure to lock or unlock the mechanism. Once again the overall assembly is composed of three main sub-assemblies: an input shaft assembly 1302 shown in FIG. 243, an output shaft assembly 1304 shown in FIG. 244 and a fixed assembly 1306 shown in FIG. 245. The complete assembly incorporating anti-backdrive mechanism 1300 is shown in FIG. 246.

The input assembly 1302, shown in FIG. 243 and in the exploded view of FIG. 248, consists of a slotted plate 1308 fitted on the end of an input shaft 1310 shaped like a cylindrical rod. Slotted plate 1308, shown isolated in FIGS. 251 through 253, is shaped like a circular plate with two flat sides 1311 on opposite sides of the plate. There is a hole 1312 passing through the center of the plate that extends through a small cylindrical extension 1314 on the front face of the slotted plate. On either side of the center hole 1312 there are rectangular slots 1316 with rounded corners running perpendicular to the flat sides 1311, one slot on each side of the center hole 1312. The slots are almost as long as the plate. The slotted plate 1308 fits over the end of the input shaft which has a section 1318 of smaller diameter compared to the rest of the cylindrical shaft which is shaped to match the hole at the center of the slotted plate. A set screw 1320 threads into a hole 1322 in the cylindrical extension 1314 and then through hole 1324 in the smaller diameter section 1318 of the input shaft to attach the slotted plate 1308 to the input shaft 1310. At the end of the input shaft opposite the end to which the plate is mounted, there is a section which is cut longitudinally to form a flat surface 1326 which is used to mount a handwheel.

The output assembly, shown in FIG. 244 and in the exploded view of FIG. 249, consists of an output shaft 1328, a collar 1330 and a spring 1332. The output shaft 1328 is shaped like a cylindrical rod with two generally rectangular projections 1334 sticking out longitudinally from one end which are parallel to each other with a gap 1336 between them. The rectangular projections 1334 are formed as of from a cylinder of smaller diameter than the diameter of the output shaft and positioned concentrically with the output shaft. There are two holes 1338 and 1340 in each rectangular projection 1334 and the holes in one rectangular projection are aligned with the holes in the other rectangular projection, for example, hole 1340 in one rectangular projection is directly across from hole 1340 in the other rectangular projection. The holes are aligned along the midline running parallel to the rectangular projections and holes 1340 are slightly larger than holes 1338. Collar 1330 is shaped like a hollow cylinder which abuts the face of a narrow block that is generally rectangular but with the short sides 1341 rounded so that they bow outward. Coaxially aligned holes 1342 run through the long sides of the collar and a large hole 1344 passes through the center of the rectangular section of the collar. The output shaft fits through the middle of the hollow cylindrical section of the collar. A pin 1348 passes through a small hole 1350 in the cylindrical section of the collar that runs along the radius of the cylindrical section perpendicular to the shaft then through holes 1338 in the rectangular projections of the output shaft then through another small hole 1350 on the other side of the cylindrical section of the collar to secure the collar 1330 to the output shaft. Spring 1332 fits through hole 1342 on one side of collar 1330, then through holes 1340 in the rectangular projections of the output shaft and finally through hole 1342 on the other side of collar 1330. Spring 1332 is long enough to extend out from collar 1330 by around one-quarter inch on each side of the collar.

The fixed assembly, shown in FIG. 245 and in the exploded view of FIG. 250, consists of a fixed brake plate 1352 and two rotating plates 1354. Fixed brake 1352 is shaped like a narrow plate with a basically square face and a large circular hole 1356 which passes through the plate from the front face to the rear. A rectangular block 1358 of about one-fourth the width of the plate is vertically oriented and runs along one edge of the plate to rigidly mount the plate to the internal structure of the saw. Holes 1360 located near the top and bottom of the rectangular block 1358 and passing front to back are used for screws that attach the rectangular block to the brake plate 1352, and two more holes 1362 which pass through the rectangular block from the side to side are used for screws to rigidly mount the brake plate to the internal structure of the saw. Rotating plates 1354 are shaped like narrow rectangular slabs with holes 1364 and 1366 drilled near the center of surfaces 1368 along the long, thin side edges of the plate so that the holes run parallel to the plate and are coaxially aligned with the holes 1364 and 1366 drilled into surfaces 1368 on the opposite sides of the plates. Holes 1364 are located closer to one face of the plate and holes 1366 are located closer to the other face of the plate. A metal dowel pin 1370 is inserted into each of the four holes 1364 and 1366 in each rotating plate and extend outward from the edges of the plate about one-quarter inch. The rotating plates are oriented so that they are parallel to each other and fit through the large circular cutout 1356 in the fixed brake plate with each pair of pins 1370 on the same plate side edge straddling the brake plate. Holes 1364, which are closer to the faces of the rotating plates pointing inward, are positioned near the back side of the brake plate and holes 1366, which are closer to the faces of the rotating plates pointing outward are positioned near the front side of the brake plate, as can be seen in FIG. 247.

As shown in FIGS. 246 and 247, the anti-backdrive mechanism is assembled with the input and output shafts coaxially aligned and collar 1330 of the output shaft positioned on the front side of the fixed brake plate 1352 and in between the rotating plates 1354 so that the ends of spring 1332 contact the inward pointing faces of the rotating plates pushing the rotating plates outward so that they are at an angle to the fixed brake plate and the metal dowel pins 1370 are wedged against the brake plate. The slotted plate 1308 on the end of the input shaft fits over the ends of the rotating plates with each plate passing though one of the rectangular slots 1316 in the slotted plate.

When the output shaft 1328 starts to rotate spring 1332 keeps the rotating plates pushed outward so that the dowel pins 1370 remain wedged against the fixed brake plate preventing the rotating plates from rotating. When the input shaft starts to rotate a different situation arises as the slotted plate pulls the ends of the rotating plates together enough to release the dowel pins 1370 from the fixed brake plate allowing the rotating plates to rotate freely which then transmit the rotating motion to the output shaft through collar 1330 on the output shaft. Thus, both the input shaft and the output shaft are able to rotate when the input shaft is rotated.

FIGS. 254 through 269 show various embodiments of elevation mechanisms that may be incorporated into a saw to raise or lower the blade. Some of these embodiments can raise or lower the blade is just a few turns of the handwheel.

FIG. 254 shows an elevation mechanism 1400 that uses a rack and pinion. Pinion gear 1402 is mounted at the end of the output shaft 1404 and rotates as the handwheel 1406 rotates. Block 1408 in FIG. 255 represents an anti-backdrive mechanism connecting the input shaft 1410 to the output shaft 1404. The teeth of the pinion gear mate with the teeth along a rack 1414 that is attached to a structure 1412 that is free to slide up and down a vertically oriented elevation shaft 1416 rigidly mounted to the saw 1418 and is used to support the blade so that as pinion gear 1402 rotates rack 1414 is moved up or down raising and lowering structure 1412 thus changing the elevation of the blade.

FIGS. 256 and 257 show an elevation mechanism 1440 that uses a set of miter gears 1442 and 1444 and a single threaded rod 1446. Because the miter gears prevent the input shaft from being back-driven there is no need for an anti-backdrive mechanism and a single shaft 1448 serves as both the input and output shaft. Miter gear 1442 is attached concentrically at the end of the shaft 1448 and mates with miter gear 1444 that is vertically mounted to the lower of two support structures 1450 that are rigidly attached to the internal structure of the saw 1418 and which surrounds the top and bottom ends of the vertically oriented threaded rod 1446 to keep it in position. A short threaded cylinder 1452 is threaded onto the threaded rod and is attached to the blade support structure 1412 that is free to slide up and down a vertically oriented elevation shaft 1416 rigidly mounted to the saw 1418 and is used to support the blade. As the threaded rod rotates, threaded cylinder 1452 moves up or down along the threaded rod thus changing the elevation of the blade.

FIGS. 258 and 259 show an elevation mechanism 1460 that uses a grooved belt 1462 that wraps around a threaded shaft 1464. Belt 1462 has longitudinal grooves molded along the width of one side that mate with the grooves on the threaded shaft to which the handwheel 1406 is mounted. The ends of the belt are attached to the top and bottom ends of the structure 1412 that is free to slide up and down a vertically oriented elevation shaft 1416 rigidly mounted to the saw 1418 and is used to support the blade. As the handwheel rotates, the belt shifts on the threaded shaft as they wrap further in one direction along the shaft and unwraps in the other direction so that a different segment along the belt remains wrapped around the threaded shaft. As more of the belt closer to the end that is attached near the top of the structure that supports the blade is drawn closer to and wraps around the threaded shaft, the structure that supports the blade moves downward and the blade is lowered. As more of the belt closer to the end that is attached near the bottom of the structure that supports the blade is drawn closer to and wraps around the threaded shaft, the structure that supports the blade moves upward and the blade is raised.

FIGS. 260 and 261 show an elevation mechanism 1470 that uses a cable 1472 on a threaded shaft 1474. The cable is attached at the top to a block 1476 rigidly attached to the blade support structure 1412, runs vertically downward, wraps around the threaded shaft 1474 about five times within and following the grooves on the threaded shaft, runs vertically downward and loops at the bottom around another block 1476 rigidly attached to the blade support structure 1412 and runs back up wrapping around the threaded shaft several times again within and following a parallel track of grooves and continues up and attaches to the blade support structure next to where the other end of the cable is attached. Block 1408 in FIG. 261 represents an anti-backdrive mechanism connecting the input shaft 1478 to which the handwheel is attached and the threaded shaft 1474. FIG. 262 shows the cable 1472 isolated.

FIGS. 263 through 265 show an elevation mechanism 1480 that uses a cable 1482 wrapped around a large, fairly narrow, circular spool 1484 that is rotated by a gear 1486 and worm gear 1488. Worm gear 1488 is mounted at the end of the shaft 1490 to which the handwheel 1406 is attached and mates with gear 1486 which is mounted on a shaft 1492 that is oriented above and at a right angle to shaft 1490. Spool 1484 is mounted on the other end of shaft 1492. Cable 1482 is attached at the top end to a block 1494 that is rigidly attached to the blade support structure 1412 that is free to slide up and down a vertically oriented elevation shaft 1416 rigidly mounted to the saw 1418 and is used to support the blade. The cable continues vertically downward and wraps under and around spool 1484 and then continues downward where it is attached at the bottom end to another block 1494 that is rigidly attached to structure 1412. As the handwheel 1406 rotates, shaft 1490 rotates and attached worm gear 1488 rotates which rotates gear 1486 and attached spool 1484. As spool 1484 rotates, cable 1482 winds and unwinds around the spool so that a different portion of the cable wraps around the spool drawing one end of the cable closer to the spool and allowing the other end to move farther away from the spool thus raising or lowering structure 1412 and the blade depending on the direction the handwheel is rotated. The spool is sized so that it only takes about one full rotation of the handwheel to move structure 1412 and thus the blade through the full range of elevation from a fully lowered blade to a fully raised blade.

FIGS. 266 and 267 show an elevation mechanism 1500 that uses two cables 1502 and 1504 that partially wrap along the outside of a large, fairly narrow, swinging arc sector 1506 that is rotated by a gear 1514 and worm gear 1510. Worm gear 1510 is mounted at the end of the shaft 1512 to which the handwheel 1406 is attached and mates with gear 1514 which is mounted on a shaft 1516 that is oriented above and at a right angle to shaft 1512. Swinging arc section 1506, shaped like a large, thick arc section of a little less than one-fourth a circle, is mounted on the other end of shaft 1512. Cable 1502 is attached at the top end to a block 1518 that is rigidly attached to the upper part of the blade support structure 1412 that is free to slide up and down a vertically oriented elevation shaft 1416 rigidly mounted to the saw 1418 and is used to support the blade. Cable 1502 continues vertically downward and runs along the outside of swinging arc section 1506 and is attached to the swinging arc section on the curved outside surface near the bottom of the curved outside surface. Cable 1504 is attached at the bottom end to another block 1518 that is rigidly attached to the lower part of structure 1412 and continues upward and runs along the outside of swinging arc section 1506 and is attached to the swinging arc section on the curved outside surface near the top of the curved outside surface. As the handwheel 1406 rotates, shaft 1512 rotates and attached worm gear 1510 rotates which rotates gear 1514 and attached swinging arc section 1506. As Swinging arc section 1506 rotates, one of the cables 1502 or 1504, depending on the direction that the handwheel is rotated, winds about the swinging arc sector 1506 while the other cable unwinds drawing the end of the cable attached to a block 1518 closer to the swinging arc sector and allowing the end of the other cable attached to the other block 1518 to move farther away from the swinging arc sector thus raising or lowering structure 1412 and the blade depending on the direction the handwheel is rotated. The swinging arc sector can be sized so that it only takes about one full rotation of the handwheel to move structure 1412 and thus the blade through the full range of elevation from a fully lowered blade to a fully raised blade.

FIGS. 268 and 269 show an elevation mechanism 1540 that uses a cable 1542 and a worm gear 1544. Worm gear 1544 is mounted at the end of an output shaft 1546 and rotates as the handwheel 1406 rotates. Block 1548 in FIG.

269 represents an anti-backdrive mechanism connecting the input shaft 1550 to the output shaft 1546. Cable 1542 is attached at one end to a block 1552 attached to the upper part of the blade support structure 1412 that is free to slide up and down a vertically oriented elevation shaft 1416 rigidly mounted to the saw 1418 and is used to support the blade. Cable 1542 continues vertically downward and wraps around worm gear 1544 several times following the grooves in the worm gear and then continues downward and attaches to another block 1552 attached to the lower part of structure 1412. As handwheel 1406 rotates, input shaft 1550 and output shaft 1546 rotate and attached worm gear 1544 rotates. As the worm gear 1544 rotates, cable 1542 winds and unwinds around the worm gear so that a different portion of the cable wraps around the worm gear drawing one end of the cable closer to the worm gear and allowing the other end to move farther away from the worm gear thus raising or lowering structure 1412 and the blade depending on the direction the handwheel is rotated. The worm gear is sized and the number of times the cable is around the worm gear is chosen so that it only takes about one full rotation of the handwheel to move structure 1412 and thus the blade through the full range of elevation from a fully lowered blade to a fully raised blade.

FIG. 270 shows an elevation mechanism using levers. A lever 1550 extends out from the saw and a user pivots the lever to raise and lower the blade. Linkage inside the saw connects to lever 1550 so that movement of the lever raises and lowers the blade.

FIGS. 271 through 278 show an elevation limit stop 1600 that prevents the handwheel 1602 from being rotated past the point where the blade reaches the fully elevated or fully lowered position according to the design of the saw. If the handwheel is forced beyond the proper limits, parts within the saw could be bent or otherwise damaged. As shown in FIGS. 275 through 278 limit stop 1600 is shaped like a thick, wide ring with an arc section 1602 of larger diameter sweeping through an angle of about 100 degrees or so which extends out from the ring. A second smaller arc section 1604 shaped similarly to section 1602 but sweeping through a slightly smaller angle of 90 degrees is layered on top of section 1602 nearly doubling the thickness of the limit stop where the two arc sections overlap. Arc section 1604 is centered within arc section 1602 and is set back a small distance from the inner surface of the ring. Limit stop 1600 fits over the input shaft 1606, is free to rotate on the shaft, and is oriented such that the smaller arc section 1604 faces the handwheel. An adjustable screw 1607, shown in FIG. 274, extends from the internal structure of the saw and acts as an abutment against which stop 1600 abuts. Limit stop 1600 is also positioned on the input shaft near a pin 1608 which extends out radially from the input shaft. Pin 1608 moves with the input shaft as the input shaft rotates. As pin 1608 rotates, it contacts one edge of arc section 1604 and causes the limit stop to rotate with the shaft until the limit stop abuts against screw 1607 and stops the shaft from rotating. FIG. 272 shows the input shaft rotated clockwise until pin 1608 is up against one edge of arc section 1604 of the limit stop, and FIG. 273 shows the inputs shaft rotated counter-clockwise until pin 1608 is up against the opposite edge of arc section 1604 of the limit stop.

FIG. 279 shows a tool or jig 1700 used to assemble an embodiment of an anti-backdrive mechanism similar to anti-backdrive mechanism 26 described in FIGS. 3-38, but with a modified flange plate and a modified vertical plate. The modified flange plate is shown in FIGS. 280 and 281 at 1702, and the modified vertical plate is shown in FIG. 282 at 1704.

Tool 1700 is typically machined from aluminum, or made from some other appropriate material, and can be attached to a table or workbench. Tool 1700 has walls 1706 and 1708 shaped to receive the various components of the anti-backdrive mechanism. Tool 1700 also has slots or channels 1710 and 1712 which provide clearance for the tabs 1714 and 1716, respectively, which extend from the back of flange arms of spring 102. (Tabs 1714 and 1716 are used to transmit torque to an output shaft in one embodiment of an elevation mechanism.) Tool 1700 also includes four posts or projections 1718, 1720, 1722 and 1724 that extend through corresponding slots in the flange plate (the slots are seen in FIGS. 280 and 281, but are not labeled). The posts are used to position flange plate 1702 in the tool. The posts are arcuate and posts 1718 and 1720 have shorter arc lengths than posts 1722 and 1724. The slots in the flange plate are also arcuate and have different arc lengths so that flange plate 1702 can be placed in tool 1700 in only one orientation.

To assemble an anti-backdrive mechanism, a person first places a flange plate in tool 1700, as explained. The person next places vertical plate 1704 over the flange plate. Tool 1700 is constructed so the vertical plate must be oriented correctly to fit in the tool. The tool includes ears 1726 and 1728 that interfere with mounting flanges 1730 on the vertical plate if the person assembling the mechanism attempts to place the vertical plate in the tool incorrectly. The person also places a foam or felt ring in the tool, such as foam filter 172 discussed previously, and places a spring in the tool, such as torsion spring 102 discussed previously. Flange plate 1702 includes a center post over which the spring is placed. Additionally, the person places two locking springs 138 on posts 136 on the flange plate, one locking spring on each pair of posts, and places locking cylinders 140 on the ends of the locking springs. Locking springs 138 are then compressed so the two arms of one locking spring fit between posts 1718 and 1720 and the two arms of the other locking spring fit between posts 1722 and 1724. In this manner the posts hold the springs compressed while the anti-backdrive mechanism is assembled. FIG. 283 shows tool 1700 with the flange plate, locking springs and locking cylinders installed.

A release plate 40 is then installed in the tool, as shown in FIG. 284. A ramp plate 44 is placed over the assembly, a foam or felt ring 1732 is placed around the release plate, and the assembly is held together with two screws, as shown in FIG. 285.

FIGS. 286 through 296 show another embodiment of an elevation mechanism with anti-backdrive. As seen in FIG. 286, a trunnion 2000 supports an elevation carriage 2002, and elevation carriage 2002 is configured to move up and down on rod 2004 (rod 2004 is attached to trunnion 2000). In a table saw, elevation carriage 2002 supports a circular blade and a motor to drive the blade. The elevation carriage, and therefore the blade, moves up and down by a user turning handwheel 2006.

Handwheel 2006 is connecting to an input shaft 2008 which is connected to an anti-backdrive mechanism 2010. An output shaft 2012 extends from anti-backdrive mechanism 2010 and terminates with a spool or reel 2014 shaped like a worm gear. A cable 2016 is connected at a first end 2018 to a first location on elevation carriage 2002, and at a second end 2020 to a second location on the elevation carriage. Between its two ends, the cable is wound around spool 2014. Specifically, first end 2018 of cable 2016 includes a fitting 2017, shown in FIG. 287, attached to the cable by crimping or some other method. Fitting 2017 fits into a socket at the first location on elevation carriage 2002 to secure the first end of the cable to the elevation carriage. Second end 2020 of cable 2016 includes a threaded-shaft fitting 2021 crimped or otherwise joined to the cable, as shown in FIG. 287. Elevation carriage 2002 includes a flange/socket structure configured to support a coil spring 2023 at the second location. The threaded-shaft fitting extends through an opening in the flange/socket structure, through spring 2023, through a washer at the top of the spring, and then a nut 2024 is threaded onto the threaded shaft to secure the second end of the cable to the elevation carriage and to compress spring 2023. FIG. 288 shows a simplified and enlarged view of fitting 2021 and spring 2023. Spring 2023 functions to take up slack in the cable if the cable stretches over time during use. Spring 2023 also functions somewhat to absorb sudden impacts that might otherwise strain or break the cable.

Cable 2016 includes a locator or stop 2025 attached to the cable between its two ends. Stop 2025 fits into a recess in spool 2014, as shown in FIG. 289, and thereby locates the cable relative to the spool and prevents the cable from slipping on or around the spool.

With this configuration, turning handwheel 2006 causes shafts 2008 and 2012 and spool 2014 to rotate. That causes cable 2016 to wind and unwind on spool 2014, and that, in turn, causes the elevation carriage to move up and down.

As shown in FIG. 286, a coil spring 2030 is positioned around shaft 2012. One end of the coil spring is attached to trunnion 2000 by passing through a bracket 2026 which is mounted to the trunnion, as shown in FIG. 290, and the other end of the spring is attached to shaft 2012. The weight of elevation carriage 2002, the blade, and the motor can be substantial, and spring 2030 provides a force to assist in raising elevation carriage 2002 and to balance the force required on the handwheel to raise and lower the blade. The tension on the spring and the spring force can be selected to provide the desired assistance and balance. Without the spring, the handwheel could be too hard to turn to raise the blade, and/or could be too easy to turn to lower the blade.

The elevation mechanism shown in FIG. 286 also includes an overload shock absorber 2050. In a table saw with active injury mitigation technology as disclosed in International Patent Publication WO 01/26064 A2, published Apr. 12, 2001, and hereby incorporated by reference, the saw may stop and/or retract the blade if a person comes into contact with or dangerous proximity to the spinning blade, and that reaction might create an impulse or shock on the elevation mechanism. Alternatively, a saw may be dropped or otherwise impacted, and the drop or impact may create an impulse or shock on the elevation mechanism. Overload shock absorber 2050 works to accommodate or absorb any such impact or shock to minimize the likelihood of damage to the elevation mechanism.

Overload shock absorber 2050 is shown in more detail in FIGS. 291 through 294. It includes two shock plates 2052 and 2054. FIG. 292 shows a shock plate isolated from other structure. Each shock plate includes a somewhat hour-glass shaped opening 2056 at its center, and each shock plate is slid onto the end of shaft 2012 opposite spool 2014, as shown in the exploded view of FIG. 293. The end of shaft 2012 is shaped to have a generally rectangular cross-section that fits within openings 2056 in the shock plates. However, the generally hour-glass shape of openings 2056 provide clearance around the end of shaft 2012 so the shock plates can rotate somewhat around the shaft before the sides of the openings abut the sides of the shaft. Shock plates 2052 and 2054 are identical, but one is turned before it is slid onto the shaft so that the two shock plates are oriented in what may be thought of as opposite each other. A cap 2053 fits over the end of shaft 2012 to hold the shock plates on the shaft, and the cap is secured on the shaft with a screw 2055.

Shock plates 2052 and 2054 each include arms 2060, and coil springs 2062 and 2064 are positioned over the arms of both shock plates, as shown in FIG. 291. The springs, therefore, help hold the two shock plates together. The coil springs are compressed when installed on the arms of the shock plates so the springs tend to push the shock plates apart until a side of opening 2056 in each shock plate contacts a side of the generally rectangular-shaped end of shaft 2012.

As seen in FIG. 294, an input coupler 2070 is placed over the shock plates on the side away from spool 2014. The input coupler is operably connected to anti-backdrive mechanism 2010, which is operably connected to shaft 2008, so the input coupler rotates when a user turns handwheel 2006. Input coupler 2070 includes two shoulders or projections 2072 and 2074 that fit between shock plates 2052 and 2054. Shoulders 2072 and 2074 transmit torque from shaft 2008 to shaft 2012 through the shock plates. Springs 2062 and 2064 allow the transmission of torque up to a magnitude required to further compress the springs. However, if there is some event or impact causing a sudden torque of sufficient magnitude to further compress the springs, then springs 2062 and 2064 will compress and absorb at least some of the force of the impact.

As can be seen, overload shock absorber 2050 allows for the transmission of torque up to a predetermined threshold before absorbing additional torque. By so doing, the elevation mechanism maintains a solid, rigid feel at handwheel 2006 and the elevation mechanism does not feel spongy. This feature may be thought of as positive zeroing because it positively transmits torque at the zero or balanced state, absorbs shock when overloaded, and then returns to the zero or balanced state.

FIG. 295 shows an exploded view of handwheel 2006. The handwheel includes a handle body 2100 with recesses around its periphery, such as recess 2102. A soft, tactile material 2104, such as rubber or soft plastic, is applied to the recesses around the periphery of the handle body to provide a tactile gripping surface. The end of input shaft 2008 is hex-shaped, and a splined connector 2106 is configured to fit over the end of input shaft 2008. The backside of handle body 2100 includes a socket 2108 to fit over the splined connector, as shown in FIG. 296, and the handle body is attached to input shaft 2008 with a washer, lock washer, screw and cap, as shown in FIG. 295. A knob 2110 is attached to the handle body by a bolt 2112 that screws into a threaded insert 2114, and a cap 2116 fits over the end of the knob, as shown in FIG. 295. Knob 2110 may rotate around bolt 2112 so that a user can grasp the knob and turn the handwheel without the knob twisting in the user's hand. The knob is positioned away from the center axis of rotation of the handle body to create a moment arm to make turning the handwheel easier.

INDUSTRIAL APPLICABILITY

The blade elevation mechanisms and anti-backdrive mechanisms disclosed herein are applicable to woodworking power tool equipment, and particularly to table saws. The anti-backdrive mechanisms discussed above may be referred to as anti-backdrive means for preventing the blade from unwanted retraction, means for preventing back-drive, or some other similar appellation.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, the recitation of "a" or "a first" element, or the equivalent thereof, should be understood to include incorporation of one or more such elements, neither requiring nor excluding two or more such elements.

The elevation mechanisms and related components disclosed herein may be described generally as set forth in the following numbered paragraphs. These paragraphs are intended as illustrative, and are not intended to limit the disclosure or claims in any way. Changes and modifications may be made to the following descriptions without departing from the scope of the disclosure.

The invention claimed is:

1. A table saw comprising:
   a table defining a work surface;
   a substantially planar, circular blade configured to extend at least partially above the work surface;
   a motor to spin the blade; and
   an elevation system to change the elevation of the blade relative to the work surface, where the elevation system includes a handwheel adapted to be turned by a user to change the elevation of the blade by at least 3 inches with 5 turns or less of the handwheel; and
   an anti-backdrive mechanism configured to prevent gravity from causing the blade to drop more than a quarter of an inch when a user releases the handwheel, where the anti-backdrive mechanism operates without a user having to perform any action after releasing the handwheel.

2. The table saw of claim 1 where the elevation system is configured to change the elevation of the blade at least 3 inches with 3 turns or less of the handwheel.

3. The table saw of claim 1 where the elevation system is configured to change the elevation of the blade at least 3 inches with 1 turn or less of the handwheel.

4. The table saw of claim 1 where the anti-backdrive mechanism comprises:
   an input shaft assembly operatively associated with the handwheel;
   an output shaft assembly; and
   back-drive structure operatively connecting the input shaft assembly and the output shaft assembly so that a torque on the input shaft assembly turns the output shaft assembly, but a torque on the output shaft assembly does not turn the input shaft assembly.

5. The table saw of claim 4 where the input shaft assembly, the output shaft assembly, and the back-drive structure are configured to occupy a neutral position where friction prevents back-drive, and further configured to occupy a non-neutral position where the input shaft assembly moves the output shaft assembly when the handwheel turns.

6. The table saw of claim 4, where the anti-backdrive mechanism further comprises a friction component and a friction surface, where the friction component engages the friction surface sufficiently to prevent back-drive when the input shaft assembly, the output shaft assembly, and the back-drive structure occupy a neutral position, and where the friction component does not engage the friction surface sufficiently to prevent back-drive when the input shaft assembly, the output shaft assembly, and the back-drive structure occupy a non-neutral position.

7. The table saw of claim 1 further comprising an overload shock absorber.

8. The table saw of claim 1 where turning the handwheel creates torque, and further comprising an overload shock absorber configured to allow for the transmission of torque by turning the handwheel up to a predetermined threshold and thereafter to absorb at least some additional torque.

9. A table saw comprising:
   a table defining a work surface;
   a substantially planar, circular blade configured to extend at least partially above the work surface;
   a motor to spin the blade; and
   an elevation system to change the elevation of the blade relative to the work surface, where the elevation system includes a handwheel adapted to be turned by a user to change the elevation of the blade by at least 3 inches with 5 turns or less of the handwheel; and
   an anti-backdrive mechanism configured to prevent gravity from causing the blade to drop more than a quarter of an inch when a user releases the handwheel, where the anti-backdrive mechanism includes:
   an input assembly associated with the handwheel;
   an output assembly; and
   a fixed assembly operatively connecting the input assembly and the output assembly so that turning the handwheel transmits a force to the output assembly to raise the blade, but the weight of the blade and motor does not backdrive the blade.

* * * * *